(12) United States Patent
Xu et al.

(10) Patent No.: US 12,425,140 B2
(45) Date of Patent: Sep. 23, 2025

(54) DYNAMIC HYBRID AUTOMATIC REPEAT REQUEST (HARQ) CODEBOOK FOR MULTI-USER PACKET (MUP) AND/OR UNICAST COMMUNICATIONS

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US); Tao Luo, San Diego, CA (US); Peter Gaal, San Diego, CA (US); Juan Montojo, San Diego, CA (US); Rajat Prakash, San Diego, CA (US); Ozcan Ozturk, San Diego, CA (US); Mostafa Khoshnevisan, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 17/918,477

(22) PCT Filed: May 14, 2020

(86) PCT No.: PCT/CN2020/090367
§ 371 (c)(1),
(2) Date: Oct. 12, 2022

(87) PCT Pub. No.: WO2021/226966
PCT Pub. Date: Nov. 18, 2021

(65) Prior Publication Data
US 2024/0267161 A1    Aug. 8, 2024

(51) Int. Cl.
*H04L 1/1829* (2023.01)
(52) U.S. Cl.
CPC ............... *H04L 1/1861* (2013.01)

(58) Field of Classification Search
CPC ... H04L 1/1861; H04L 5/0053; H04L 1/1854; H04L 1/18; H04W 28/04; H04W 74/08
See application file for complete search history.

(56) References Cited

U.S. PATENT DOCUMENTS

2020/0106566 A1*  4/2020  Yeo .................. H04L 1/1854
2020/0328849 A1* 10/2020  Noh .................. H04L 1/1812
(Continued)

FOREIGN PATENT DOCUMENTS

CN       110944403 A      3/2020

OTHER PUBLICATIONS

Institute for Information Industry (III): "Enhancements to DL SPS", 3GPP TSG RAN WG1 #99, R1-1912778, Reno, USA, Nov. 18-22, 2019, Nov. 22, 2019 (Nov. 22, 2019) the Whole Document, pp. 1-5.
(Continued)

*Primary Examiner* — Mewale A Ambaye
(74) *Attorney, Agent, or Firm* — Haynes and Boone LLP

(57) ABSTRACT

Wireless communications systems and methods related to communicating ACK/NACK feedbacks for multi-user and unicast physical down-link shared channel (PDSCH) communications are provided. A UE may receive a multi-user PDSCH communication including a first transport block (TB) for the UE and may receive a unicast PDSCH communication including a second TB for the UE. The UE may determine a hybrid automatic repeat request (HARQ) codebook for the first TB associated with the multi-user PDSCH communication and the second TB associated with the unicast PDSCH communication. The UE may transmit a first acknowledgement/negative-acknowledgment (ACK/NACK) feedback for the first TB and a second ACK/NACK feedback for the second TB based on the determined HARQ codebook.

108 Claims, 29 Drawing Sheets

(56) References Cited

U.S. PATENT DOCUMENTS

| | | | | |
|---|---|---|---|---|
| 2021/0376967 A1* | 12/2021 | Ahn | ..................... | H04W 72/21 |
| 2023/0261805 A1* | 8/2023 | Liu | ..................... | H04L 1/1854 |
| | | | | 370/312 |
| 2024/0187142 A1* | 6/2024 | Lei | ....................... | H04L 5/0055 |
| 2024/0236978 A1* | 7/2024 | Zhang | .................. | H04L 1/1854 |
| 2024/0267162 A1* | 8/2024 | Khoshnevisan | ...... | H04L 1/1861 |

OTHER PUBLICATIONS

International Search Report and Written Opinion—PCT/CN2020/090367—ISA/EPO—Jan. 27, 2021.
LG Electronics: "Discussion on UE Feedback for DL Multicast/Broadcast", 3GPP Draft, 3GPP TSG RAN WG1 Meeting #85, R1-164537 Feedback for DL Broadcast, 3rd Generation Partnership Project (3GPP), Mobile Competence Centre, 650, Route Des Lucioles, F-06921, Sophia-Antipolis Cedex, France, vol. RAN WG1, No. Nanjing, China, May 23, 2016-May 27, 2016, May 14, 2016 (May 14, 2016), XP051096398, pp. 1-5, pp. 1-2, section 2.

\* cited by examiner

DYNAMIC HYBRID AUTOMATIC REPEAT REQUEST (HARQ) CODEBOOK FOR MULTI-USER PACKET (MUP) AND/OR UNICAST COMMUNICATIONS

CROSS-REFERENCE TO RELATED APPLICATIONS

The present application is a 35 U.S.C. 371 National Phase entry of Patent Cooperation Treaty (PCT) Application No. PCT/CN2020/090367, filed May 14, 2020, which is hereby expressly incorporated herein by reference in its entirety.

TECHNICAL FIELD

This application relates to wireless communication systems, and more particularly to communication of acknowledgement (ACK)/negative-ACK (NACK) feedbacks for multi-user physical downlink shared channel (PDSCH) communications and unicast PDSCH communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE) includes: receiving a multi-user physical downlink shared channel (PDSCH) communication comprising a first transport block (TB) for the UE; receiving a unicast PDSCH communication comprising a second TB for the UE; determining a hybrid automatic repeat request (HARQ) codebook for the first TB associated with the multi-user PDSCH communication and the second TB associated with the unicast PDSCH communication; and transmitting a first acknowledgement/negative-acknowledgment (ACK/NACK) feedback for the first TB and a second ACK/NACK feedback for the second TB based on the determined HARQ codebook.

In an additional aspect of the disclosure, a user equipment (UE) includes a transceiver and a processor. The transceiver is configured to: receive a multi-user physical downlink shared channel (PDSCH) communication comprising a first transport block (TB) for the UE; receive a unicast PDSCH communication comprising a second TB for the UE; and transmit a first acknowledgement/negative-acknowledgment (ACK/NACK) feedback for the first TB and a second ACK/NACK feedback for the second TB based on a determined HARQ codebook. The processor is configured to determine the hybrid automatic repeat request (HARQ) codebook for the first TB associated with the multi-user PDSCH communication and the second TB associated with the unicast PDSCH communication.

In an additional aspect of the disclosure, a non-transitory computer-readable medium having program code recorded thereon, the program code including: code for causing a user equipment (UE) to receive a multi-user physical downlink shared channel (PDSCH) communication comprising a first transport block (TB) for the UE; code for causing the UE to receive a unicast PDSCH communication comprising a second TB for the UE; code for causing the UE to determine a hybrid automatic repeat request (HARQ) codebook for the first TB associated with the multi-user PDSCH communication and the second TB associated with the unicast PDSCH communication; and code for causing the UE to transmit a first acknowledgement/negative-acknowledgment (ACK/NACK) feedback for the first TB and a second ACK/NACK feedback for the second TB based on the determined HARQ codebook.

In an additional aspect of the disclosure, a user equipment (UE) includes: means for receiving a multi-user physical downlink shared channel (PDSCH) communication comprising a first transport block (TB) for the UE; means for receiving a unicast PDSCH communication comprising a second TB for the UE; means for determining a hybrid automatic repeat request (HARQ) codebook for the first TB associated with the multi-user PDSCH communication and the second TB associated with the unicast PDSCH communication; and means for transmitting a first acknowledgement/negative-acknowledgment (ACK/NACK) feedback for the first TB and a second ACK/NACK feedback for the second TB based on the determined HARQ codebook.

In an additional aspect of the disclosure, a method of wireless communication performed by a base station (BS) includes: transmitting a multi-user physical downlink shared channel (PDSCH) communication comprising a first transport block (TB) to a user equipment (UE); transmitting a unicast PDSCH communication comprising a second TB to the UE; and receiving a first acknowledgement/negative-acknowledgment (ACK/NACK) feedback for the first TB and a second ACK/NACK feedback for the second TB based on a HARQ codebook, the HARQ codebook being for the first TB associated with the multi-user PDSCH communication and for the second TB associated with the unicast PDSCH communication.

In an additional aspect of the disclosure, a base station (BS) includes a transceiver configured to: transmit a multi-user physical downlink shared channel (PDSCH) communication comprising a first transport block (TB) to a user equipment (UE); transmit a unicast PDSCH communication comprising a second TB to the UE; and receive a first acknowledgement/negative-acknowledgment (ACK/NACK) feedback for the first TB and a second ACK/NACK feedback for the second TB based on a HARQ codebook, wherein the HARQ codebook is for the first TB associated with the multi-user PDSCH communication and for the second TB associated with the unicast PDSCH communication.

In an additional aspect of the disclosure, a non-transitory computer-readable medium having program code recorded thereon, the program code including: code for causing a base station (BS) to transmit a multi-user physical downlink shared channel (PDSCH) communication comprising a first transport block (TB) to a user equipment (UE); code for causing the BS to transmit a unicast PDSCH communication comprising a second TB to the UE; and code for causing the BS to receive a first acknowledgement/negative-acknowledgment (ACK/NACK) feedback for the first TB and a second ACK/NACK feedback for the second TB based on a HARQ codebook, wherein the HARQ codebook is for the first TB associated with the multi-user PDSCH communication and for the second TB associated with the unicast PDSCH communication.

In an additional aspect of the disclosure, a base station (BS) includes means for transmitting a multi-user physical downlink shared channel (PDSCH) communication comprising a first transport block (TB) to a user equipment (UE); means for transmitting a unicast PDSCH communication comprising a second TB to the UE; and means for receiving a first acknowledgement/negative-acknowledgment (ACK/NACK) feedback for the first TB and a second ACK/NACK feedback for the second TB based on a HARQ codebook, the HARQ codebook being for the first TB associated with the multi-user PDSCH communication and for the second TB associated with the unicast PDSCH communication.

Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
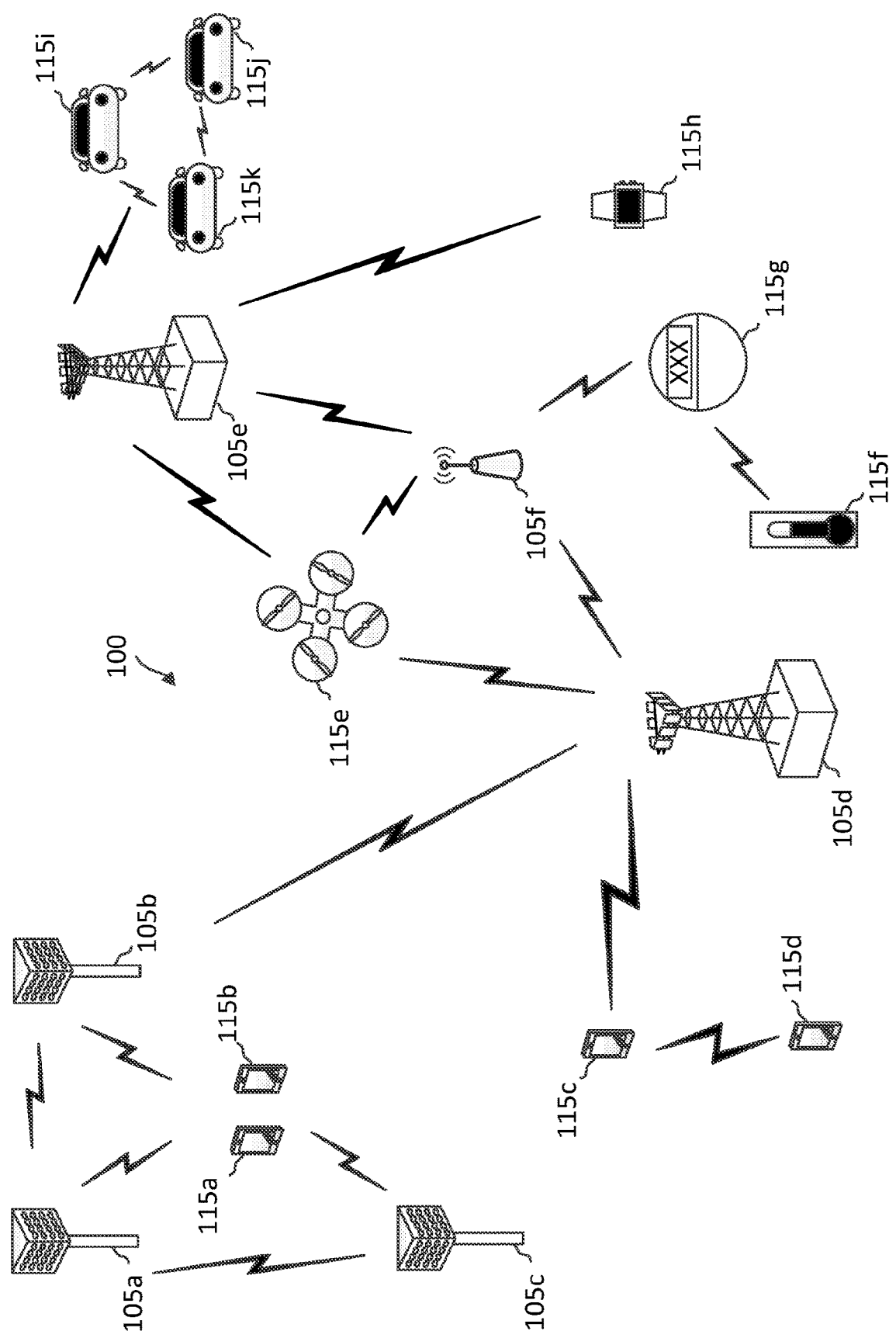
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kilohertz (kHz), for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

NR technologies had been extended to operate over an unlicensed spectrum. The deployment of NR technologies over an unlicensed spectrum is referred to as NR-U. NR-U is targeted for operations over the 5 gigahertz (GHz) and 6 GHz bands, where there are well-defined channel access rules for sharing among operators of the same radio access technology (RAT) and/or of different RATs.

In New Radio, performance may be improved for some communication scenarios by using multi-user packets (MUP), where data for multiple UEs is multiplexed together in the payload of a single packet. For example, in scenarios where a small amount of data is communicated to multiple UEs, such as a factory automation scenario, an Industrial Internet of Things (IIoT) scenario, a broadcast or multicast scenario, an evolved multimedia broadcast multicast service (eMBMS) scenario, a single-cell point-to-multipoint (SC-PTM) scenario, and/or the like, performance may be improved by aggregating the data in a MUP as opposed to transmitting the data in a large number of small packets. For example, such aggregation or concatenation of data for multiple UEs in a MUP may result in a better coding gain as compared to the transmission of multiple packets. The aggregation may be in the form of transport blocks (TBs) aggregated into a single physical downlink shared channel (PDSCH) transmission. For instance, a MUP may include multiple TBs for multiple UEs, where each TB may be addressed to one of the multiple UEs. Additionally, or alternatively, downlink control overhead may be reduced because downlink control information (DCI) may be transmitted for only the MUP instead of for multiple packets for different UEs. A MUP may also be referred to as a multi-user PDSCH communication.

A dynamic HARQ codebook may be difficult to support if MUPs are used. For example, a DCI indicating a DL grant that references a PDSCH communication may include a set of DAI fields. The set of DAI fields may include a DAI counter and a DAI total and may correspond to a single UE. If the DCI indicates a DL grant that references a unicast PDSCH communication, the DAI counter and the DAI total may be specific to the UE served by the unicast PDSCH communication. If, however, the DCI indicates a DL grant that references a multi-user PDSCH communication, it may be difficult for the BS to determine a value for the DAI counter and a value for the DAI total because the multi-user PDSCH communication is transmitted to a group of UEs. The DCI typically does not include a set of DAI fields for each UE served by the multi-user PDSCH communication.

The present disclosure provides techniques for supporting a dynamic HARQ codebook when unicast and multi-user PDSCH communications are communicated between a BS and a UE. For example, the BS and the UE may communicate ACK/NACK feedbacks for multi-user PDSCH communications and unicast PDSCH communications. For example, a UE may receive a multi-user PDSCH communication including a first TB for the UE and may receive a unicast PDSCH communication including a second TB for the UE. The UE may determine a hybrid automatic repeat request (HARQ) codebook for the first TB associated with the multi-user PDSCH communication and the second TB associated with the unicast PDSCH communication. The UE may transmit a first acknowledgement/negative-acknowledgment (ACK/NACK) feedback for the first TB and a second ACK/NACK feedback for the second TB based on the determined HARQ codebook.

In some aspects, the UE may transmit the first ACK/NACK feedback based on a MUP HARQ codebook using a first HARQ ACK/NACK reporting occasion for the multi-user PDSCH communication and may transmit the second ACK/NACK feedback based on a unicast HARQ codebook using a second HARQ ACK/NACK reporting occasion for the unicast PDSCH communication. The first HARQ ACK/NACK reporting occasion may be different from the second HARQ ACK/NACK reporting occasion in the time domain. In some aspects, the UE may transmit the first ACK/NACK feedback and the second ACK/NACK feedback based on single HARQ codebook using a HARQ ACK/NACK reporting occasion for multi-user and unicast PDSCH communications. The first ACK/NACK feedback and the second ACK/NACK feedback may be multiplexed in the HARQ codebook.

In some aspects, the UE may determine a MUP HARQ codebook for the first TB associated with the multi-user PDSCH communication and determine a unicast HARQ codebook for the second TB associated with the unicast PDSCH communication. The UE may use a HARQ ACK/NACK reporting occasion for the multi-user and unicast PDSCH communications and concatenate the MUP HARQ codebook and the unicast HARQ codebook. The UE may transmit the first and second ACK/NACK feedbacks based on the concatenated HARQ codebooks using the HARQ ACK/NACK reporting occasion. Mechanisms for communicating ACK/NACK feedbacks for multi-user and unicast PDSCH communications are described in greater detail herein.

Aspects of the present disclosure can provide several benefits. For example, use of multi-user PDSCH communications may reduce overhead by aggregating the traffic from multiple UEs together into a multi-user PDSCH communication. Additionally or alternatively, multiple ACK/NACK feedbacks corresponding to multi-user and unicast PDSCH communications may be communicated in a single slot. Thus, the disclosed examples may reduce resource overhead and ACK/NACK feedback communications to consume less time (e.g., by being transmitted in fewer slots).

FIG. 1 illustrates a wireless communication network 100 according to one or more aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IOT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communi-cating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4(MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel. A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. Conversely, the LBT results in a failure when a channel reservation signal is detected in the channel. A TXOP may also be referred to as channel occupancy time (COT).

Figure 2:
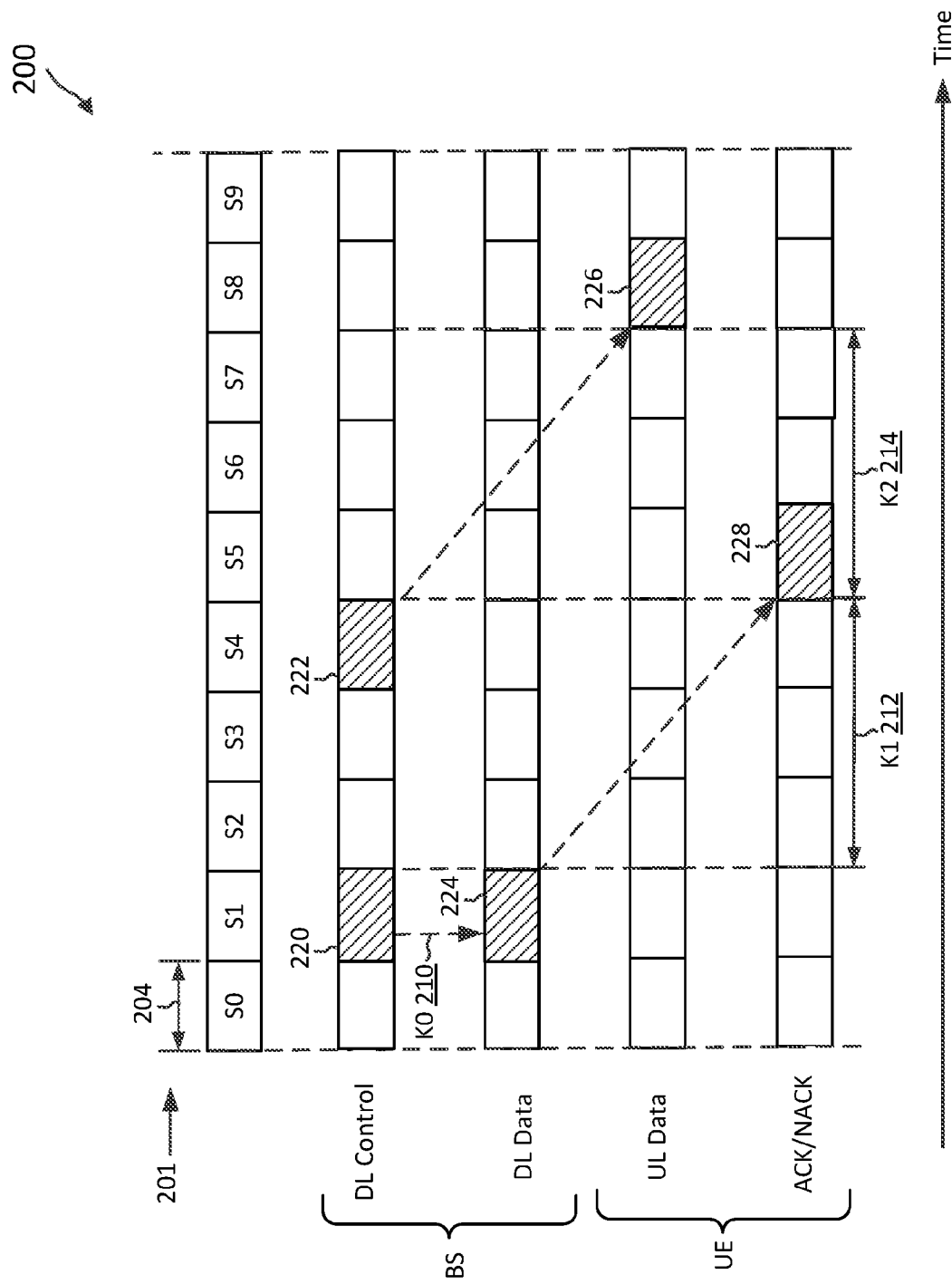
FIG. 2 illustrates a flexible scheduling timeline according to one or more aspects of the present disclosure.

FIG. 2 illustrates a flexible scheduling timeline 200 according to one or more aspects of the present disclosure. The scheduling timeline 200 may correspond to a scheduling timeline communicated between a BS 105 and a UE 115 of the network 100. In FIG. 2, the x-axis represents time in some constant units.

FIG. 2 shows a frame structure 201 including a plurality of slots 204 in time. The slots 204 are indexed from S0 to S9. For example, a BS 105 may communicate with a UE 115 in units of slots 204. The slots 204 may also be referred to as transmission time intervals (TTIs). Each slot 204 or TTI carries a medium access control (MAC) layer transport block. Each slot 204 may include a number of symbols in time and a number of frequency tones in frequency. Each slot 204 may include a DL control portion followed by at least one of a subsequent DL data portion, UL data portion, and/or a UL control portion. In the context of LTE, the DL control portion, the DL data portion, the UL data portion, and the UL control portion may be referred to as a physical downlink control channel (PDCCH), a physical downlink shared channel (PDSCH), a physical uplink shared channel (PUSCH), and a physical uplink control channel (PUCCH), respectively.

The BS 105 and the UE 115 may communicate based on a parameter 210, denoted as K0, a parameter 212, denoted as K1, and a parameter 214, denoted as K2. The parameter 210 indicates a delay between a DL grant and a corresponding DL transmission (e.g., a PDSCH transmission). The parameter 212 indicates a delay between a DL data reception (e.g., a PDSCH reception) and a corresponding acknowledgement (ACK) or negative-ACK (NACK) transmission. The parameter 214 indicates a delay between a UL grant and a corresponding UL data transmission (e.g., PUSCH transmission). The parameters 210, 212, and 214 may be configured by the network and may be indicated in units of slots 204.

For example, in NR, the parameters 210, 212, and 214 may be indicated in downlink control information (DCI) carried in a PDCCH. The list of possible values for the parameter 210, K0, that can be configured by RRC is, for example, {0, 1, 2, 3, 4, 5, 8, 10, 16, 20, 32}. The list of possible values for the parameter 212, K1, that can be configured by RRC is, for example, {0, 1, 2, 3, 4, 5, 6, 7, 8}. The list of possible values for the parameter 213, K2, that can be configured by RRC is, for example, {0, 1, 2, 3, 4, 5, 6, 7, 8, 10, 16, 20, and 32}.

As an example, the parameter 210 may indicate a value 0 (e.g., K0=0), the parameter 212 may indicate a value of 4 (e.g., K1=4), and the parameter 214 may indicate a value of 4 (e.g., K2=4). The pattern-filled boxes represent transmissions of DL control information, DL data, UL data, an ACK, and/or an NACK in corresponding slots 204. While an entire slot 204 is pattern-filled, a transmission may occur only in a corresponding portion of the slot 204. As shown, the BS 105 transmits DCI 220 in the slot 204 indexed S1 (e.g., in a DL control portion of the slot 204). The DCI 220 may indicate a DL grant for the UE in the same slot 204 indexed S1 (e.g., K0=0). Thus, the BS 105 transmits a DL data signal 224 to the UE 115 in the slot 204 indexed S1 (e.g., in a DL data portion of the slot 204). The UE 115 may receive the DCI 220 and receive the DL data signal 224 based on the DL grant. In some aspects, the DL data signal 224 may be a multi-user PDSCH communication including a first TB for a group of UEs including the UE 115. In some aspects, the DL data signal 224 may be a unicast PDSCH communication including a second TB for the UE 115. The multi-user and unicast PDSCH communications are discussed in further detail below.

After receiving the DL data signal 224, the UE 115 may report a reception status of the DL data signal 224 to the BS by transmitting an ACK/NACK signal 228 in the slot 204 indexed S5 (e.g., in an UL data portion or an UL control portion of the slot 204) based on the parameter 212 (e.g., K1=4). The slot 204 indexed S5 is a fourth slot from the slot 204 indexed S1. The ACK/NACK signal 228 refers to a feedback signal carrying an ACK or a NACK. The UE may transmit an ACK when the reception of the DL data signal 224 is successful. Alternatively, the UE may transmit an NACK when the reception of the DL data signal 224 is unsuccessful (e.g., including an error or failing an error correction).

The BS 105 further transmits DCI 222 in the slot 204 indexed S4 (e.g., in a DL control portion of the slot 204). The DCI 222 may indicate an UL grant for the UE 115. The UE 115 transmits an UL data signal 226 to the BS 105 in the slot 204 indexed S8 (e.g., in a UL data portion of the slot 204) based on the UL assignment and the parameter 214 (e.g., K2=4). The slot 204 indexed S8 is a fourth slot from the slot 204 indexed S4. The values for the parameters 210, 212, and 214 provided are examples and may be different from those examples provided in the present disclosure.

Figure 3:
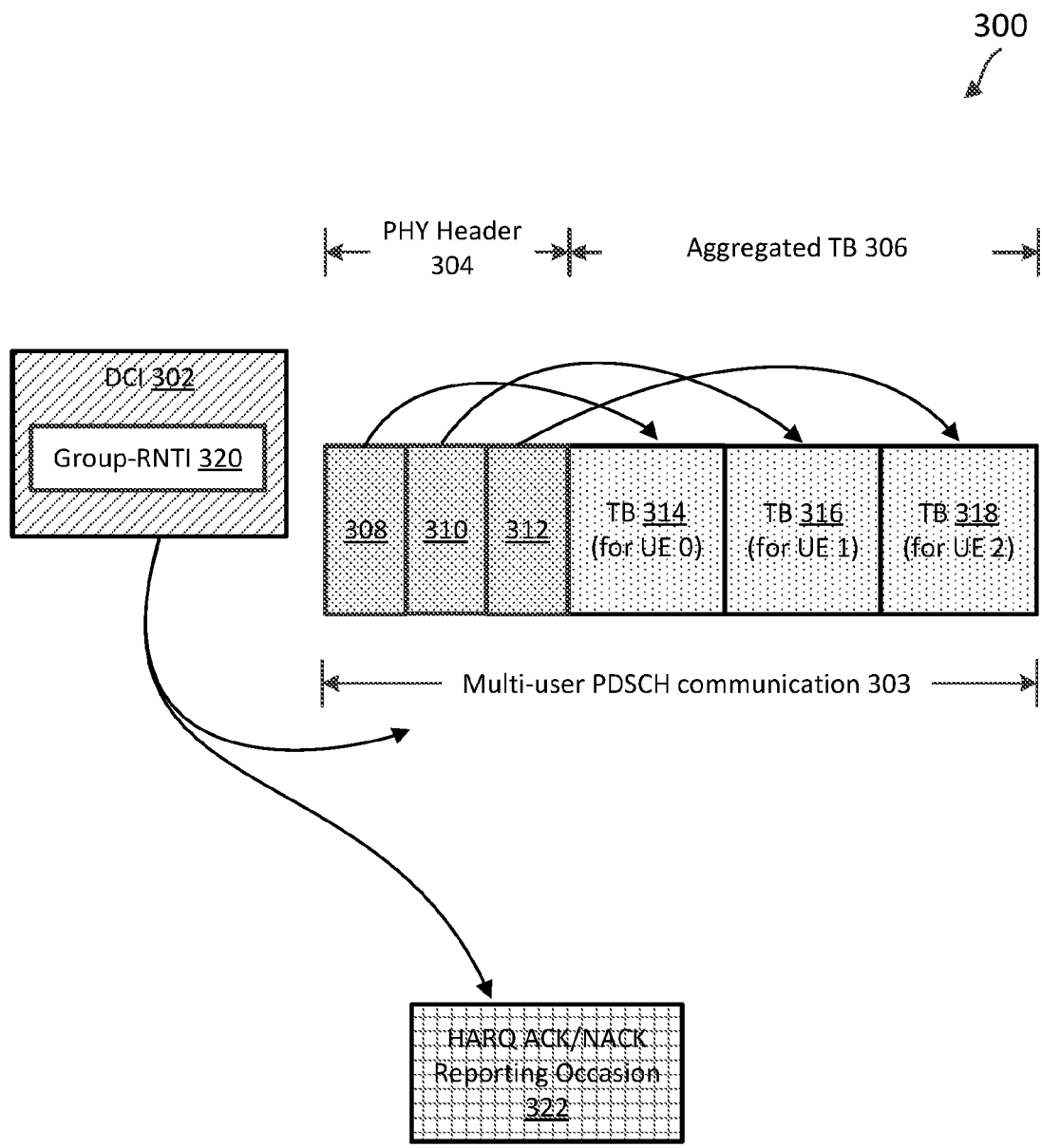
FIG. 3 is an illustration of a multi-user physical downlink shared channel (PDSCH) communication scheme according to one or more aspects of the present disclosure.

FIG. 3 is an illustration of a multi-user PDSCH communication scheme 300 according to one or more aspects of the present disclosure. The scheme 300 may be employed by a BS 105 and a UE 115 in a network such as the network 100. In FIG. 3, the x-axis represents time in some constant units.

In the example illustrated in FIG. 3, a BS 105 may transmit a DCI 302 indicating a DL grant that references a multi-user PDSCH communication 303 including multiple packets to a group of UEs including UE 702, UE 704, and UE 2. The multiple packets may be, for example, packets that are communicated in industrial Internet of Things (IIoT). The BS 105 may concatenate the multiple packets (in the form of TBs) for the group of UEs together, and a single DL grant may be used for the group of UEs. The multi-user PDSCH communication 303 may include a PHY header 304 and an aggregated TB 306 for the group of UEs. The PHY header 304 includes a sub-header 308, a sub-header 310, and a sub-header 312, and the aggregated TB 306 includes a TB 314 for the UE 702, a TB 316 for the UE 704, and a TB 318 for the UE 2. The BS 105 may aggregate the TBs 314, 316, and 318 together to form the aggregated TB 306 and add the PHY header 304 to the aggregated TB 306. The multi-user PDSCH communication 303 may include a single TB (e.g., aggregated TB 306) for the group of UEs. Each of the sub-headers 308, 310, and 312 is for one UE of the group of UEs. For example, the sub-header 308 is for the UE 702, the sub-header 310 is for the UE 704, and the sub-header 312 is for the UE 2. Each sub-header may carry information such as, for example, a UE identifier and a range of the TB to the user in the aggregated TB 306.

The BS 105 may transmit a group-RNTI 320 to the group of UEs, and each UE of the group of UEs may monitor for DCI indicating the group-RNTI 320. The BS 105 may transmit the DCI 302 indicating the group-RNTI 320 to one or more UEs of the group of UEs and transmit PDSCH carrying the aggregated TB 306. A UE 115 (e.g., UE 702, UE 704, or UE 2) may detect the DCI 302 and decode the DCI 302 indicating the DL grant that references the multi-user PDSCH communication 303. After the UE 115 decodes the DCI 302, the UE 115 may decode the multi-user PDSCH communication 303 based on the DCI 302. The UE 115 may parse the PHY header 304 and determine whether the UE 115 is being addressed in the multi-user PDSCH communication 303. For example, the UE 115 may determine whether a first UE identifier included in a sub-header matches a second UE identifier of the UE 115. If the first UE identifier matches the second UE identifier, the UE 115 may determine that at least one of the TBs of the aggregated TB 306 is being addressed to the UE 115. The UE 115 may determine, based on the sub-header including the matching UE identifier, which TB (e.g., TB 314, TB 316, or TB 316) is for the UE 115.

Additionally, the DCI 302 may indicate a HARQ ACK/NACK reporting occasion 322 for the multi-user PDSCH communication 303. For instance, the UE 115 (e.g., UE 0) may determine an ACK/NACK feedback for the TB 314 (as just one example) and determine a HARQ codebook based on the ACK/NACK feedback. The UE 115 may then transmit the ACK/NACK feedback for the TB 314 based on the determined HARQ codebook.

Figure 4:
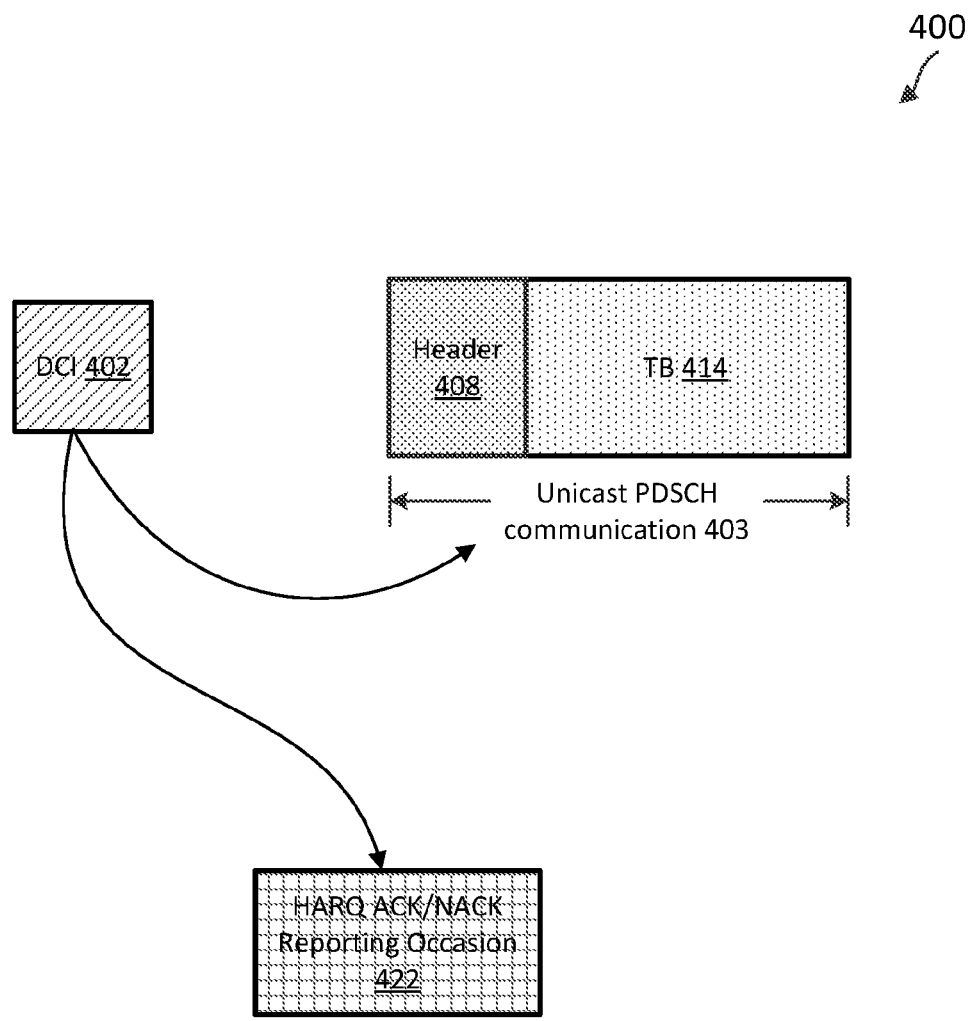
FIG. 4 is an illustration of a unicast PDSCH communication scheme according to one or more aspects of the present disclosure.

FIG. 4 is an illustration of a unicast PDSCH communication scheme 400 according to one or more aspects of the present disclosure. The scheme 400 may be employed by a BS 105 and a UE 115 in a network such as the network 100. In FIG. 4, the x-axis represents time in some constant units.

In the example illustrated in FIG. 4, a BS 105 may transmit a DCI 402 indicating a DL grant that references a unicast PDSCH communication 403 including a header 408 and a single TB 414 for the UE 115. Additionally, the DCI 302 may indicate a HARQ ACK/NACK reporting occasion 422 for the unicast PDSCH communication 403. For instance, the UE 115 may determine an ACK/NACK feedback for the TB 414 and determine a HARQ codebook based on the ACK/NACK feedback. The UE 115 may then transmit the ACK/NACK feedback for the TB 414 based on the determined HARQ codebook.

Accordingly, as discussed in relation to aspects of FIGS. 3 and 4, the UE 115 may receive a multi-user PDSCH communication including a first TB for the UE 115 and may receive a unicast PDSCH communication including a second TB for the UE 115. The present disclosure provides techniques for handling ACK/NACK feedbacks associated with multi-user and unicast PDSCH communications. For example, the UE 115 may determine a HARQ codebook for the first TB associated with the multi-user PDSCH and the second TB associated with the unicast PDSCH communication. The UE 115 may transmit a first ACK/NACK feedback (e.g., ACK or NACK) for the first TB and a second ACK/NACK feedback (e.g., ACK or NACK) for the second TB based on the determined HARQ codebook.

Figure 5:
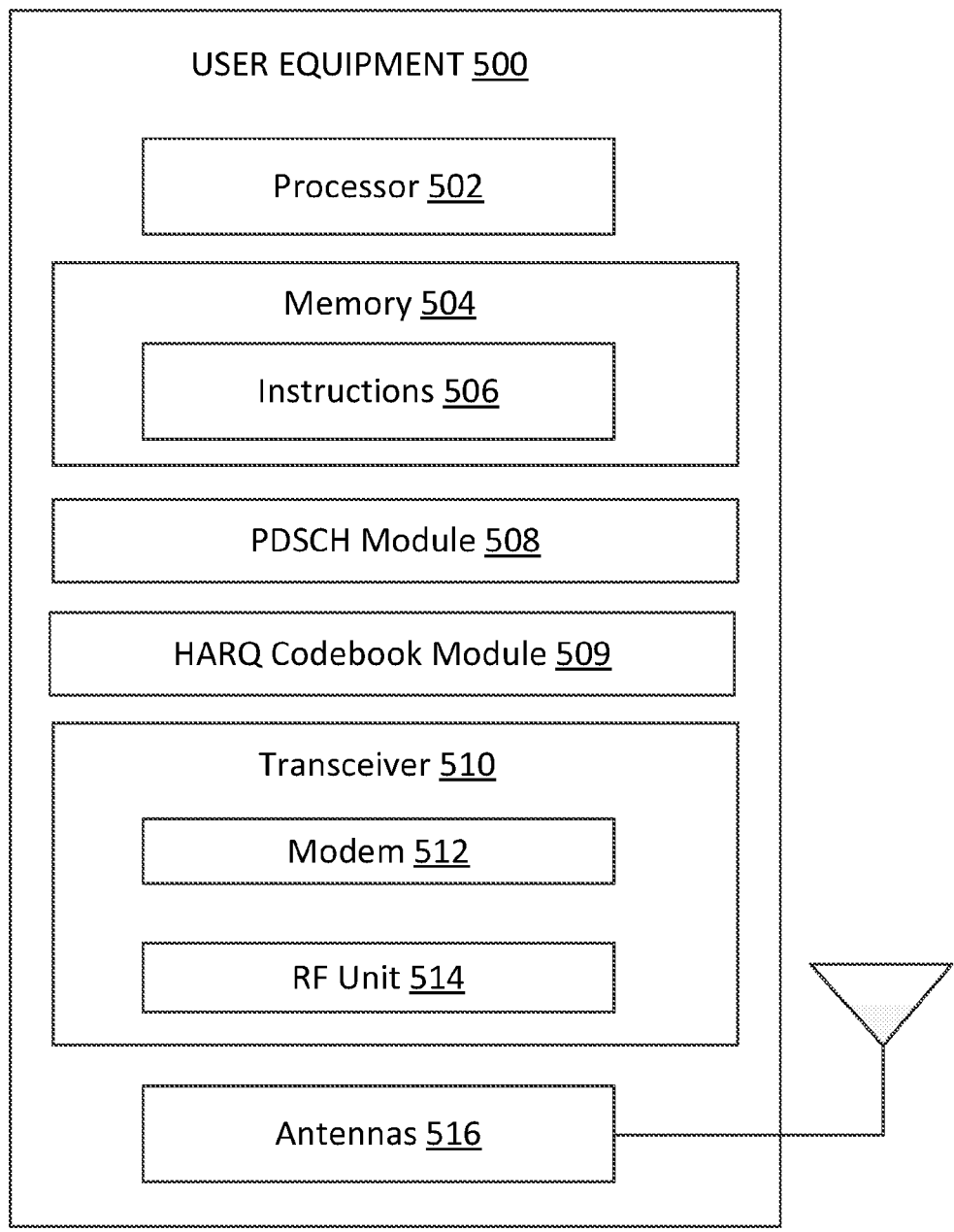
FIG. 5 illustrates a block diagram of an example user equipment (UE) according to one or more aspects of the present disclosure.

FIG. 5 illustrates a block diagram of an example UE 500 according to one or more aspects of the present disclosure. The UE 500 may be, for example, a UE 115 discussed in FIG. 1. As shown, the UE 500 may include a processor 502, a memory 504, a PDSCH module 508, a HARQ codebook module 509, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 1-4, 7A-7C, 8A-8E, 9A-9C, 10A-10E, 11A-11C, 12A-12E, and 13. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The PDSCH module 508 and/or the HARQ codebook module 509 may be implemented via hardware, software, or combinations thereof. For example, the PDSCH module 508 and/or the HARQ codebook module 509 may be implemented as a processor, circuit, and/or instructions 506 stored in the memory 504 and executed by the processor 502. In some instances, the PDSCH module 508 and/or the HARQ codebook module 509 can be integrated within the modem subsystem 512. For example, the PDSCH module 508 and/or the HARQ codebook module 509 can be implemented by a combination of software components (e.g., executed by a DSP or a general processor) and hardware components (e.g., logic gates and circuitry) within the modem subsystem 512.

The PDSCH module 508 and/or the HARQ codebook module 509 may be used for various aspects of the present disclosure, for example, aspects of FIGS. 1-4, 7A-7C, 8A-8E, 9A-9C, 10A-10E, 11A-11C, 12A-12E, and 13. In some aspects, the PDSCH module 508 may be configured to receive a multi-user PDSCH communication including a first TB for the UE 115. The PDSCH module 508 may be configured to receive a unicast PDSCH communication including a second TB for the UE 115. In some aspects, the HARQ codebook module 509 may be configured to determine a HARQ codebook for the first TB associated with the multi-user PDSCH communication and the second TB associated with the unicast PDSCH communication. The HARQ codebook module 509 may be configured to transmit a first ACK/NACK feedback for the first TB and a second ACK/NACK feedback for the second TB based on the determined HARQ codebook.

As shown, the transceiver 510 may include the modem subsystem 512 and the RF unit 514. The transceiver 510 can be configured to communicate bi-directionally with other devices, such as the BSs 105 or other UEs. The modem subsystem 512 may be configured to modulate and/or encode the data from the memory 504, the PDSCH module 508, and/or the HARQ codebook module 509 according to an MCS, e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., HARQ codebook, ACK/NACK feedback, etc.) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 500 to enable the UE 500 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., a multi-user PDSCH communication, a unicast PDSCH communication, DCI, DAI counter (e.g., group DAI counter or unicast DAI counter), DAI total (e.g., group DAI total or unicast DAI total), group-RNTI, DL grant, etc.) to the PDSCH module 508 and/or the HARQ codebook module 509 for processing. The antennas 516 may include multiple antennas of similar or different designs in order to sustain multiple transmission links. The RF unit 514 may configure the antennas 516.

In some aspects, the transceiver 510 is configured to receive one or more multi-user PDSCH communications and/or one or more unicast PDSCH communications, for example, by coordinating with the PDSCH module 508. In some aspects, the transceiver 510 is configured to transmit a first ACK/NACK feedback for a first TB and a second ACK/NACK feedback for a second TB based on a determined HARQ codebook, for example, by coordinating with the HARQ codebook module 509. In some aspects, the processor 502 is configured to determine a HARQ codebook for the first TB associated with the multi-user PDSCH communication and the second TB associated with the unicast PDSCH communication, for example, by coordinating with the HARQ codebook module 509.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
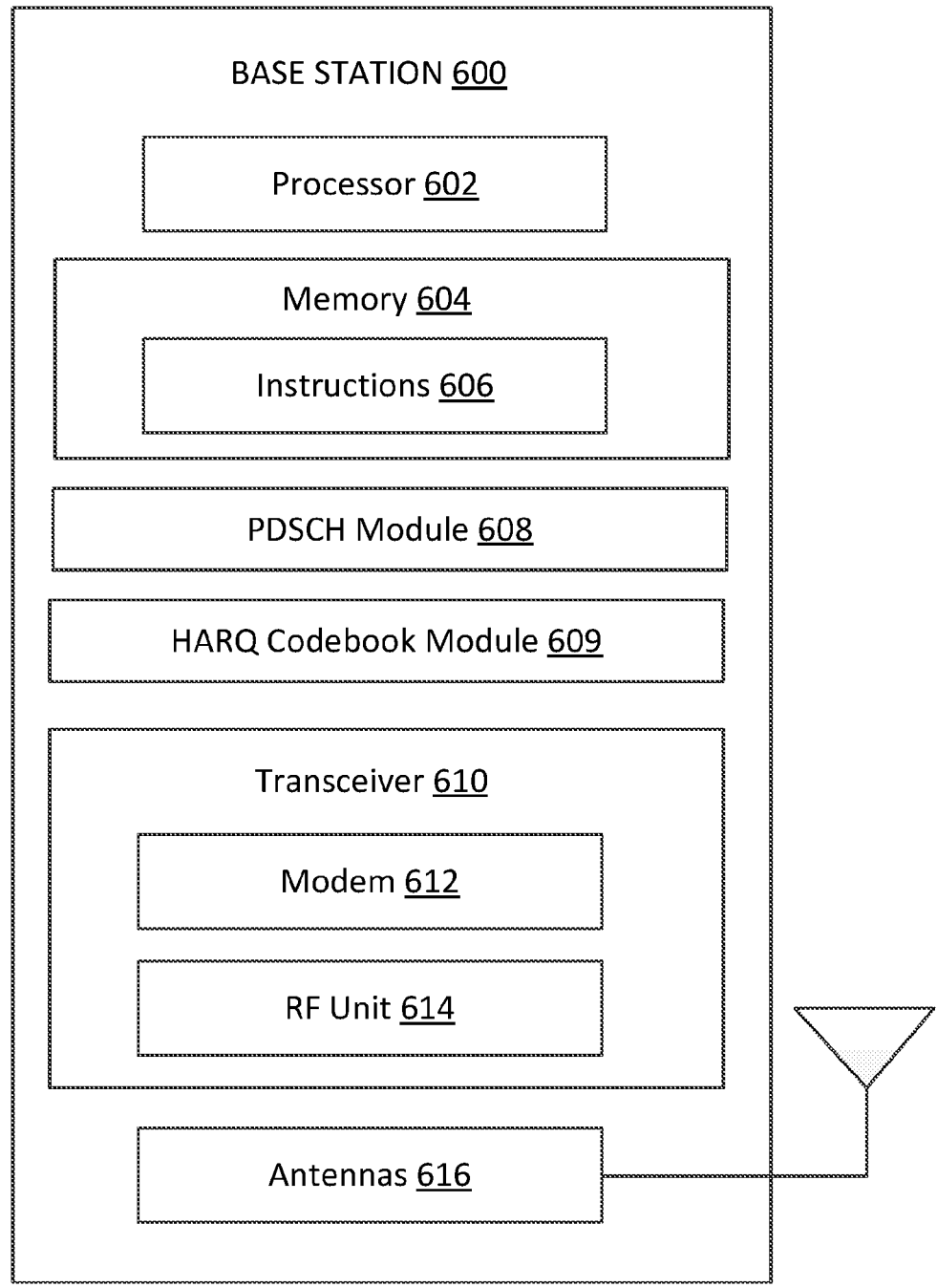
FIG. 6 illustrates a block diagram of an example base station (BS) according to one or more aspects of the present disclosure.

FIG. 6 illustrates a block diagram of a BS 600 in accordance with one or more aspects of the present disclosure. The BS 600 may be a BS 105 as discussed above in FIG. 1. As shown, the BS 600 may include a processor 602, a memory 604, a PDSCH module 608, a HARQ codebook module 609, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of aspects of FIGS. 1-4, 7A-7C, 8A-8E, 9A-9C, 10A-10E, 11A-11C, 12A-12E, and 14. Instructions 606 may also be referred to as code, which may be interpreted broadly to include any type of computer-readable statement(s) as discussed above with respect to FIG. 5.

The PDSCH module 608 and/or the HARQ codebook module 609 may be implemented via hardware, software, or combinations thereof. The PDSCH module 608 and/or the HARQ codebook module 609 may be implemented as a processor, circuit, and/or instructions 606 stored in the memory 604 and executed by the processor 602. In some instances, the PDSCH module 608 and/or the HARQ codebook module 609 can be integrated within the modem subsystem 612. The PDSCH module 608 and/or the HARQ codebook module 609 can be implemented by a combination of software components (e.g., executed by a DSP or a general processor) and hardware components (e.g., logic gates and circuitry) within the modem subsystem 612. The PDSCH module 608 and/or the HARQ codebook module 609 may be used for various aspects of the present disclosure, for example, aspects of aspects of FIGS. 1-4, 7A-7C, 8A-8E, 9A-9C, 10A-10E, 11A-11C, 12A-12E, and 14.

In some aspects, the PDSCH module 608 may be configured to transmit a multi-user PDSCH communication comprising a first TB to a UE. The PDSCH module 608 may be configured to transmit a unicast PDSCH communication comprising a second TB to the UE. In some aspects, the HARQ codebook module 609 may be configured to receive a first ACK/NACK feedback for the first TB and a second ACK/NACK feedback for the second TB based on a HARQ codebook, the HARQ codebook being for the first TB associated with the multi-user PDSCH communication and the second TB associated with the unicast PDSCH communication.

As shown, the transceiver 610 may include the modem subsystem 612 and the RF unit 614. The transceiver 610 can be configured to communicate bi-directionally with other devices, such as the UEs (e.g., UE 115), a BS (e.g., BS 105), and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., a multi-user PDSCH communication, a unicast PDSCH communication, DCI, DAI counter (e.g., group DAI counter or unicast DAI counter), DAI total (e.g., group DAI total or unicast DAI total), group-RNTI, DL grant, RRC configuration, HARQ codebook configuration, etc.) from the modem subsystem 612 (on outbound transmissions) or of transmissions originating from another source such as a UE 115. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 according to one or more aspects of the present disclosure. The antennas 616 may further receive data messages transmitted from other devices and provide the received data messages for processing and/or demodulation at the transceiver 610. The transceiver 610 may provide the demodulated and decoded data (e.g., HARQ codebook-based ACK/NACK feedback, etc.) to the PDSCH module 608 and/or the HARQ codebook module 609 for processing. The antennas 616 may include multiple antennas of similar or different designs in order to sustain multiple transmission links.

In some aspects, the transceiver 610 is configured to transmit one or more multi-user PDSCH communications and/or one or more unicast PDSCH communications, for example, by coordinating with the PDSCH module 608. In some aspects, the transceiver 610 is configured to receive a first ACK/NACK feedback for the first TB and a second ACK/NACK feedback for the second TB based on a HARQ codebook, for example, by coordinating with the HARQ codebook module 609. The HARQ codebook may be for the first TB associated with the multi-user PDSCH communication and the second TB associated with the unicast PDSCH communication.

In some aspects, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

The present disclosure provides techniques for supporting a dynamic HARQ codebook when unicast and multi-user PDSCH communications are communicated between the BS 105 and the UE 115. In some aspects, the BS 105 and the UE 115 may communicate, based on a separate MUP HARQ codebook and a separate unicast HARQ codebook, ACK/NACK feedbacks for multi-user PDSCH communications and unicast PDSCH communications in different HARQ ACK/NACK reporting occasions, as will be discussed in more detail at least at, for example, aspects of FIGS. 7A-7C and 8A-8E. In some aspects, the BS 105 and the UE 115 may communicate, based on a single HARQ codebook, ACK/NACK feedbacks for multi-user PDSCH communications and unicast PDSCH communications in the same HARQ ACK/NACK reporting occasion, as will be discussed in more detail at least at, for example, aspects of FIGS. 9A-9C and 10A-10E. In some aspects, the BS 105 and the UE 115 may communicate, based on a concatenated MUP HARQ codebook and unicast HARQ codebook, ACK/NACK feedbacks for multi-user PDSCH communications and unicast PDSCH communications in the same HARQ ACK/NACK reporting occasion, as will be discussed in more detail at least at, for example, aspects of FIGS. 11A-11C and 12A-12E.

Figure 7A:
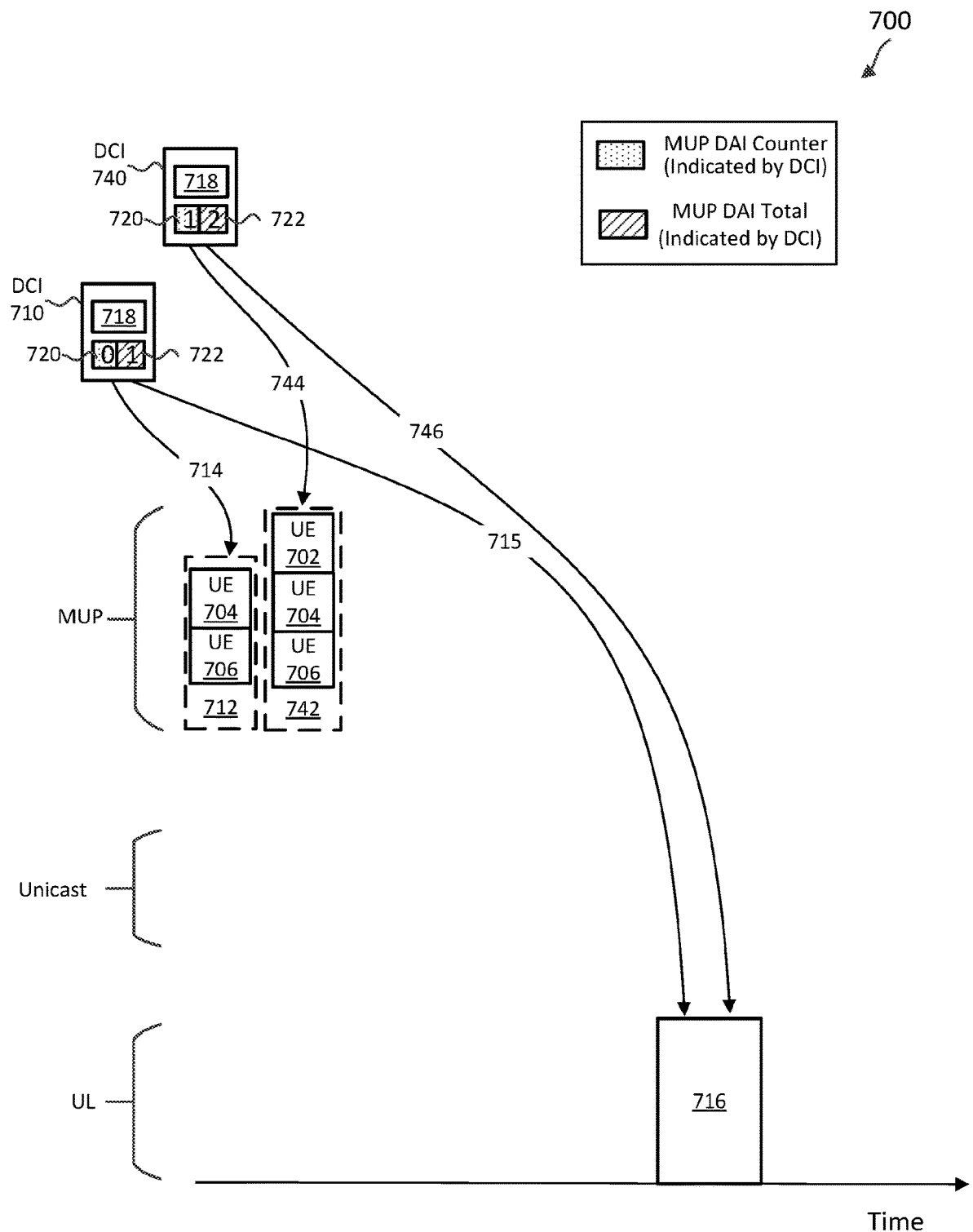
FIGS. 7A-7C illustrate a communication scheme for communicating ACK/NACK feedbacks for multi-user PDSCH communications and unicast PDSCH communications in different HARQ ACK/NACK reporting occasions according to one or more aspects of the present disclosure.
Figure 7B:
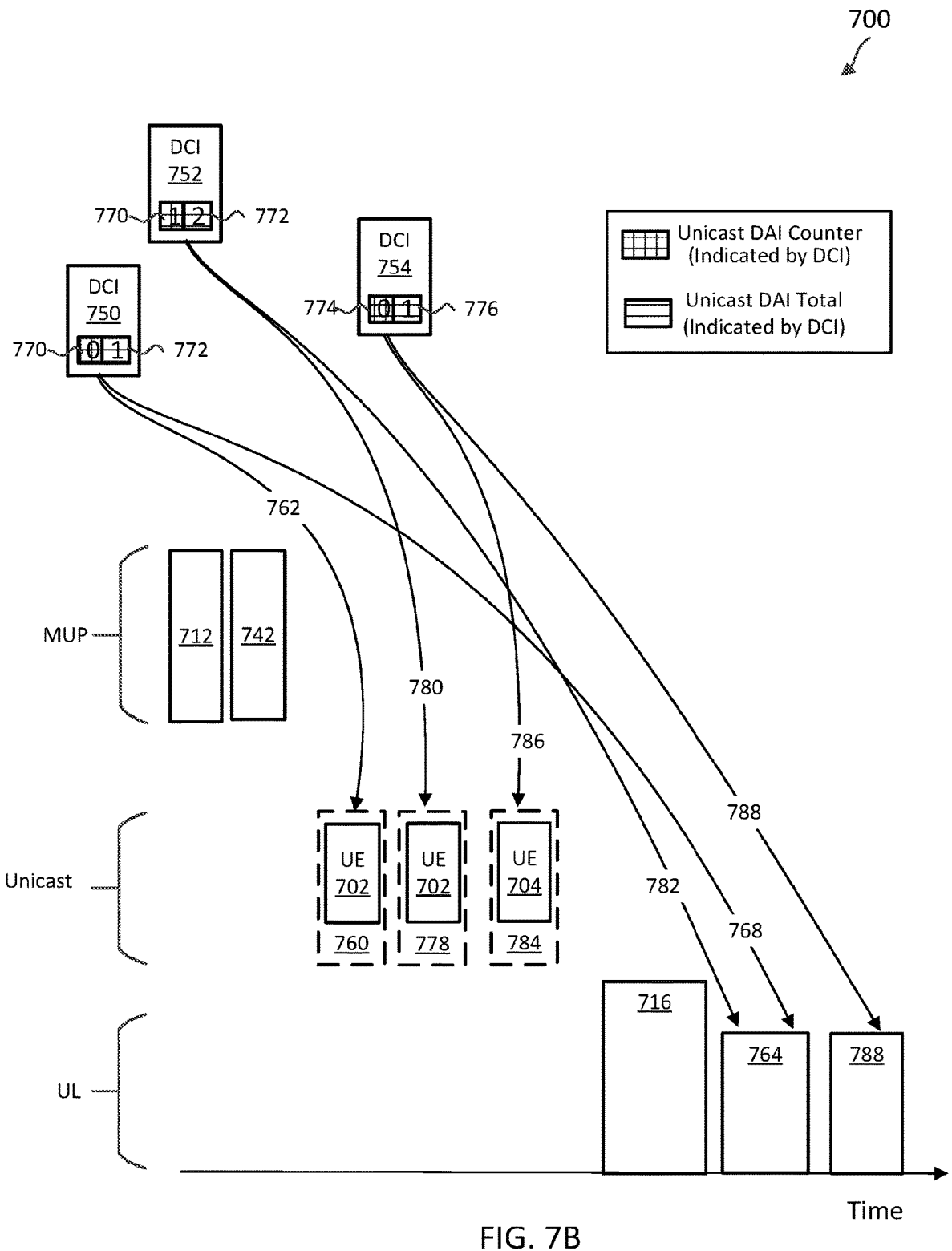
Figure 7C:
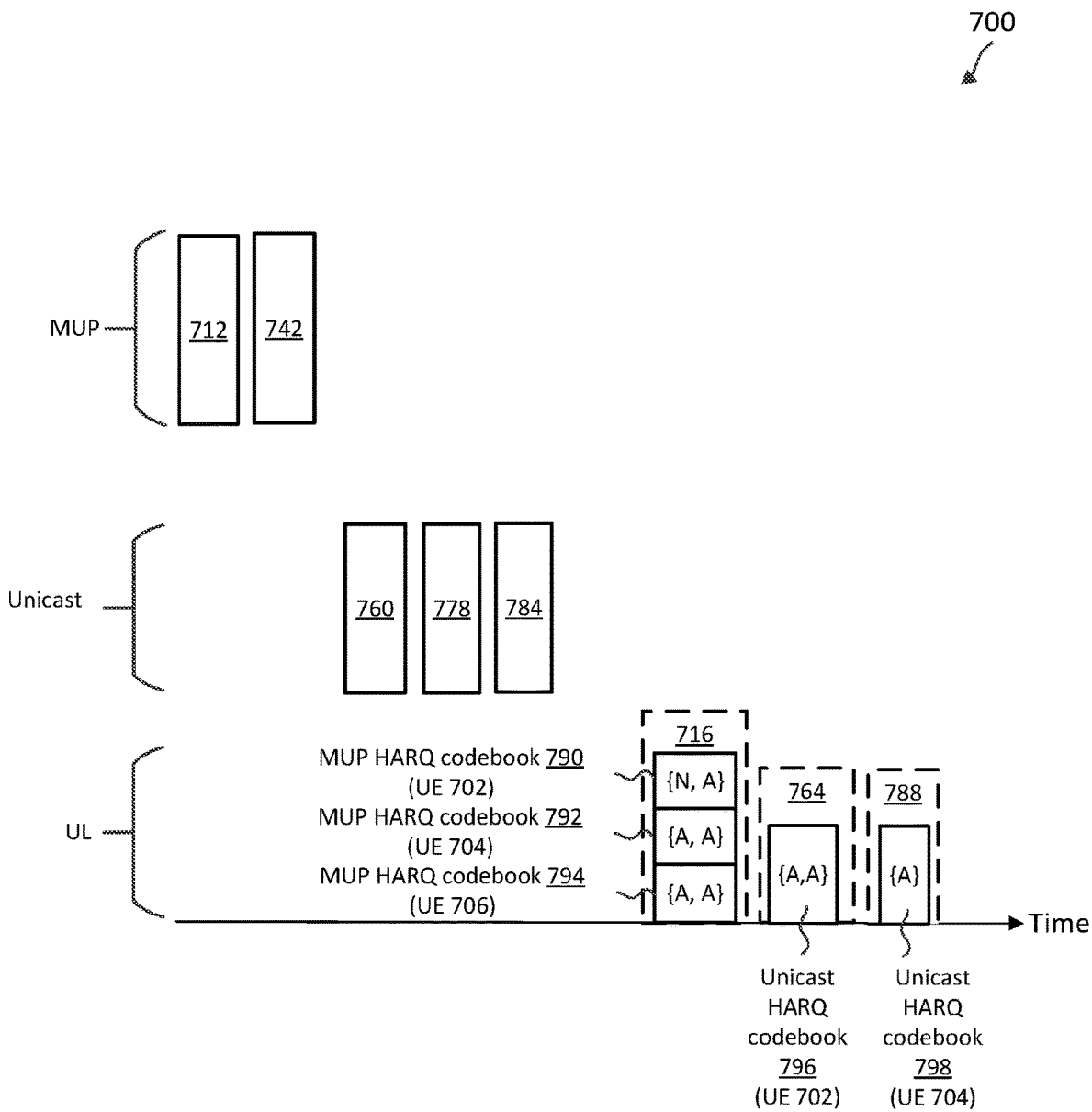

FIGS. 7A-7C illustrate a communication scheme 700 for communicating ACK/NACK feedbacks for multi-user PDSCH communications and unicast PDSCH communications in different HARQ ACK/NACK reporting occasions according to one or more aspects of the present disclosure. The scheme 700 may be employed by a BS 105 and a UE 115 in a network such as the network 100. In FIGS. 7A-7C, the x-axis represents time in some constant units. In the example illustrated in FIGS. 7A-7C, a UE 702, a UE 704, and a UE 706 may be configured to report a MUP HARQ codebook and a unicast HARQ codebook at different times. In other words, each of the UEs 702, 704, and 706 may use different HARQ ACK/NACK reporting occasions for transmitting ACK/NACK feedbacks for multi-user PDSCH communications and for unicast PDSCH communications. Each of the UEs 702, 704, and 706 may correspond to the UE 115, 500.

FIGS. 8A-8E will be discussed relative to FIGS. 7A-7C (and vice versa) to better understand concepts related to communicating ACK/NACK feedbacks for multi-user PDSCH communications and unicast PDSCH communications in different HARQ ACK/NACK reporting occasions. FIGS. 8A-8E illustrate a group DAI counter, a unicast DAI counter, and/or ACK/NACK feedback that are each separately maintained by a UE according one or more aspects of the present disclosure. A UE may maintain the group DAI counter and the unicast DAI counter for keeping track of the number of multi-user PDSCH communications and the number of unicast PDSCH communications, respectively, received by the UE for reporting ACK/NACK feedbacks. Additionally, the UE may determine and keep track of ACK/NACK feedbacks associated with multi-user PDSCH communications and unicast PDSCH communications to transmit the ACK/NACK feedbacks based on a determined HARQ codebook.

In FIG. 7A, a BS 105 may transmit to a first group of UEs, a DCI 710 indicating a DL grant that references a multi-user PDSCH communication 712 (as shown by an arrow 714), a HARQ ACK/NACK reporting occasion 716 for the multi-user PDSCH communication 712 (as shown by an arrow 715), and a group-RNTI 718. The first group of UEs may include the UE 704 and the UE 706, which may monitor for the DCI 710 indicating the group-RNTI 718. The UE 704 and the UE 706 may detect and decode the DCI 710. As discussed above in relation to aspects of, for example, FIG. 3, the UEs 704 and 706 may determine whether the multi-user PDSCH communication 712 is addressed to the respective UE (e.g., via a matching user identifier in a sub-header (not shown in FIG. 7A)). If the UEs 704 and 706 determine that the multi-user PDSCH communication 712 is addressed to the respective UE, then the UEs 704 and 706 may determine, based on the reference to the multi-user PDSCH communication 712, a location of the multi-user PDSCH communication 712.

The BS 105 may transmit the multi-user PDSCH communication 712 including a TB (e.g., aggregated TB corresponding the aggregated TB 306 in FIG. 3) for the UE 704 and the UE 706 to the first group of UEs, which may decode the multi-user PDSCH communication 712 based on the DCI 710. The DCI 710 may indicate a set of DAI fields including a group DAI counter 720 and a group DAI total 722. The BS 105 may set the group DAI counter 720 to zero based on transmitting the multi-user PDSCH communication 712 to the first group of UEs and may set the group DAI total 722 to one based on expecting one unicast ACK/NACK feedback from the first group of UEs. A sum of one and the group DAI counter 720 in the DCI 710 (e.g., zero) may indicate the number of multi-user PDSCH communications that has been transmitted by the BS 105 to a group of UEs for reporting in the HARQ ACK/NACK reporting occasion 716. After transmission of the multi-user PDSCH communication 712, the BS 105 may update the group DAI counter 720 by incrementing it by one each time the BS 105 transmits another multi-user PDSCH communication to a group of UEs for reporting in the HARQ ACK/NACK reporting occasion 716. The group DAI total 722 may indicate the total number of ACK/NACK feedbacks for multi-user PDSCH communications that the BS expects and the UE should report in the HARQ ACK/NACK reporting occasion 716 to the BS 105.

Each of the UEs 702, 704, and 706 may maintain its own group DAI counter that keeps track of the number of multi-user PDSCH communications that has been received by the respective UE from the BS 105 for reporting in the HARQ ACK/NACK reporting occasion 716. As discussed, when the BS 105 transmits a multi-user PDSCH communication, the BS 105 may transmit the multi-user PDSCH communication to some UEs, but not other UEs in the group of UEs. Accordingly, one or more UEs may not receive the multi-user PDSCH communication from the BS 105. As will be further discussed herein, if a UE determines that it has missed a DCI, the UE may determine to transmit a NACK corresponding to the missing DCI event.

Figure 8A:
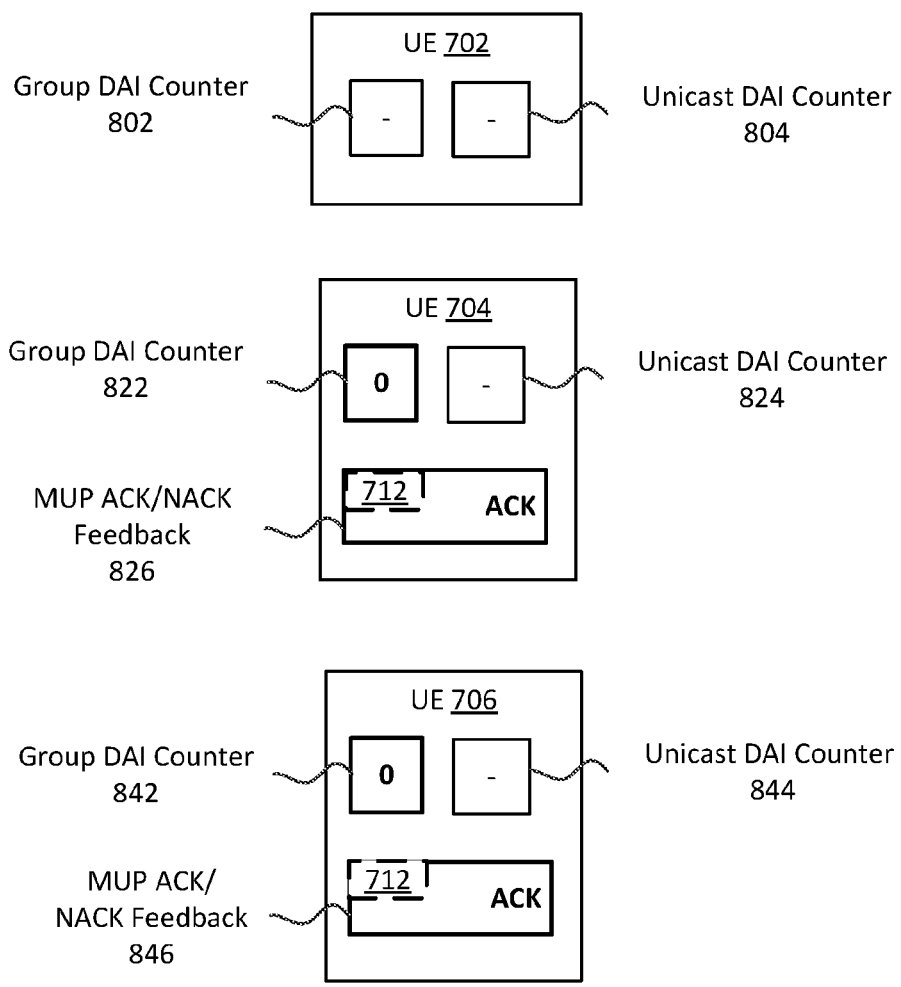
FIGS. 8A-8E illustrate a group DAI counter, a unicast DAI counter, and/or ACK/NACK feedback that are each separately maintained by a UE according one or more aspects of the present disclosure.

In FIG. 8A, the UE 702, 704, 706 may maintain a group DAI counter 802, 822, 842, respectively, to track the number of multi-user PDSCH communications received by the UE 702, 704, 706, respectively, for reporting in the HARQ ACK/NACK reporting occasion 716. The UE 702 did not receive the multi-user PDSCH communication 712 (in FIG. 7A) and accordingly does not set the group DAI counter 802 to zero. The group DAI counter 802 may be null or set to a predetermined value indicating that the UE has not yet received a multi-user PDSCH communication from the BS 105 for reporting an ACK/NACK feedback in the HARQ ACK/NACK reporting occasion 716.

In FIG. 8A, in response to the UE 704 receiving the multi-user PDSCH communication 712 (in FIG. 7A), the UE 704 may set the group DAI counter 822 to zero, which indicates that the UE 704 has received one multi-user PDSCH communication from the BS 105 for reporting an ACK/NACK feedback in the HARQ ACK/NACK reporting occasion 716. The UE 704 may determine a MUP ACK/NACK feedback 826 based on decoding the multi-user PDSCH communication 712 and/or comparing the group DAI counter 720 indicated by the DCI 710 in FIG. 7A and the group DAI counter 822 that is maintained by the UE 704. In some aspects, the UE 704 may determine whether the group DAI counter 720 indicated by the DCI 710 in FIG. 7A matches the group DAI counter 822 in FIG. 8A and/or a result of decoding the multi-user PDSCH communication 712 (e.g., successful or unsuccessful). The UE 704 may determine that the MUP ACK/NACK feedback 826 for the multi-user PDSCH communication 712 is an ACK if the group DAI counter 720 indicated by the DCI 710 in FIG. 7A matches the group DAI counter 822 in FIG. 8A and decoding the multi-user PDSCH communication 712 is successful. The UE 704 may determine that the MUP ACK/NACK feedback 826 is a NACK if the group DAI counter 720 indicated by the DCI 710 in FIG. 7A does not match the group DAI counter 822 in FIG. 8A or decoding the multi-user PDSCH communication 712 is unsuccessful. The group DAI counter 720 indicated by the DCI 710 (e.g., zero) matches the group DAI counter 822 in FIG. 8A (e.g., zero). In the example illustrated in FIG. 8A, the UE 704 determines that the MUP ACK/NACK feedback 826 for the multi-user PDSCH communication 712 is an ACK. For the UE 704, the number of MUP ACK/NACK feedbacks for multi-user PDSCH communications (e.g., one) matches the DAI total 722 indicated by the DCI 710 in FIG. 7A (e.g., one).

In FIG. 8A, in response to the UE 706 receiving the multi-user PDSCH communication 712 (in FIG. 7A), the UE 706 may set the group DAI counter 842 to zero, which indicates that the UE 706 has received one multi-user PDSCH communication from the BS 105 for reporting an ACK/NACK feedback in the HARQ ACK/NACK reporting occasion 716. The UE 706 may determine a MUP ACK/NACK feedback 846 based on decoding the multi-user PDSCH communication 712 and/or comparing the group DAI counter 720 indicated by the DCI 710 in FIG. 7A and the group DAI counter 842 that is maintained by the UE 706. The UE 706 may perform similar actions to determine the MUP ACK/NACK feedback 846 for the multi-user PDSCH communication 712 as discussed for the UE 704 to determine the MUP ACK/NACK feedback 826. In the example illustrated in FIG. 8A, the UE 706 determines that the MUP ACK/NACK feedback 846 for the multi-user PDSCH communication 712 is an ACK. For the UE 706, the number of MUP ACK/NACK feedbacks for multi-user PDSCH communications (e.g., one) matches the DAI total 722 indicated by the DCI 710 in FIG. 7A (e.g., one).

As shown in FIG. 8A, the UE 702 may also maintain a unicast DAI counter 804, the UE 704 may maintain a unicast DAI counter 824, the UE 706 may maintain a unicast DAI counter 844. The unicast DAI counter 804, 824, and 844 will be discussed in further detail below in relation to, for example, at least aspects of FIGS. 8C-8E.

Referring back to FIG. 7A, after transmitting the DCI 710, the BS 105 may transmit to a second group of UEs, a DCI 740 indicating a DL grant that references a multi-user PDSCH communication 742 (as shown by an arrow 744) and indicating the HARQ ACK/NACK reporting occasion 716 for the multi-user PDSCH communication 742 (as shown by an arrow 746). The second group of UEs may include the UE 702, the UE 704, and the UE 706, which may monitor for the DCI 740 indicating the group-RNTI 718. The UEs 702, 704, and 706 may detect and decode the DCI 740 and determine whether the multi-user PDSCH communication 742 is addressed to the respective UE. If the UE 702, 704, and 706 determines that the multi-user PDSCH communication 742 is addressed to the respective UE, then the UE 702, 704, and 706 may determine, based on the reference to the multi-user PDSCH communication 742, a location of the multi-user PDSCH communication 742.

The BS 105 may transmit the multi-user PDSCH communication 742 including a TB (e.g., aggregated TB corresponding the aggregated TB 306 in FIG. 3) for the UE 702, the UE 704, and the UE 706 to the second group of UEs, which may decode the multi-user PDSCH communication 742 based on the DCI 740. The BS 105 may update the set of DAI fields including the group DAI counter 720 and the group DAI total 722 in the DCI 710 to determine these updated values in the DCI 740. For instance, the BS 105 may determine the group DAI counter 720 in the DCI 740 by incrementing the group DAI counter 720 in the DCI 710 by one to correspond to the transmission of the multi-user PDSCH communication 742 to the second group of UEs. Accordingly, the group DAI counter 720 in the DCI 740 becomes one (e.g., 0+1=1). A sum of one and the group DAI counter 720 in the DCI 740 (e.g., one) may indicate the number of multi-user PDSCH communications that has been transmitted by the BS 105 to a group of UEs for reporting in the HARQ ACK/NACK reporting occasion 716. Accordingly, the BS 105 has transmitted two multi-user PDSCH communications (e.g., multi-user PDSCH communications 712 and 742) to a group of UEs for reporting ACK/NACK feedbacks in the HARQ ACK/NACK reporting occasion 716 for the multi-user PDSCH communications.

Additionally, the BS 105 may determine the group DAI total 722 in the DCI 740 by incrementing the group DAI total 722 in the DCI 710 by one to correspond to the transmission of the multi-user PDSCH communication 742 to the second group of UEs. Accordingly, the group DAI total 722 in the DCI 740 becomes two (e.g., 1+1=2). Accordingly, the BS 105 may expect two ACK/NACK feedbacks for the multi-user PDSCH communications in the HARQ ACK/NACK reporting occasion 716 and the second group of UEs may determine to transmit two ACK/NACK feedbacks for the multi-user PDSCH communications in the HARQ ACK/NACK reporting occasion 716.

Figure 8B:
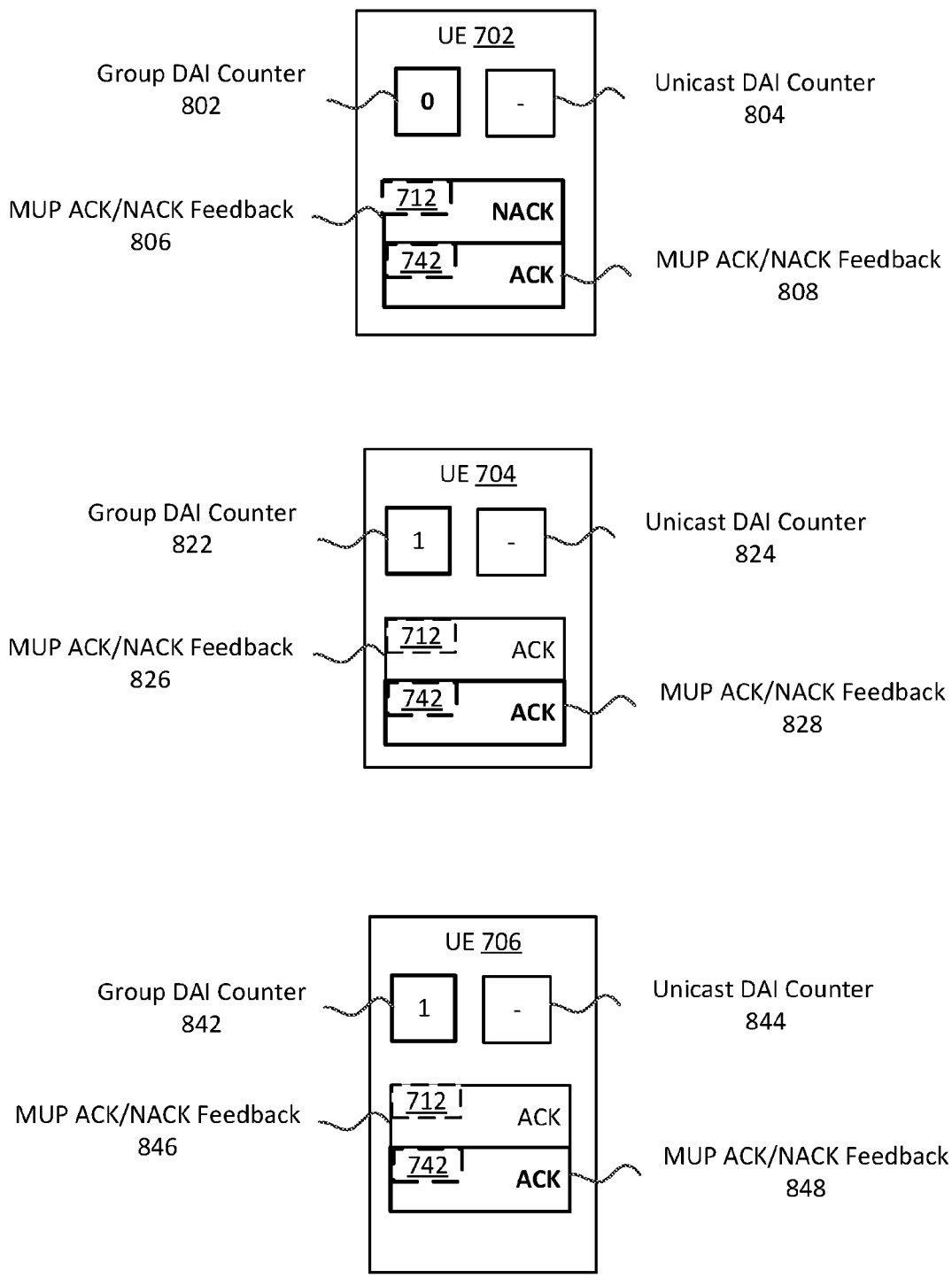

In FIG. 8B, in response to the UE 702 receiving the multi-user PDSCH communication 742 (in FIG. 7A), the UE 702 may set the group DAI counter 802 to zero, which indicates that the UE 702 has received one multi-user PDSCH communication from the BS 105 for reporting an ACK/NACK feedback in the HARQ ACK/NACK reporting occasion 716. The UE 702 may compare the group DAI counter 720 indicated by the DCI 740 in FIG. 7A (e.g., one) and the group DAI counter 802 in FIG. 8B that is maintained by the UE 702 (e.g., zero) and determine that they do not match. Accordingly, the UE 702 may determine that the UE 702 missed a DCI event and that a MUP ACK/NACK feedback 806 corresponding to the missed DCI event is a NACK. Accordingly, the UE 702 will report a NACK for the missed DCI event, which corresponds to the UE 702 not receiving the multi-user PDSCH communication 712 in FIG. 7A. After determining the MUP ACK/NACK feedback 806, the UE 702 may update the group DAI counter 802 by incrementing it by one.

Additionally, the UE 702 may determine a MUP ACK/NACK feedback 808 based on decoding the multi-user PDSCH communication 742 and/or comparing the group DAI counter 720 indicated by the DCI 740 in FIG. 7A and the updated group DAI counter 802, which is now one. The UE 702 may perform similar actions to determine the MUP ACK/NACK feedback 808 for the multi-user PDSCH communication 742 as discussed above in relation to the UE 704 determining the MUP ACK/NACK feedback 826. In the example illustrated in FIG. 8B, the UE 702 determines that the MUP ACK/NACK feedback 808 for the multi-user PDSCH communication 742 is an ACK. For the UE 702, the number of MUP ACK/NACK feedbacks for multi-user PDSCH communications (e.g., two, with one corresponding to the MUP ACK/NACK feedback 806 and one corresponding to the MUP ACK/NACK feedback 808) matches the DAI total 722 indicated by the DCI 740 in FIG. 7A (e.g., two).

In FIG. 8B, in response to the UE 704 receiving the multi-user PDSCH communication 742 (in FIG. 7A), the UE 704 may update the group DAI counter 822 in FIG. 8A from zero to one, as shown in FIG. 8B. The updated group DAI counter 822 in FIG. 8B is now one. The UE 704 may determine a MUP ACK/NACK feedback 828 based on decoding the multi-user PDSCH communication 742 and/or comparing the group DAI counter 720 indicated by the DCI 740 in FIG. 7A and the updated group DAI counter 822 in FIG. 8B. As shown in FIG. 8B, the UE 704 determines that the MUP ACK/NACK feedback 828 for the multi-user PDSCH communication 742 is an ACK. For the UE 704, the number of MUP ACK/NACK feedbacks for multi-user PDSCH communications (e.g., two, with one corresponding to the MUP ACK/NACK feedback 826 and one corresponding to the MUP ACK/NACK feedback 828) matches the DAI total 722 indicated by the DCI 740 in FIG. 7A (e.g., two).

In FIG. 8B, in response to the UE 706 receiving the multi-user PDSCH communication 742 (in FIG. 7A), the UE 706 may update the group DAI counter 842 in FIG. 8A from zero to one, as shown in FIG. 8B. The updated group DAI counter 842 in FIG. 8B is now one. The UE 706 may determine a MUP ACK/NACK feedback 848 based on decoding the multi-user PDSCH communication 742 and/or comparing the group DAI counter 720 indicated by the DCI 740 in FIG. 7A and the updated group DAI counter 842 in FIG. 8B. As shown in FIG. 8B, the UE 706 determines that the MUP ACK/NACK feedback 848 for the multi-user PDSCH communication 742 is an ACK. For the UE 706, the number of MUP ACK/NACK feedbacks for multi-user PDSCH communications (e.g., two, with one corresponding to the MUP ACK/NACK feedback 846 and one corresponding to the MUP ACK/NACK feedback 848) matches the DAI total 722 indicated by the DCI 740 in FIG. 7A (e.g., two).

Now referring to FIG. 7B, the BS 105 may transmit to the UE 702, a DCI 750 indicating a DL grant that references a unicast PDSCH communication 760 (as shown by an arrow 762) and indicating a HARQ ACK/NACK reporting occasion 764 for the unicast PDSCH communication 760 (as shown by an arrow 768). The UE 702 may detect and decode the DCI 750 and determine, based on the reference to the unicast PDSCH communication 760, a location of the unicast PDSCH communication 760.

The BS 105 may maintain a separate and independent set of DAI fields including a unicast DAI counter and a unicast DAI total for each UE. For example, the BS 105 may maintain a unicast DAI counter 770 and a unicast DAI total 772 for the UE 702 and may maintain a unicast DAI counter 774 and a unicast DAI total 776 for the UE 704. A sum of one and a unicast DAI counter in the DCI may indicate the number of unicast PDSCH communications that has been transmitted by the BS 105 to a given UE for reporting in a given HARQ ACK/NACK reporting occasion. After transmission of the unicast PDSCH communication, the BS 105 may update the unicast DAI counter by incrementing it by one each time the BS 105 transmits another unicast PDSCH communication to the given UE for reporting in the given HARQ ACK/NACK reporting occasion. The group DAI total may indicate the total number of ACK/NACK feedbacks for unicast PDSCH communications that the given UE should report in the given HARQ ACK/NACK reporting occasion to the BS 105.

The BS 105 may transmit the unicast PDSCH communication 760 including a TB for the UE 702 to the UE 702, which may decode the unicast PDSCH communication 760 based on the DCI 750. The DCI 750 may indicate the unicast DAI counter 770 and the unicast DAI total 772 for the UE 702. The BS 105 may set the unicast DAI counter 770 to zero based on transmitting the unicast PDSCH communication 760 to the UE 702 and may set the unicast DAI total 772 to one based on expecting one unicast ACK/NACK feedback from the UE 702. Each of the UEs 702, 704, and 706 may maintain its own unicast DAI counter that keeps track of the number of unicast PDSCH communications that has been received by the respective UE from the BS 105 for reporting in a particular HARQ ACK/NACK reporting occasion.

Figure 8C:
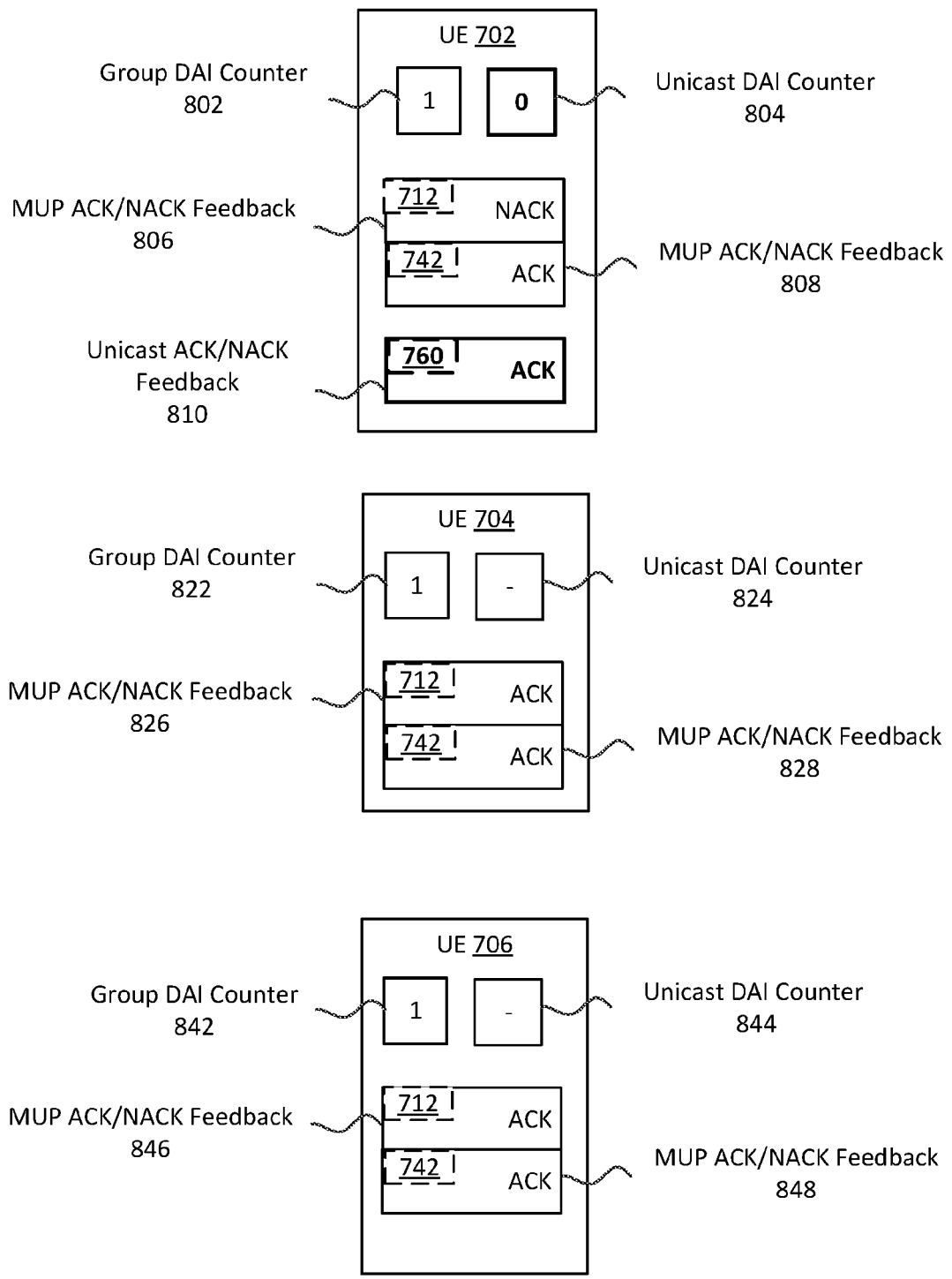

In FIG. 8C, the UE 702, 704, 706 may maintain a unicast DAI counter 804, 824, 844, respectively, to track the number of unicast PDSCH communications received by the UE 702, 704, 706, respectively, for reporting in a particular HARQ ACK/NACK reporting occasion. In response to the UE 702 receiving the unicast PDSCH communication 760 (in FIG. 7B), the UE 702 may set the unicast DAI counter 804 to zero, which indicates that the UE 702 has received one unicast PDSCH communication from the BS 105 for reporting an ACK/NACK feedback in the HARQ ACK/NACK reporting occasion 764. The UE 704 may determine a unicast ACK/NACK feedback 810 based on decoding the unicast PDSCH communication 760 and/or comparing the unicast DAI counter 770 indicated by the DCI 750 in FIG. 7B and the unicast DAI counter 804 that is maintained by the UE 702 in FIG. 8C. In some aspects, the UE 702 may determine whether the unicast DAI counter 770 indicated by the DCI 750 in FIG. 7B matches the unicast DAI counter 804 and/or a result of decoding the unicast PDSCH communication 760 (e.g., successful or unsuccessful). The UE 702 may determine that the unicast ACK/NACK feedback 810 for the unicast PDSCH communication 760 is an ACK if the unicast DAI counter 770 indicated by the DCI 750 in FIG. 7B matches the unicast DAI counter 804 in FIG. 8C and decoding the unicast PDSCH communication 760 is successful. The UE 702 may determine that the unicast ACK/NACK feedback 810 is a NACK if the unicast DAI counter 770 indicated by the DCI 750 in FIG. 7B does not match the unicast DAI counter 804 in FIG. 8C or decoding the unicast PDSCH communication 760 is unsuccessful. The unicast DAI counter 770 indicated by the DCI 750 (e.g., zero) matches the unicast DAI counter 804 in FIG. 8C (e.g., zero). In the example illustrated in FIG. 8C, the UE 702 determines that the unicast ACK/NACK feedback 810 for the unicast PDSCH communication 760 is an ACK. For the UE 702, the number of unicast ACK/NACK feedbacks for unicast PDSCH communications (e.g., one) matches the unicast DAI total 772 indicated by the DCI 750 in FIG. 7B (e.g., one).

Neither the UE 704 nor the UE 706 has received a unicast PDSCH communication yet (in FIG. 7C) and accordingly does not set the unicast DAI counter 824 or 844, respectively, to zero. The unicast DAI counter 824, 844 may be null or a predetermined value indicating that the respective UE has not yet received a unicast PDSCH communication from the BS 105 for reporting an ACK/NACK feedback in a HARQ ACK/NACK reporting occasion.

Referring back to FIG. 7B, after transmitting the DCI 750, the BS 105 may transmit to the UE 702, a DCI 752 indicating a DL grant that references a unicast PDSCH communication 778 (as shown by an arrow 780) and indicating the HARQ ACK/NACK reporting occasion 764 for the unicast PDSCH communication 778 (as shown by an arrow 782). The UE 702 may monitor for and detect the DCI 752. The UE 702 may determine, based on the reference to the unicast PDSCH communication 778, a location of the unicast PDSCH communication 778.

The BS 105 may transmit the unicast PDSCH communication 778 including a TB for the UE 702 to the UE 702, which may decode the unicast PDSCH communication 778 based on the DCI 752. The BS 105 may update the set of DAI fields including the unicast DAI counter 770 and the unicast DAI total 772 in the DCI 750 to determine these updated values in the DCI 752. For instance, the BS 105 may determine the unicast DAI counter 770 in the DCI 752 by incrementing the unicast DAI counter 770 in the DCI 750 by one to correspond to the transmission of the unicast PDSCH communication 778 to the UE 702. Accordingly, the unicast DAI counter 770 in the DCI 752 becomes one (e.g., 0+1=1). A sum of one and the unicast DAI counter 770 in the DCI 752 may indicate the number of unicast PDSCH communications that has been transmitted by the BS 105 to the UE 702 for reporting in the HARQ ACK/NACK reporting occasion 764. Accordingly, the BS 105 has transmitted two unicast PDSCH communications (e.g., unicast PDSCH communications 760 and 778) to the UE 702 for reporting ACK/NACK feedbacks in the HARQ ACK/NACK reporting occasion 764 for the unicast PDSCH communications.

Additionally, the BS 105 may determine the unicast DAI total 772 in the DCI 752 by incrementing the unicast DAI total 772 in the DCI 750 by one to correspond to the additional ACK/NACK feedback for the unicast PDSCH communication 778 from the UE 702. Accordingly, the unicast DAI total 772 in the DCI 752 becomes two (e.g., 1+1=2). Accordingly, the BS 105 may expect two ACK/NACK feedbacks for the unicast PDSCH communications in the HARQ ACK/NACK reporting occasion 764 and the UE 702 may determine to transmit two ACK/NACK feedbacks for the unicast PDSCH communications in the HARQ ACK/NACK reporting occasion 764.

Figure 8D:
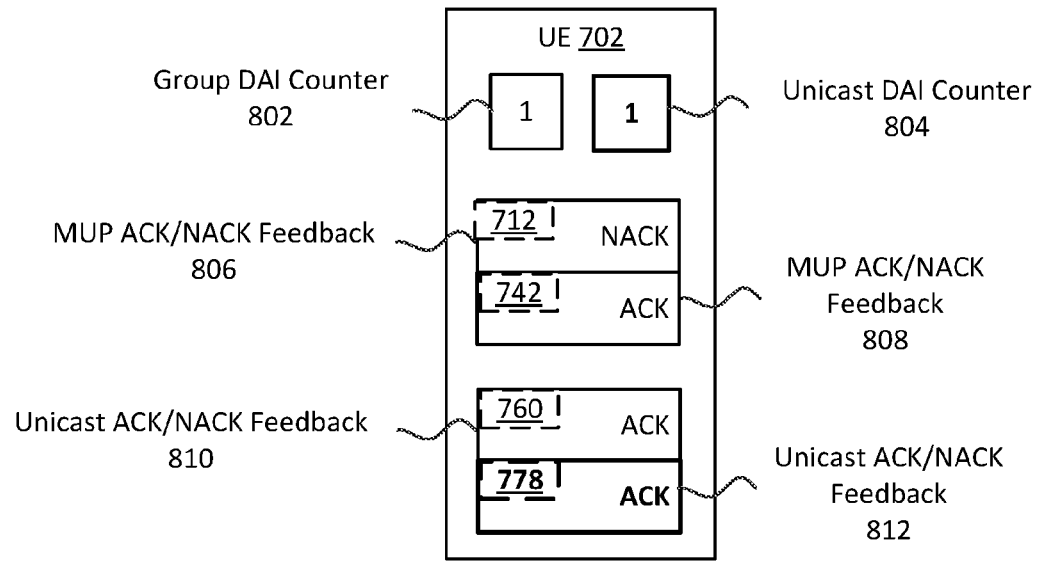

Now referring to FIG. 8D, in response to the UE 702 receiving the unicast PDSCH communication 778 (in FIG. 7B), the UE 702 may update the unicast DAI counter 804 to one. The UE 702 may perform similar actions to determine a unicast ACK/NACK feedback 812 for the unicast PDSCH communication 778 as discussed above in relation to the UE 702 determining the unicast ACK/NACK feedback 810. In the example illustrated in FIG. 8D, the UE 702 determines that the unicast ACK/NACK feedback 812 for the unicast PDSCH communication 778 is an ACK. For the UE 702, the number of unicast ACK/NACK feedbacks for unicast PDSCH communications (e.g., two) matches the unicast DAI total 772 indicated by the DCI 752 in FIG. 7B (e.g., two).

Referring back to FIG. 7B, after transmitting the DCI 752, the BS 105 may transmit to the UE 704, a DCI 754 indicating a DL grant that references a unicast PDSCH communication 784 (as shown by an arrow 786) and indicating the HARQ ACK/NACK reporting occasion 788 for the unicast PDSCH communication 784 (as shown by an arrow 788). The UE 704 may monitor for and detect the DCI 754. The UE 704 may decode the DCI 754 and determine, based on the reference to the unicast PDSCH communication 784, a location of the unicast PDSCH communication 784.

The BS 105 may transmit the unicast PDSCH communication 784 including a TB for the UE 704 to the UE 704, which may decode the unicast PDSCH communication 784 based on the DCI 754. The DCI 754 may indicate the unicast DAI counter 774 and the unicast DAI total 776 for the UE 704. The BS 105 may set the unicast DAI counter 774 to zero based on transmitting the unicast PDSCH communication 784 to the UE 704 and may set the unicast DAI total 776 to one based on expecting one ACK/NACK feedback for the unicast PDSCH communications (e.g., unicast PDSCH communication 784) from the UE 704.

Figure 8E:
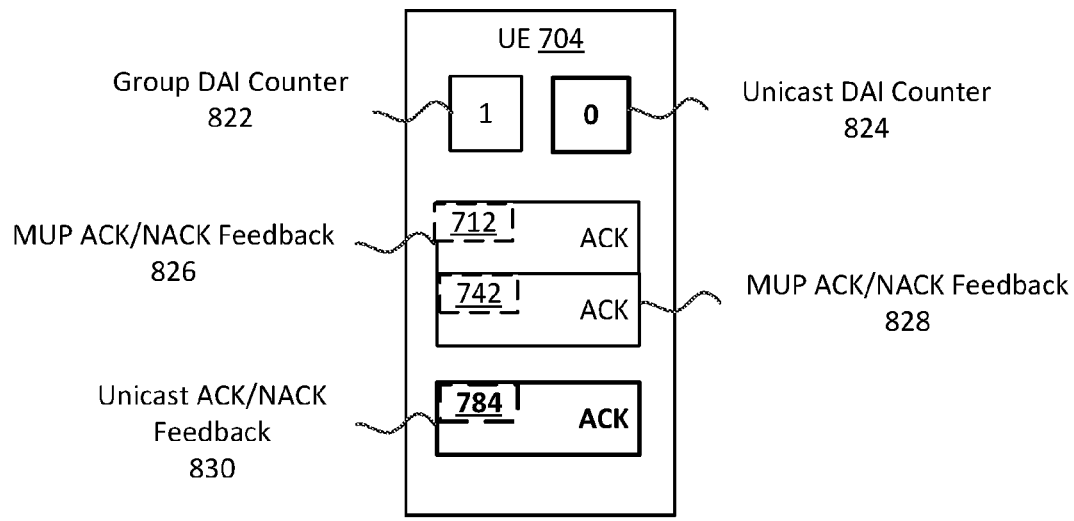

Now referring to FIG. 8E, in response to the UE 704 receiving the unicast PDSCH communication 784 (in FIG. 7B), the UE 704 may update the unicast DAI counter 824 to zero, which indicates that the UE 704 has received one unicast PDSCH communication from the BS 105 for reporting an ACK/NACK feedback in the HARQ ACK/NACK reporting occasion 788. The UE 704 may perform similar actions to determine a unicast ACK/NACK feedback 830 for the unicast PDSCH communication 784 as discussed above in relation to the UE 702 determining the unicast ACK/NACK feedback 810. In the example illustrated in FIG. 8E, the UE 704 determines that the unicast ACK/NACK feedback 830 for the unicast PDSCH communication 784 is an ACK. For the UE 704, the number of unicast ACK/NACK feedbacks for unicast PDSCH communications (e.g., one) matches the unicast DAI total 776 indicated by the DCI 754 in FIG. 7B (e.g., one). Accordingly, the BS 105 may expect one ACK/NACK feedback for the unicast PDSCH communications in the HARQ ACK/NACK reporting occasion 788 and the UE 704 may determine to transmit one ACK/NACK feedback for the unicast PDSCH communications in the HARQ ACK/NACK reporting occasion 788.

Now referring to FIG. 7C, each of the UEs 702, 704, and 706 may determine a MUP HARQ codebook associated with the multi-user PDSCH communications and a unicast HARQ codebook associated with the unicast PDSCH communications. For example, the UE 702 may determine a MUP HARQ codebook 790 for a first TB associated with the multi-user PDSCH communication 712 and for a second TB associated with the multi-user PDSCH communication 742. Using the HARQ ACK/NACK reporting occasion 716 for the multi-user PDSCH communications, the UE 702 may transmit the MUP ACK/NACK feedback 806 (e.g., NACK as shown in FIG. 8D) for the first TB and the MUP ACK/NACK feedback 808 (e.g., ACK as shown in FIG. 8D) for the second TB based on the MUP HARQ codebook 790. Accordingly, the MUP HARQ codebook 790 that is reported by the UE 702 in the HARQ ACK/NACK reporting occasion 716 indicates the MUP ACK/NACK feedbacks {N, A}. Additionally or alternatively, the UE 702 may determine a unicast HARQ codebook 796 for a third TB associated with the unicast PDSCH communication 760 and for a fourth TB associated with the unicast PDSCH communication 778. Using the HARQ ACK/NACK reporting occasion 764 for the unicast PDSCH communications, the UE 702 may transmit the unicast ACK/NACK feedback 810 (e.g., ACK as shown in FIG. 8D) for the third TB and the unicast ACK/NACK feedback 812 (e.g., ACK as shown in FIG. 8D) for the fourth TB based on the unicast HARQ codebook 796. Accordingly, the unicast HARQ codebook 796 that is reported by the UE 702 in the HARQ ACK/NACK reporting occasion 764 indicates the unicast ACK/NACK feedbacks {A, A}. The HARQ ACK/NACK reporting occasion 716 associated with multi-user PDSCH communications and the HARQ ACK/NACK reporting occasion 764 associated with unicast PDSCH communications for the UE 702 may correspond to different slots.

Similarly, the UE 704 may determine a MUP HARQ codebook 792 for the first TB associated with the multi-user PDSCH communication 712 and for the second TB associated with the multi-user PDSCH communication 742. Using the HARQ ACK/NACK reporting occasion 716 for the multi-user PDSCH communications, the UE 704 may transmit the MUP ACK/NACK feedback 826 (e.g., ACK as shown in FIG. 8E) for the first TB and the MUP ACK/NACK feedback 828 (e.g., ACK as shown in FIG. 8E) for the second TB based on the MUP HARQ codebook 792. Accordingly, the MUP HARQ codebook 792 that is reported by the UE 704 in the HARQ ACK/NACK reporting occasion 716 indicates the MUP ACK/NACK feedbacks {A, A}. Additionally or alternatively, using the HARQ ACK/NACK reporting occasion 788 for the unicast PDSCH communications, the UE 704 may determine a unicast HARQ codebook 798 for a fifth TB associated with the unicast PDSCH communication 784 and transmit the unicast ACK/NACK feedback 830 (e.g., ACK as shown in FIG. 8E) for the fifth TB based on the unicast HARQ codebook 798. Accordingly, the unicast HARQ codebook 798 that is reported by the UE 704 in the HARQ ACK/NACK reporting occasion 788 indicates the unicast ACK/NACK feedback {A}. The HARQ ACK/NACK reporting occasion 716 associated with multi-user PDSCH communications and the HARQ ACK/NACK reporting occasion 788 associated with unicast PDSCH communications for the UE 704 may correspond to different slots.

Similarly, the UE 706 may determine a MUP HARQ codebook 794 for the first TB associated with the multi-user PDSCH communication 712 and for the second TB associated with the multi-user PDSCH communication 742. Using the HARQ ACK/NACK reporting occasion 716 for the multi-user PDSCH communications, the UE 706 may transmit the MUP ACK/NACK feedback 846 (e.g., ACK as shown in FIG. 8C) for the first TB and the MUP ACK/NACK feedback 848 (e.g., ACK as shown in FIG. 8C) for the second TB based on the MUP HARQ codebook 794. Accordingly, the MUP HARQ codebook 794 that is reported by the UE 706 in the HARQ ACK/NACK reporting occasion 716 indicates the MUP ACK/NACK feedbacks {A, A}.

Figure 9A:
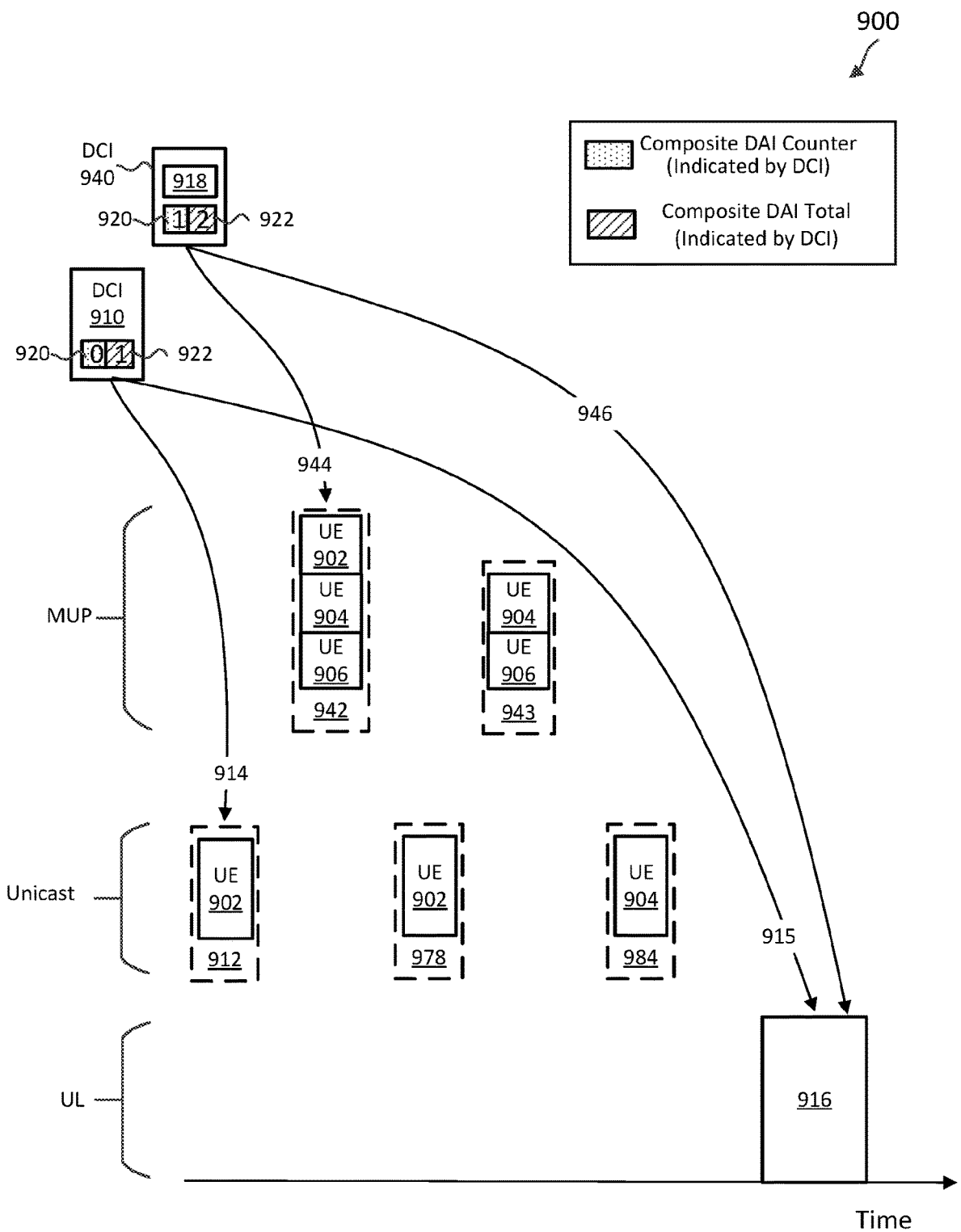
FIGS. 9A-9C illustrate a communication scheme for communicating ACK/NACK feedbacks for multi-user PDSCH communications and unicast PDSCH communications in the same HARQ ACK/NACK reporting occasions according to one or more aspects of the present disclosure.
Figure 9B:
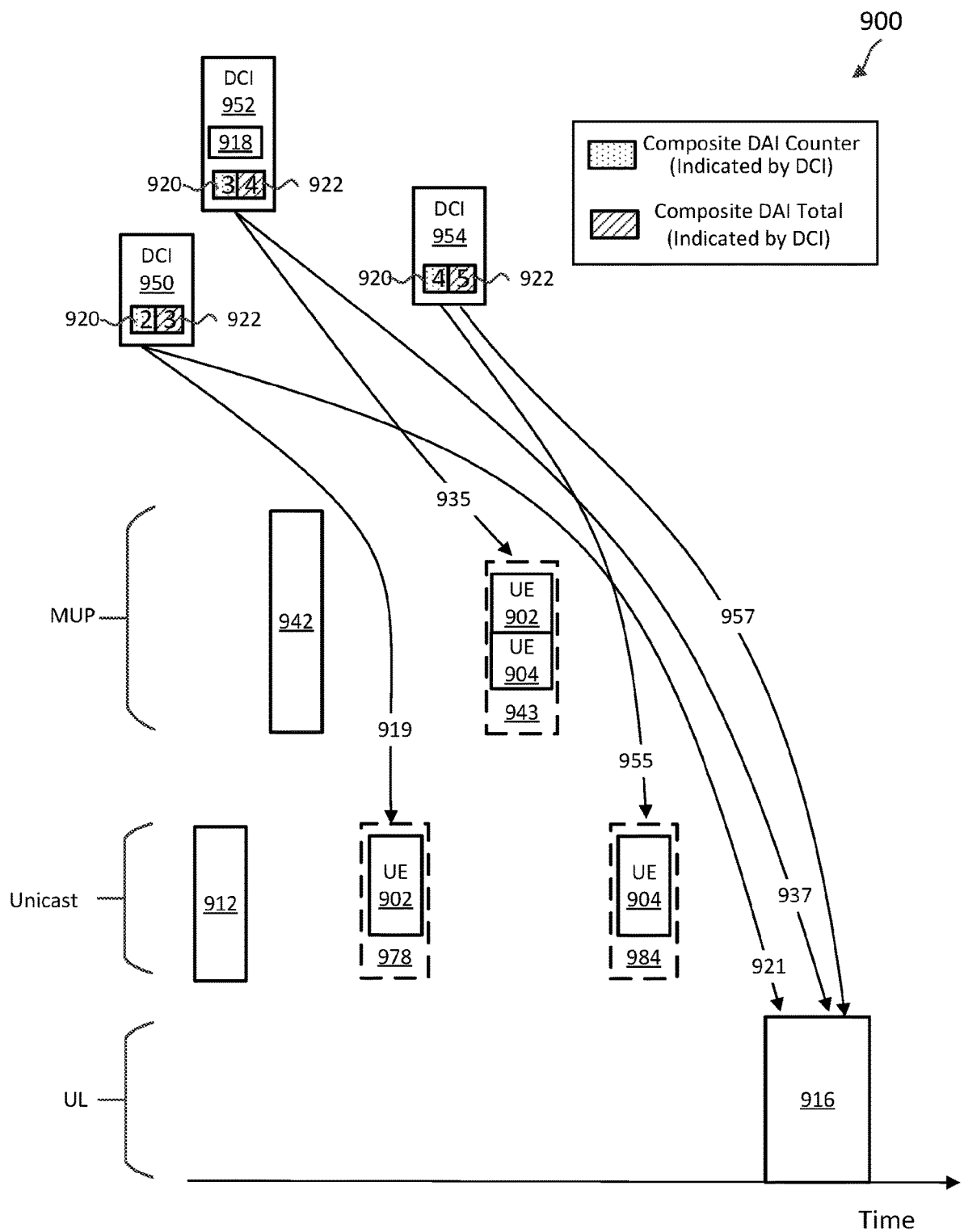
Figure 9C:
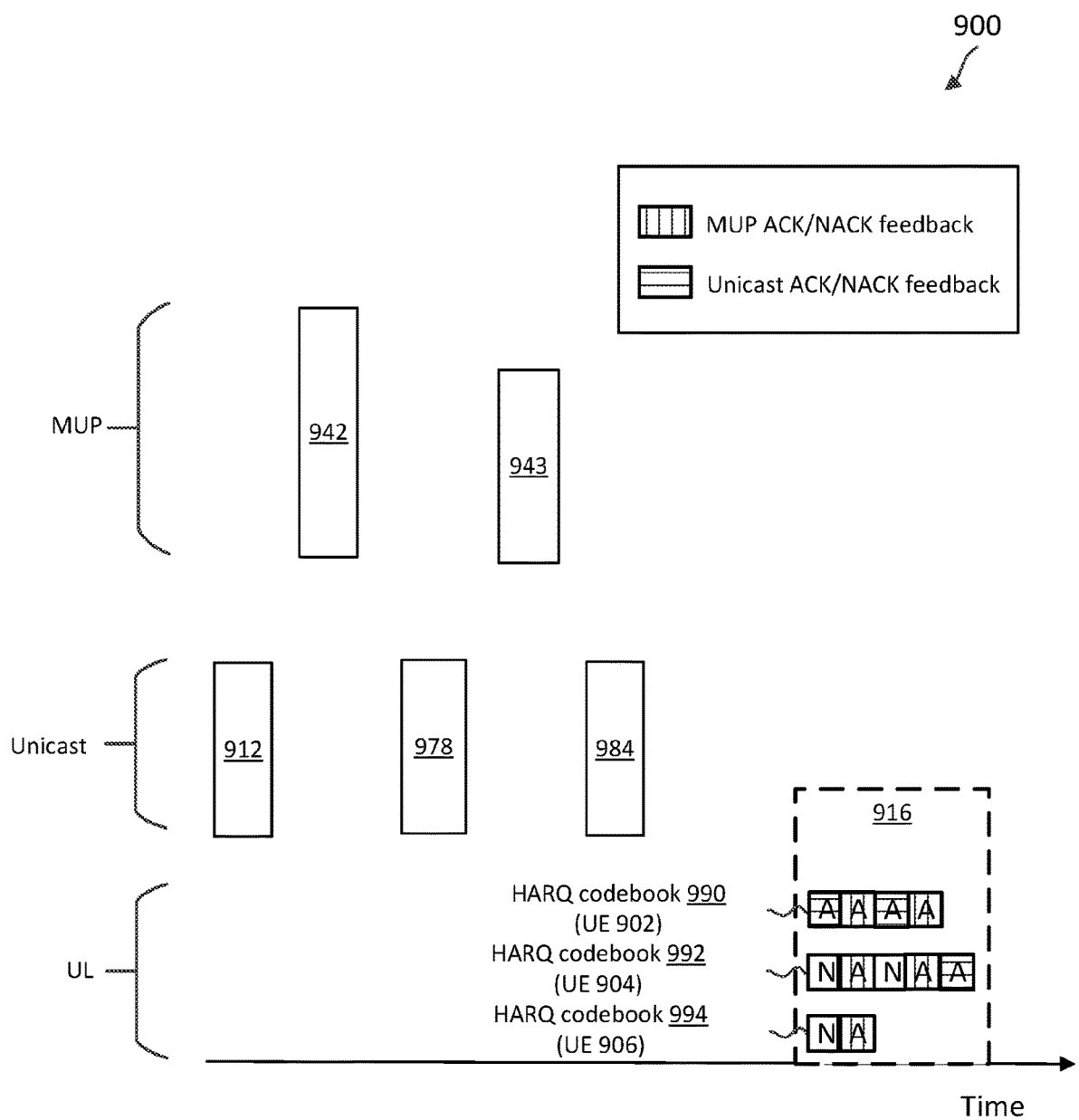

FIGS. 9A-9C illustrate a communication scheme 900 for communicating ACK/NACK feedbacks for multi-user PDSCH communications and unicast PDSCH communications in the same HARQ ACK/NACK reporting occasions according to one or more aspects of the present disclosure. The scheme 900 may be employed by a BS 105 and a UE 115 in a network such as the network 100. In FIGS. 9A-9C, the x-axis represents time in some constant units. In the example illustrated in FIGS. 9A-9C, a UE 902, a UE 904, and a UE 906 may be configured to report a single HARQ codebook based on multiplexing a MUP HARQ codebook and a unicast HARQ codebook. In other words, each of the UEs 902, 904, and 906 may use the same HARQ ACK/NACK reporting occasion for transmitting ACK/NACK feedbacks for multi-user PDSCH communications and for unicast PDSCH communications. Each of the UEs 902, 904, 906 may multiplex a MUP HARQ codebook and a unicast HARQ codebook together to form a single HARQ codebook. Additionally, each of the UEs 902, 904, and 906 may correspond to the UE 115, 500.

FIG. 10A-10E will be discussed relative to FIGS. 9A-9C (and vice versa) to better understand concepts related to communicating ACK/NACK feedbacks for multi-user PDSCH communications and unicast PDSCH communications using the same HARQ ACK/NACK reporting occasion. FIGS. 10A-10E illustrate a composite DAI counter and/or ACK/NACK feedback that are each separately maintained by a UE according one or more aspects of the present disclosure. A UE may maintain the composite DAI counter for keeping track of both the number of multi-user PDSCH communications and the number of unicast PDSCH communications received by the UE for reporting ACK/NACK feedbacks. Additionally, the UE may determine and keep track of ACK/NACK feedbacks associated with multi-user PDSCH communications and unicast PDSCH communications to transmit the ACK/NACK feedbacks based on a determined HARQ codebook.

In FIG. 9A, a BS 105 may transmit to a UE 902, a DCI 910 indicating a DL grant that references a unicast PDSCH communication 912 (as shown by an arrow 914) and indicating a HARQ ACK/NACK reporting occasion 916 for the unicast PDSCH communication 912 (as shown by an arrow 915). The UE 902 may monitor for and detect the DCI 910. The UE 902 may decode the DCI 910 and determine, based on the reference to the unicast PDSCH communication 912, a location of the unicast PDSCH communication 912.

The BS 105 may transmit the unicast PDSCH communication 912 including a TB for the UE 902, which may decode the unicast PDSCH communication 912 based on the DCI 910. The DCI 910 may indicate a set of DAI fields including a composite DAI counter 920 and a composite DAI total 922. The set of DAI fields including the composite DAI counter 920 and the composite DAI total 922 is common for all UEs being served in the group-RNTI 918.

The BS 105 may set the composite DAI counter 920 to zero based on transmitting a PDSCH communication (e.g., the unicast PDSCH communication 912) to the UE 902 and may set the composite DAI total 922 to one based on expecting one ACK/NACK feedback in the HARQ ACK/NACK reporting occasion 916. A sum of one and the composite DAI counter 920 in the DCI 910 (e.g., zero) may indicate the number of PDSCH communications including a TB (e.g., multi-user PDSCH communications and unicast PDSCH communications) that has been transmitted by the BS 105 to one or more UEs of a group of UEs for reporting in the HARQ ACK/NACK reporting occasion 916. After transmission of the a PDSCH communication (e.g., the unicast PDSCH communication 912), the BS 105 may update the composite DAI counter 920 by incrementing it by one each time the BS 105 transmits another PDSCH communication including a TB to one or more UEs for reporting in the HARQ ACK/NACK reporting occasion 916. The composite DAI total 922 may indicate the total number of ACK/NACK feedbacks (e.g., MUP ACK/NACK feedbacks and unicast ACK/NACK feedbacks) for PDSCH communications (e.g., multi-user PDSCH communications and unicast PDSCH communications) that the BS 105 expects and a UE should report in the HARQ ACK/NACK reporting occasion 916 to the BS 105. The BS 105 continues to update the composite DAI counter 920 and the composite DAI total 922 based on transmitting a PDSCH communication including a TB.

Each of the UEs 902, 904, and 906 may maintain its own composite DAI counter that keeps track of the number of PDSCH communications that has been received by the respective UE from the BS 105 for reporting in the HARQ ACK/NACK reporting occasion 916. When the BS 105 transmits the unicast PDSCH communication 912, the BS 105 may transmit the unicast PDSCH communication 912 to the UE 902, but not the UE 904 or the UE 906. As will be further discussed herein, if a UE determines that it has missed a DCI, the UE may determine to transmit a NACK corresponding to the missing DCI event. In some instances, a UE may successfully decode a DCI (based on group RNTI), but there may not be a TB for the UE in the multi-PUSCH. Thus, the UE may not update its DAI counter and the DCI is considered as missing.

Figure 10A:
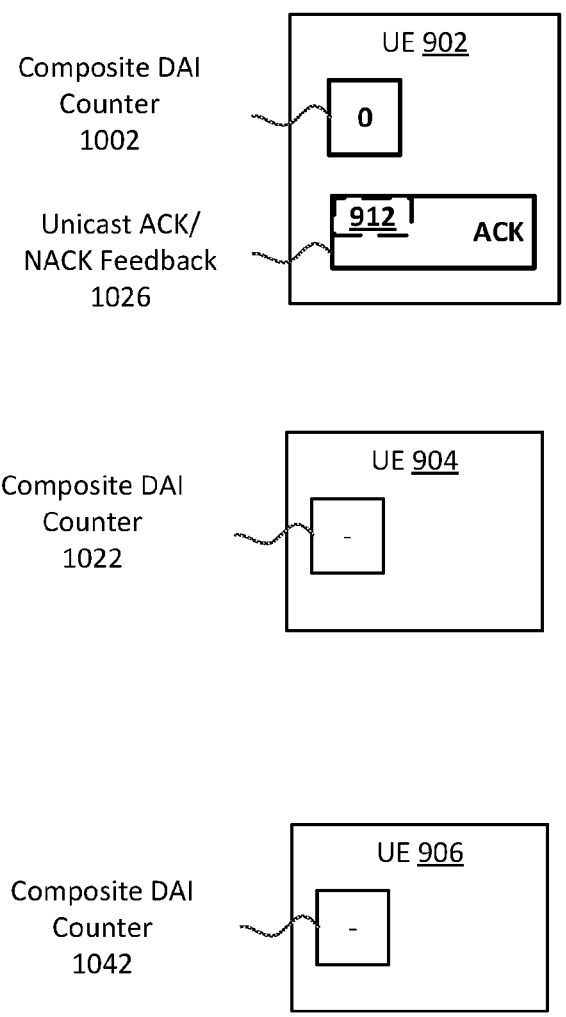
FIGS. 10A-10E illustrate a composite DAI counter and/or ACK/NACK feedback that are each separately maintained by a UE according one or more aspects of the present disclosure.

In FIG. 10A, the UE 902, 904, 906 may maintain a composite DAI counter 1002, 1022, 1042, respectively, to track the number of PDSCH communications (e.g., multi-user and unicast PDSCH communications) received by the UE 902, 904, 906, respectively, for reporting in the HARQ ACK/NACK reporting occasion 916. In response to the UE 902 receiving the unicast PDSCH communication 912 (in FIG. 9A), the UE 902 may set the composite DAI counter 1002 to zero, which indicates that the UE 902 has received one PDSCH communication (e.g., the unicast PDSCH communication 912) from the BS 105 for reporting a unicast ACK/NACK feedback 1004 in the HARQ ACK/NACK reporting occasion 916. The UE 902 may determine the unicast ACK/NACK feedback 1004 based on decoding the unicast PDSCH communication 912 and/or comparing the composite DAI counter 920 indicated by the DCI 910 in FIG. 9A and the composite DAI counter 1002 that is maintained by the UE 902 in FIG. 10A. In some aspects, the UE 902 may determine whether the composite DAI counter 920 indicated by the DCI 910 in FIG. 9A matches the composite DAI counter 1002 in FIG. 10A and/or a result of decoding the unicast PDSCH communication 912 (e.g., successful or unsuccessful). The UE 902 may determine that the unicast ACK/NACK feedback 1004 for the unicast PDSCH communication 912 is an ACK if the composite DAI counter 920 indicated by the DCI 910 in FIG. 9A matches the composite DAI counter 1002 in FIG. 10A and decoding the unicast PDSCH communication 912 is successful. The UE 902 may determine that the unicast ACK/NACK feedback 1004 is a NACK if the composite DAI counter 920 indicated by the DCI 910 in FIG. 9A does not match the composite DAI counter 1002 in FIG. 10A or decoding the unicast PDSCH communication 912 is unsuccessful. The composite DAI counter 920 indicated by the DCI 910 (e.g., zero) matches the composite DAI counter 1002 in FIG. 10A (e.g., zero). In the example illustrated in FIG. 10A, the UE 902 determines that the unicast ACK/NACK feedback 1004 for the unicast PDSCH communication 912 is an ACK. For the UE 902, the number of ACK/NACK feedbacks for PDSCH communications (e.g., one ACK/NACK feedback for the unicast PDSCH communication 912) matches the composite DAI total 922 indicated by the DCI 910 in FIG. 9A (e.g., one).

Neither the UE 704 nor the UE 706 received a PDSCH communication yet (in FIG. 9A) and accordingly does not set the composite DAI counter 1022 or 1042, respectively, to zero. The composite DAI counter 1022, 1042 may be null or set to a predetermined value indicating that the UE 904, 906 has not yet received a PDSCH communication from the BS 105 for reporting an ACK/NACK feedback in the HARQ ACK/NACK reporting occasion 916.

Referring back to FIG. 9A, after transmitting the DCI 910, the BS 105 may transmit to a first group of UEs, a DCI 940 indicating a DL grant that references a multi-user PDSCH communication 942 (as shown by an arrow 944), the HARQ ACK/NACK reporting occasion 916 for the multi-user PDSCH communication 942 (as shown by an arrow 946), and a group-RNTI 918. The first group of UEs may include the UE 902, the UE 904, and the UE 906, which may monitor for the DCI 940 indicating the group-RNTI 918. The UEs 902, 904, and 906 may detect and decode the DCI 940 and determine whether the multi-user PDSCH communication 942 is addressed to the respective UE. If the UE 902, 904, and 906 determines that the multi-user PDSCH communication 942 is addressed to the respective UE, then the UE 902, 904, and 906 may determine, based on the reference to the multi-user PDSCH communication 942, a location of the multi-user PDSCH communication 942.

The BS 105 may transmit the multi-user PDSCH communication 942 including a TB (e.g., aggregated TB corresponding the aggregated TB 306 in FIG. 3) for the UE 902, the UE 904, and the UE 906 to the first group of UEs, which may decode the multi-user PDSCH communication 942 based on the DCI 940. The BS 105 may update the set of DAI fields including the composite DAI counter 920 and the composite DAI total 922 in the DCI 910 to determine these updated values in the DCI 940. For instance, the BS 105 may determine the composite DAI counter 920 in the DCI 940 by incrementing the composite DAI counter 920 in the DCI 910 by one to correspond to the transmission of the multi-user PDSCH communication 942 to the first group of UEs. Accordingly, the composite DAI counter 920 in the DCI 940 becomes one (e.g., 0+1=1). A sum of one and the composite DAI counter 920 in the DCI 940 (e.g., one) may indicate the number of PDSCH communications including a TB that has been transmitted by the BS 105 to one or more UEs for reporting in the HARQ ACK/NACK reporting occasion 916. Accordingly, the BS 105 has transmitted two PDSCH communications (e.g., the unicast PDSCH communication 912 and the multi-user PDSCH communication 942) for reporting ACK/NACK feedbacks in the HARQ ACK/NACK reporting occasion 916.

Additionally, the BS 105 may determine the composite DAI total 922 in the DCI 940 by incrementing the composite DAI total 922 in the DCI 910 by one to correspond to the transmission of the multi-user PDSCH communication 942 to the second group of UEs. Accordingly, the composite DAI total 922 in the DCI 940 becomes two (e.g., 1+1=2). Accordingly, the BS 105 may expect two ACK/NACK feedbacks for the PDSCH communications in the HARQ ACK/NACK reporting occasion 916 and the first group of UEs may determine to transmit two ACK/NACK feedbacks for the PDSCH communications in the HARQ ACK/NACK reporting occasion 916.

Figure 10B:
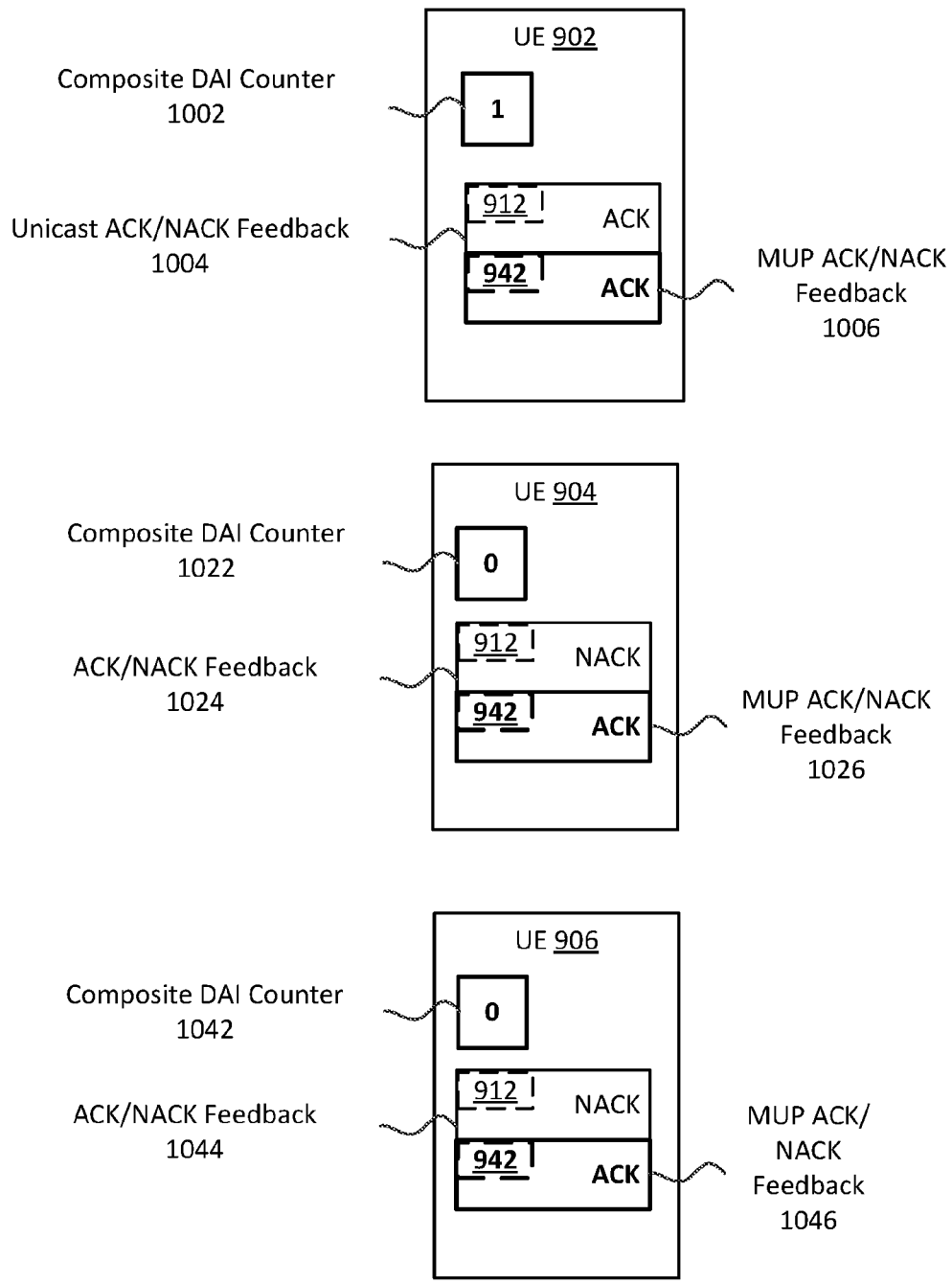

In FIG. 10B, in response to the UE 902 receiving the multi-user PDSCH communication 942 (in FIG. 9A), the UE 902 may set the composite DAI counter 1002 to one. The UE 902 may compare the composite DAI counter 920 indicated by the DCI 940 in FIG. 9A (e.g., one) and the composite DAI counter 1002 in FIG. 10B that is maintained by the UE 902 (e.g., one) and determine that they match. The UE 902 may decode the multi-user PDSCH communication 942. In the example illustrated in FIG. 10B, the UE 902 determines that the MUP ACK/NACK feedback 1006 for the multi-user PDSCH communication 942 is an ACK. For the UE 902, the number of ACK/NACK feedbacks for PDSCH communications (e.g., two, with one corresponding to the unicast ACK/NACK feedback 1004 and one corresponding to the MUP ACK/NACK feedback 1006) matches the DAI total 922 indicated by the DCI 940 in FIG. 9A (e.g., two).

Figure 10C:
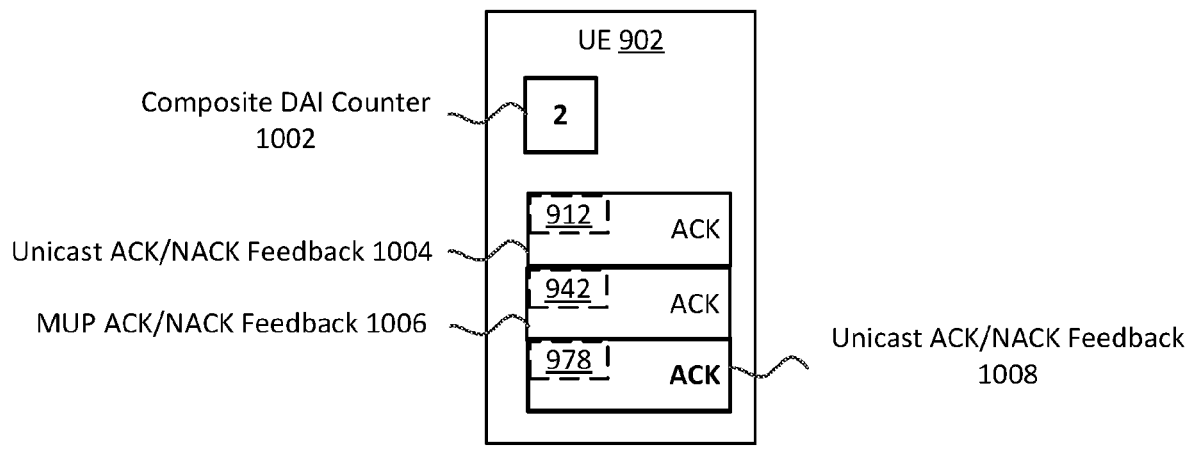

The UE 904 may compare the composite DAI counter 920 indicated by the DCI 940 in FIG. 9A (e.g., one) and the composite DAI counter 1022 in FIG. 10B that is maintained by the UE 704 (e.g., zero) and determine that they do not match. Accordingly, the UE 704 may determine that the UE 704 missed a DCI event and that an ACK/NACK feedback 1024 corresponding to the missed DCI event is a NACK. Accordingly, the UE 702 will report a NACK for the missed DCI event, which corresponds to the UE 904 not receiving the unicast PDSCH communication 912 that was addressed to the UE 902 in FIG. 9A. After determining the ACK/NACK feedback 1024, the UE 904 may update the composite DAI counter 1022 by incrementing it by one, as shown in FIG. 10C.

Additionally, the UE 904 may determine a MUP ACK/NACK feedback 1006 based on decoding the multi-user PDSCH communication 942 and/or comparing the composite DAI counter 920 indicated by the DCI 940 in FIG. 9A and the updated composite DAI counter 1022, which is now one. The UE 904 may perform similar actions to determine the MUP ACK/NACK feedback 1026 for the multi-user PDSCH communication 942 as discussed in the present disclosure. In the example illustrated in FIG. 10B, the UE 702 determines that the MUP ACK/NACK feedback 1026 for the multi-user PDSCH communication 942 is an ACK. For the UE 904, the number of ACK/NACK feedbacks for PDSCH communications (e.g., two, with one corresponding to the ACK/NACK feedback 1024 and one corresponding to the MUP ACK/NACK feedback 1026) matches the composite DAI total 922 indicated by the DCI 940 in FIG. 9A (e.g., two).

The UE 906 may perform similar actions as those discussed relative to the UE 904. For example, the UE 906 may set the composite DAI counter 1042 to zero, determine that an ACK/NACK feedback 1044 corresponding to a missed DCI event is an NACK, and determine that a MUP ACK/NACK feedback 1046 for the multi-user PDSCH communication 942 is an ACK.

Now referring to FIG. 9B, the BS 105 may transmit to the UE 902, a DCI 950 indicating a DL grant that references a unicast PDSCH communication 978 (as shown by an arrow 919) and indicating the HARQ ACK/NACK reporting occasion 916 for the unicast PDSCH communication 960 (as shown by an arrow 921). The UE 902 may detect and decode the DCI 950 and determine, based on the reference to the unicast PDSCH communication 978, a location of the unicast PDSCH communication 978.

The BS 105 may transmit the unicast PDSCH communication 978 including a TB for the UE 902, which may decode the unicast PDSCH communication 978 based on the DCI 950. The BS 105 may update the set of DAI fields including the composite DAI counter 920 and the composite DAI total 922 in the DCI 940 to determine these updated values in the DCI 950. For instance, the BS 105 may determine the composite DAI counter 920 in the DCI 950 by incrementing the composite DAI counter 920 in the DCI 940 by one to correspond to the transmission of the unicast PDSCH communication 978 to the UE 902. Accordingly, the composite DAI counter 920 in the DCI 950 becomes two (e.g., 1+1=2). A sum of one and the composite DAI counter 920 in the DCI 950 (e.g., two) may indicate the number of PDSCH communications including a TB that has been transmitted by the BS 105 to one or more UEs for reporting in the HARQ ACK/NACK reporting occasion 916. Accordingly, the BS 105 has transmitted three PDSCH communications (e.g., the unicast PDSCH communication 912, the multi-user PDSCH communication 942, and the unicast PDSCH communication 978) for reporting ACK/NACK feedbacks in the HARQ ACK/NACK reporting occasion 916.

Additionally, the BS 105 may determine the composite DAI total 922 in the DCI 950 by incrementing the composite DAI total 922 in the DCI 940 by one to correspond to the transmission of the unicast PDSCH communication 978 to the UE 902. Accordingly, the composite DAI total 922 in the DCI 950 becomes three (e.g., 1+2=3). Accordingly, the BS 105 may expect three ACK/NACK feedbacks for the PDSCH communications in the HARQ ACK/NACK reporting occasion 916 and the UE 902 may determine to transmit three ACK/NACK feedbacks for the PDSCH communications in the HARQ ACK/NACK reporting occasion 916.

The BS 105 may transmit the unicast PDSCH communication 978 including a TB for the UE 902 to the UE 902, which may decode the unicast PDSCH communication 978 based on the DCI 950. The DCI 950 may indicate the composite DAI counter 920 and the composite DAI total 922 for the UE 902.

In FIG. 10C, in response to the UE 902 receiving the unicast PDSCH communication 978 (in FIG. 9B), the UE 902 may update the composite DAI counter 1002 from one (in FIG. 10B) to two. The UE 902 may determine a unicast ACK/NACK feedback 1008 based on decoding the unicast PDSCH communication 978 and/or comparing the composite DAI counter 920 indicated by the DCI 950 in FIG. 9B and the composite DAI counter 1002 that is maintained by the UE 902 in FIG. 10C. In some aspects, the UE 902 may determine whether the composite DAI counter 1002 indicated by the DCI 950 in FIG. 9B matches the composite DAI counter 1002 in FIG. 10C and/or a result of decoding the unicast PDSCH communication 978 (e.g., successful or unsuccessful). The UE 902 may determine that the unicast ACK/NACK feedback 1008 for the unicast PDSCH communication 978 is an ACK if the composite DAI counter 920 indicated by the DCI 950 in FIG. 9B matches the composite DAI counter 1002 in FIG. 10C and decoding the unicast PDSCH communication 978 is successful. The UE 902 may determine that the unicast ACK/NACK feedback 1008 is a NACK if the composite DAI counter 920 indicated by the DCI 950 in FIG. 9B does not match the composite DAI counter 1002 in FIG. 10C or decoding the unicast PDSCH communication 978 is unsuccessful. The composite DAI counter 920 indicated by the DCI 950 (e.g., two) matches the composite DAI counter 1002 in FIG. 10C (e.g., two). In the example illustrated in FIG. 10C, the UE 902 determines that the unicast ACK/NACK feedback 1008 for the unicast PDSCH communication 978 is an ACK. For the UE 902, the number of ACK/NACK feedbacks for PDSCH communications (e.g., three) matches the composite DAI total 922 indicated by the DCI 950 in FIG. 9B (e.g., three).

Neither the UE 904 nor the UE 906 has received the unicast PDSCH communication 978 and accordingly neither will update the composite DAI counter 1022 or 1042, respectively, from their values in FIG. 10B.

Referring back to FIG. 9B, after transmitting the DCI 950, the BS 105 may transmit to a second group of UEs, a DCI 952 indicating a DL grant that references a multi-user PDSCH communication 943 (as shown by an arrow 935), indicating the HARQ ACK/NACK reporting occasion 916 for the multi-user PDSCH communication 943 (as shown by an arrow 937), and the group-RNTI 918. The second group of UEs may include the UE 902 and the UE 904, which may monitor for and detect the DCI 952. Each UE of the second group of UEs may determine that the DCI 952 is addressed to the respective UE and may determine, based on the reference to the multi-user PDSCH communication 943, a location of the multi-user PDSCH communication 943.

The BS 105 may transmit the multi-user PDSCH communication 943 including a TB (e.g., aggregated TB corresponding the aggregated TB 306 in FIG. 3) for the UE 902 and the UE 904 to the second group of UEs, which may decode the multi-user PDSCH communication 943 based on the DCI 952. The BS 105 may update the set of DAI fields including the composite DAI counter 920 and the composite DAI total 922 in the DCI 950 to determine these updated values in the DCI 952. For instance, the BS 105 may update the DAI counter 920 in the DCI 952 by incrementing the composite DAI counter 920 in the DCI 950 by one to correspond to the transmission of the multi-user PDSCH communication 943 to the second group of UEs including the UE 902 and the UE 904. Accordingly, the composite DAI counter 920 in the DCI 952 becomes three (e.g., 1+2=3). A sum of one and the composite DAI counter 920 in the DCI 952 (e.g., three) may indicate the number of PDSCH communications including a TB that has been transmitted by the BS 105 to one or more UEs for reporting in the HARQ ACK/NACK reporting occasion 916. Accordingly, the BS 105 has transmitted four PDSCH communications (e.g., the unicast PDSCH communication 912, the multi-user PDSCH communication 942, the unicast PDSCH communication 978, and the unicast PDSCH communication 943) for reporting ACK/NACK feedbacks in the HARQ ACK/NACK reporting occasion 916.

Additionally, the BS 105 may determine the composite DAI total 922 in the DCI 952 by incrementing the composite DAI total 922 in the DCI 950 by one to correspond to the transmission of the unicast PDSCH communication 943 to the second group of UEs. Accordingly, the composite DAI total 922 in the DCI 952 becomes four (e.g., 1+3=4). Accordingly, the BS 105 may expect four ACK/NACK feedbacks for the PDSCH communications in the HARQ ACK/NACK reporting occasion 916 and the UE 902 and the UE 904 may determine to transmit four ACK/NACK feedbacks for the PDSCH communications in the HARQ ACK/NACK reporting occasion 916.

Figure 10D:
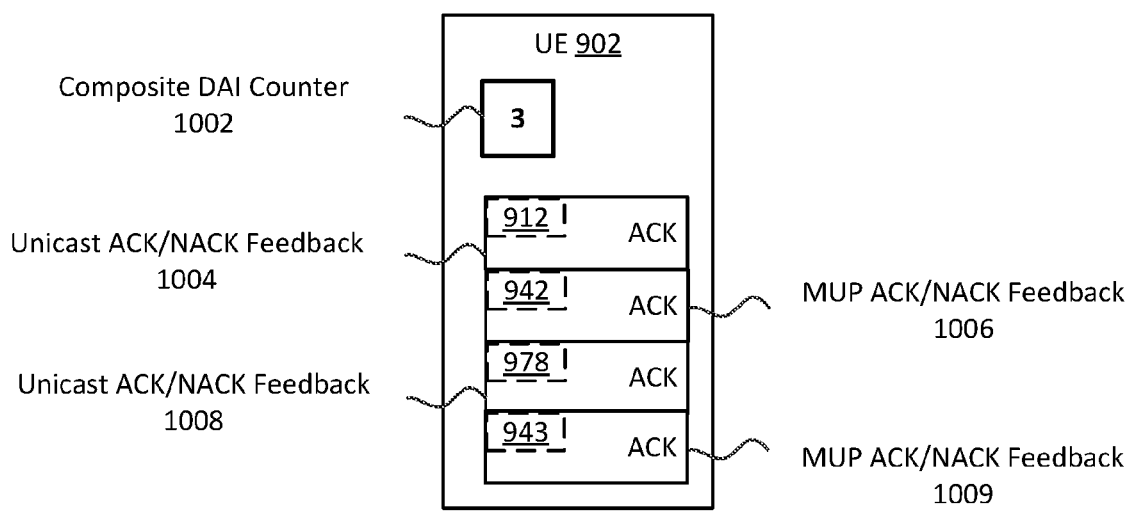
Figure 10D:
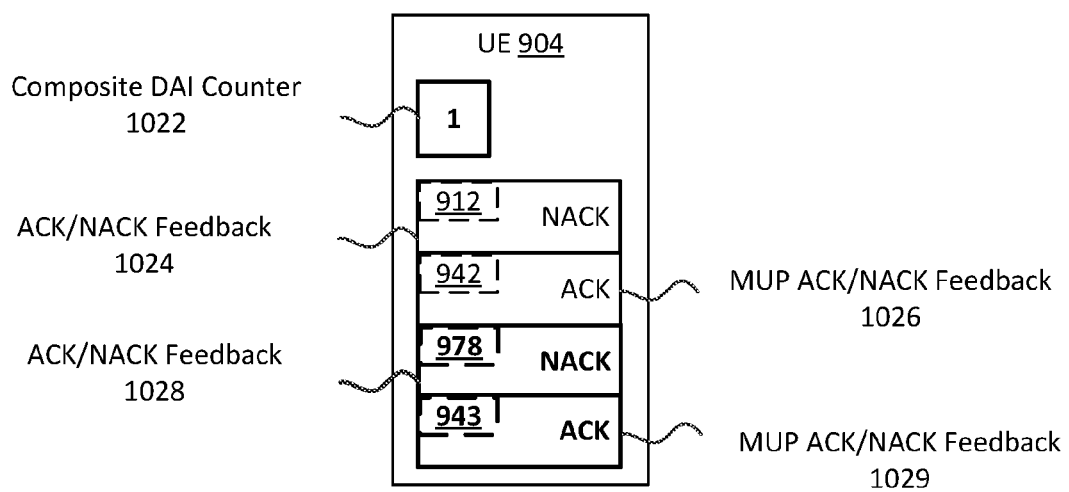

Now referring to FIG. 10D, in response to the UE 902 receiving the multi-user PDSCH communication 943 (in FIG. 9B), the UE 902 may update the composite DAI counter 1002 to three. The UE 902 may perform similar actions to determine a MUP ACK/NACK feedback 1009 for the multi-user PDSCH communication 943 as discussed above in relation to the UE 902 determining the MUP ACK/NACK feedback 1006. In the example illustrated in FIG. 10D, the UE 902 determines that the MUP ACK/NACK feedback 1009 for the multi-user PDSCH communication 943 is an ACK. For the UE 902, the number of ACK/NACK feedbacks for PDSCH communications (e.g., four, with one corresponding to the unicast ACK/NACK feedback 1004, one corresponding to the MUP ACK/NACK feedback 1006, one corresponding to the unicast ACK/NACK feedback 1008, and one corresponding to the MUP ACK/NACK feedback 1009) matches the composite DAI total 922 indicated by the DCI 952 in FIG. 9B (e.g., four).

Referring to FIG. 10D, the UE 904 may compare the composite DAI counter 920 indicated by the DCI 952 in FIG. 9B (e.g., three) and the composite DAI counter 1022 in FIG. 10D that is maintained by the UE 704 (e.g., one) and determine that they do not match. Accordingly, the UE 704 may determine that the UE 704 missed a DCI event and that an ACK/NACK feedback 1028 corresponding to the missed DCI event is a NACK. Accordingly, the UE 904 will report a NACK for the missed DCI event, which corresponds to the UE 904 not receiving the unicast PDSCH communication 978 that was addressed to the UE 902 in FIG. 9B. After determining the /NACK feedback 1028, the UE 904 may update the composite DAI counter 1022 by incrementing it by one. Accordingly, the composite DAI counter 1022 becomes two in FIG. 10D.

Additionally, the UE 904 may determine a MUP ACK/NACK feedback 1029 based on decoding the multi-user PDSCH communication 943 and/or comparing the composite DAI counter 920 indicated by the DCI 952 in FIG. 9B and the updated composite DAI counter 1022, which is now two. The UE 904 may determine the MUP ACK/NACK feedback 1020 for the multi-user PDSCH communication 943, as discussed in the present disclosure. In the example illustrated in FIG. 10D, the UE 904 determines that the MUP ACK/NACK feedback 1029 for the multi-user PDSCH communication 943 is an ACK. For the UE 904, the number of ACK/NACK feedbacks for PDSCH communications (e.g., four, with one corresponding to the ACK/NACK feedback 1024, one corresponding to the MUP ACK/NACK feedback 1026, one corresponding to the ACK/NACK feedback 1028, one corresponding to the MUP ACK/NACK feedback 1029) matches the composite DAI total 922 indicated by the DCI 952 in FIG. 9B (e.g., four).

Referring back to FIG. 9B, after transmitting the DCI 952, the BS 105 may transmit to the UE 904, a DCI 954 indicating a DL grant that references a unicast PDSCH communication 984 (as shown by an arrow 955) and indicating the HARQ ACK/NACK reporting occasion 916 for the unicast PDSCH communication 984 (as shown by an arrow 957). The UE 904 may monitor for and detect the DCI 954. The UE 904 may decode the DCI 954 and determine, based on the reference to the unicast PDSCH communication 984, a location of the unicast PDSCH communication 984.

The BS 105 may transmit the unicast PDSCH communication 984 including a TB for the UE 904 to the UE 904, which may decode the unicast PDSCH communication 984 based on the DCI 954. The DCI 954 may indicate the composite DAI counter 920 and the composite DAI total 922. As discussed, based on transmitting the unicast PDSCH communication 984, the BS 105 may update the composite DAI counter 920 to four and the composite DAI total 922 to five in the DCI 954.

Figure 10E:
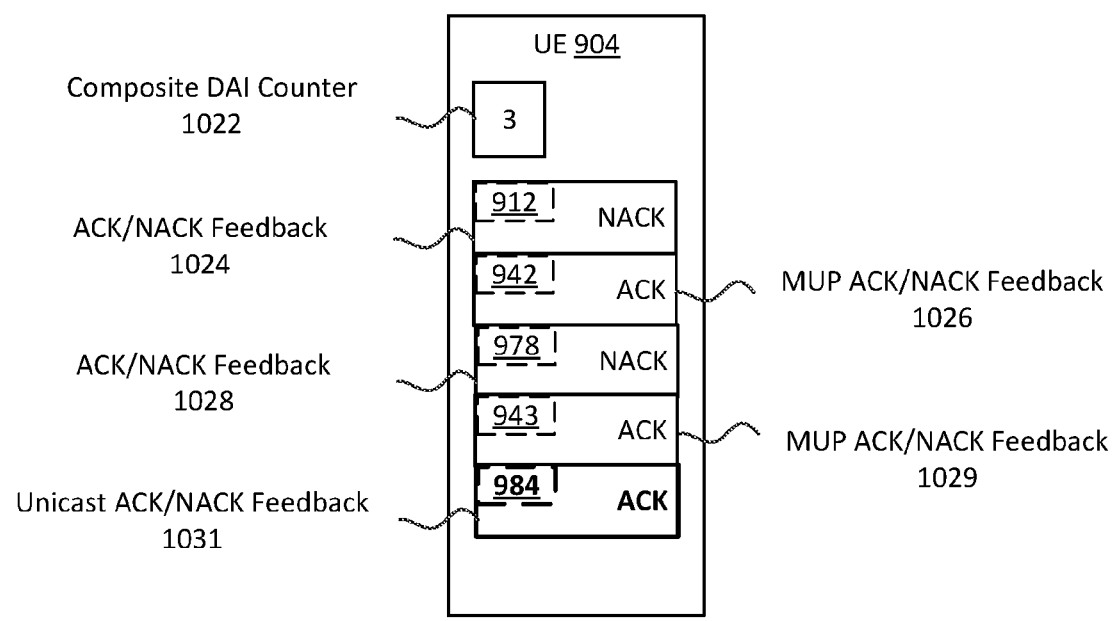

Now referring to FIG. 10E, in response to the UE 904 receiving the unicast PDSCH communication 984 (in FIG. 9B), the UE 904 may update the composite DAI counter 1022 from three to four. The UE 904 may perform similar actions to determine a unicast ACK/NACK feedback 1031 for the unicast PDSCH communication 984 as discussed above in relation to the UE 902 determining the unicast ACK/NACK feedback 1010. As shown in FIG. 10E, the UE 904 determines that the unicast ACK/NACK feedback 1031 for the unicast PDSCH communication 984 is an ACK. For the UE 904, the number of ACK/NACK feedbacks for PDSCH communications (e.g., five) matches the composite DAI total 922 indicated by the DCI 954 in FIG. 9B (e.g., five). Accordingly, the BS 105 may expect five ACK/NACK feedbacks for the PDSCH communications in the HARQ ACK/NACK reporting occasion 916 and the UE 904 may determine to transmit five ACK/NACK feedbacks for the PDSCH communications in the HARQ ACK/NACK reporting occasion 916.

Now referring to FIG. 9C, each of the UEs 902, 904, and 906 may determine a HARQ codebook associated with the PDSCH communications (e.g., multi-user PDSCH communications and unicast PDSCH communications). For example, the UE 902 may determine a HARQ codebook 990 at least for a first TB associated with the unicast PDSCH communication 912, for a second TB associated with the multi-user PDSCH communication 942, for a third TB associated with the unicast PDSCH communication 978, for a fourth TB associated with the multi-user PDSCH communication 943. Using the HARQ ACK/NACK reporting occasion 916 for PDSCH communications, the UE 902 may transmit the unicast ACK/NACK feedback 1004 (e.g., ACK as shown in FIG. 10D) for the first TB, the MUP ACK/NACK feedback 1006 (e.g., ACK as shown in FIG. 10D) for the second TB, the unicast ACK/NACK feedback 1008 (e.g., ACK as shown in FIG. 10D) for the third TB, and the MUP ACK/NACK feedback 1009 (e.g., ACK as shown in FIG. 10D) for the fourth TB based on the HARQ codebook 990. Accordingly, the HARQ codebook 990 that is reported by the UE 902 in the HARQ ACK/NACK reporting occasion 916 indicates the ACK/NACK feedbacks {A, A, A, A}. The first ACK/NACK feedback is unicast ACK/NACK feedback, the second ACK/NACK feedback is a MUP ACK/NACK feedback, the third ACK/NACK feedback is a unicast ACK/NACK feedback, and the fourth ACK/NACK feedback is a MUP ACK/NACK feedback.

Similarly, the UE 904 may determine a HARQ codebook 992 for a first NACK associated with the unicast PDSCH communication 912, for the second TB associated with the multi-user PDSCH communication 942, for a second NACK associated with the unicast PDSCH communication 978, for a fourth TB associated with the multi-user PDSCH communication 943, and for a fifth TB associated with the unicast PDSCH communication 984. Using the HARQ ACK/NACK reporting occasion 916 for PDSCH communications, the UE 904 may transmit the ACK/NACK feedback 1024 (e.g., NACK as shown in FIG. 10E), the MUP ACK/NACK feedback 1026 (e.g., ACK as shown in FIG. 10E) for the second TB, the ACK/NACK feedback 1028 (e.g., NACK as shown in FIG. 10E), the MUP ACK/NACK feedback 1029 (e.g., ACK as shown in FIG. 10E) for the fourth TB, and the unicast ACK/NACK feedback 1031 (e.g., ACK as shown in FIG. 10E) based on the HARQ codebook 992. Accordingly, the HARQ codebook 992 that is reported by the UE 904 in the HARQ ACK/NACK reporting occasion 916 indicates the ACK/NACK feedbacks {N, A, N, A, A}. The first ACK/NACK feedback is a NACK feedback, the second ACK/NACK feedback is a MUP ACK/NACK feedback, the third ACK/NACK feedback is a NACK feedback, the fourth ACK/NACK feedback is a MUP ACK/NACK feedback, and the fifth ACK/NACK feedback is a unicast ACK/NACK feedback.

Similarly, the UE 906 may determine a HARQ codebook 994 for a first NACK associated with the unicast PDSCH communication 912 and for the second TB associated with the multi-user PDSCH communication 942. Using the HARQ ACK/NACK reporting occasion 916 for PDSCH communications, the UE 906 may transmit the ACK/NACK feedback 1044 (e.g., NACK as shown in FIG. 10B) and the MUP ACK/NACK feedback 1046 (e.g., ACK as shown in FIG. 10B) based on the HARQ codebook 994. Accordingly, the HARQ codebook 994 that is reported by the UE 906 in the HARQ ACK/NACK reporting occasion 916 indicates the ACK/NACK feedbacks {N, A}. The first ACK/NACK feedback is a NACK feedback, and the second ACK/NACK feedback is a MUP ACK/NACK feedback.

Figure 11A:
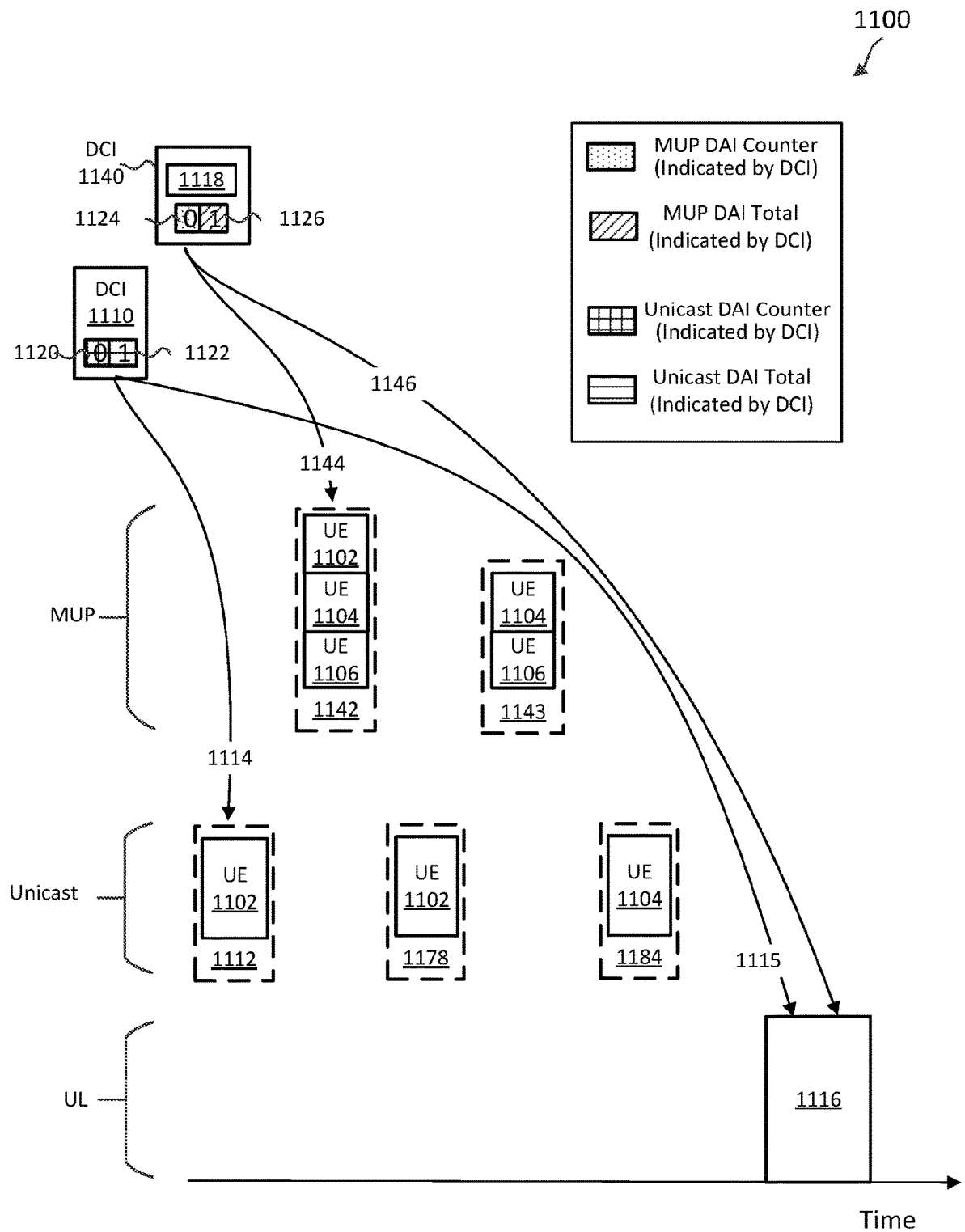
FIGS. 11A-11C illustrate a communication scheme for communicating ACK/NACK feedbacks for multi-user PDSCH communications and unicast PDSCH communications in a HARQ ACK/NACK reporting occasion according to one or more aspects of the present disclosure.
Figure 11B:
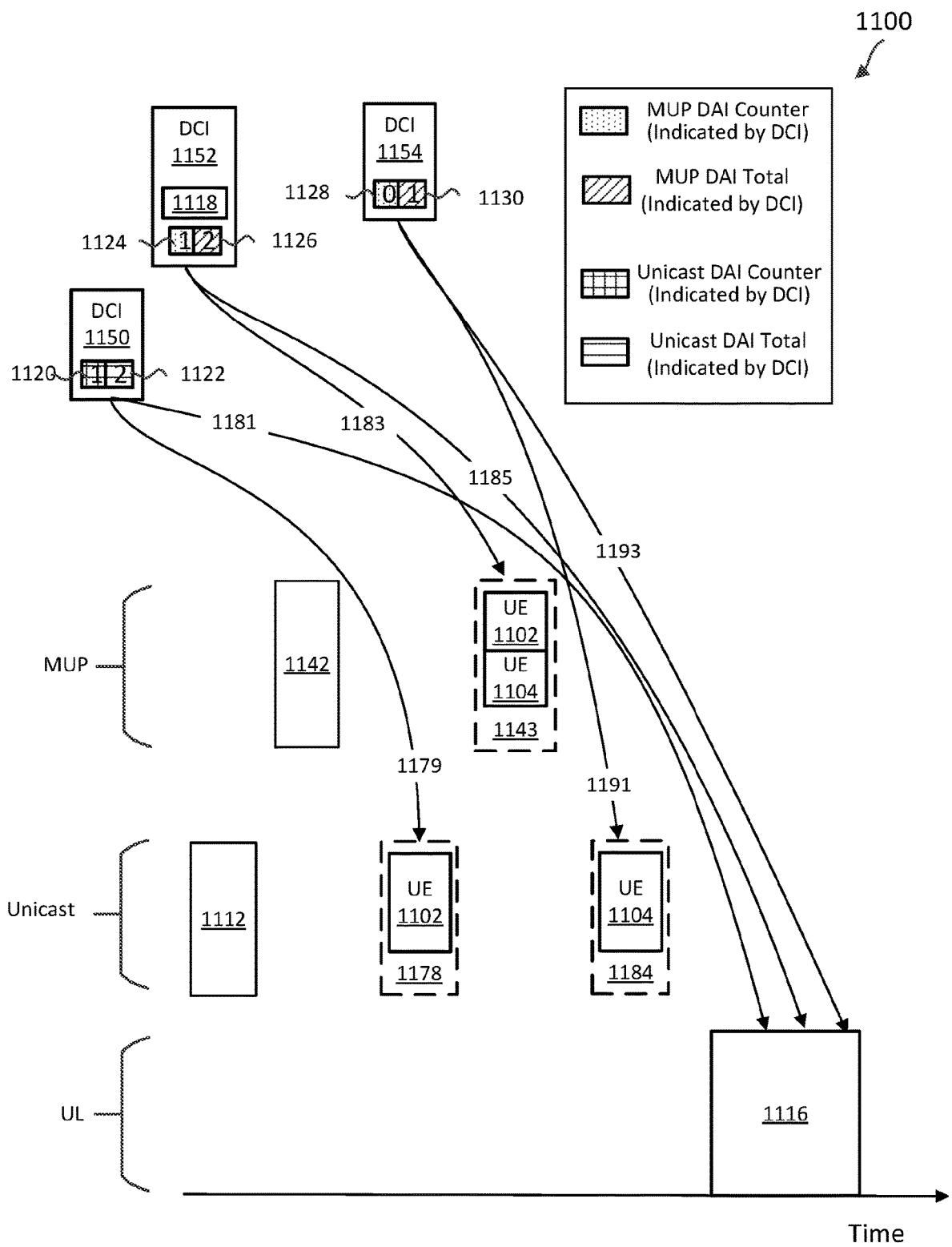
Figure 11C:
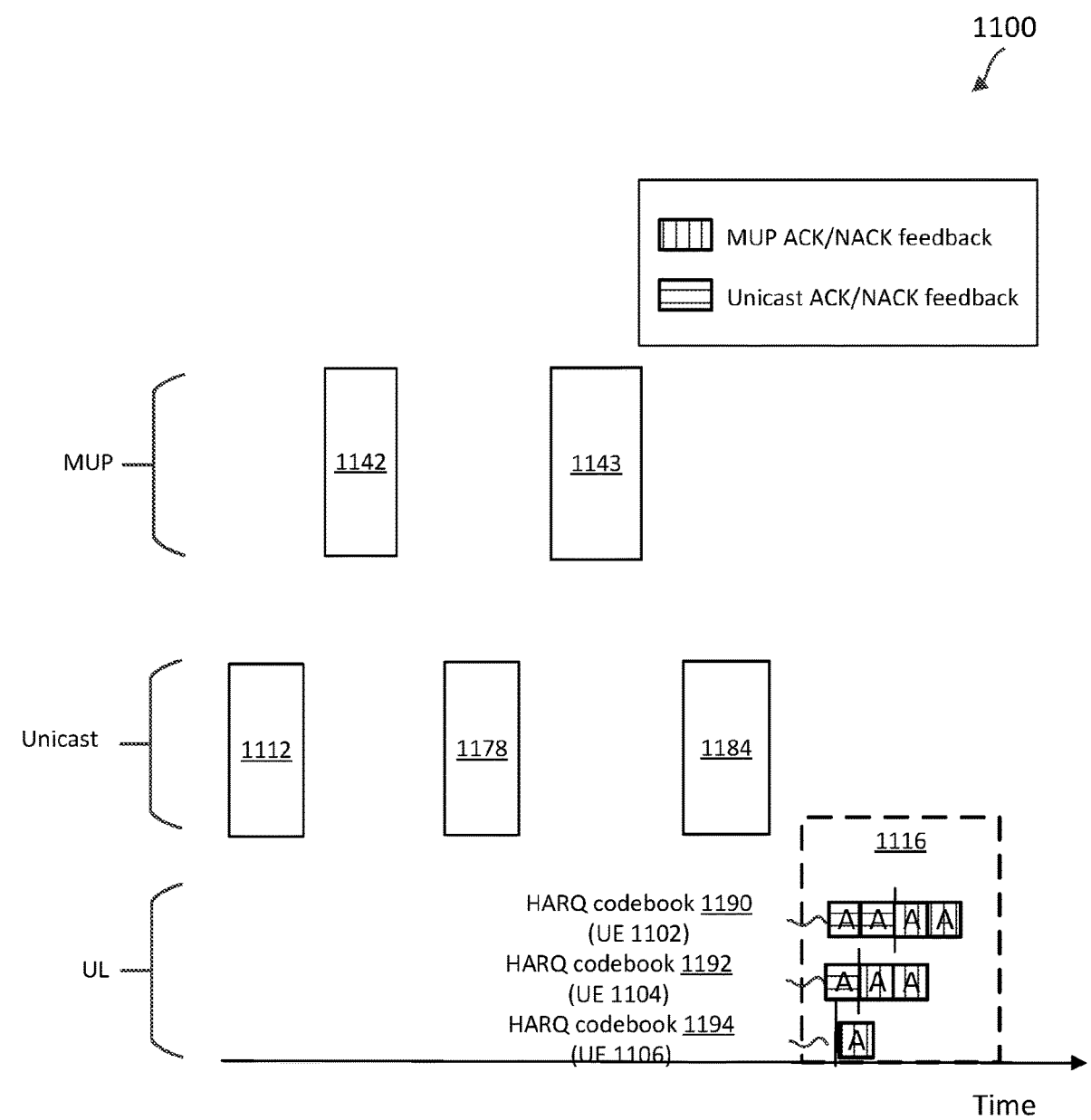

FIGS. 11A-11C illustrate a communication scheme 1100 for communicating ACK/NACK feedbacks for multi-user PDSCH communications and unicast PDSCH communications in a HARQ ACK/NACK reporting occasion according to one or more aspects of the present disclosure. The scheme 1100 may be employed by a BS 105 and a UE 115 in a network such as the network 100. In FIGS. 11A-11C, the x-axis represents time in some constant units. In the example illustrated in FIGS. 11A-11C, a UE 1102, a UE 1104, and a UE 1106 may be configured to report a single HARQ codebook based on multiplexing a MUP HARQ codebook and a unicast HARQ codebook. In other words, each of the UEs 1102, 1104, and 1106 may use the HARQ ACK/NACK reporting occasions for transmitting ACK/NACK feedbacks for multi-user PDSCH communications and for unicast PDSCH communications. Each of the UEs 1102, 1104, and 1106 may correspond to the UE 115, 500.

FIG. 12A-12E will be discussed relative to FIGS. 11A-11C (and vice versa) to better understand concepts related to communicating ACK/NACK feedbacks for multi-user PDSCH communications and unicast PDSCH communications using the same HARQ ACK/NACK reporting occasion. FIGS. 12A-12E illustrate a group DAI counter, a unicast DAI counter, and/or ACK/NACK feedback that are each separately maintained by a UE according one or more aspects of the present disclosure. A UE may maintain the group DAI counter and the unicast DAI counter for keeping track of the number of multi-user PDSCH communications and the number of unicast PDSCH communications, respectively, received by the UE for reporting ACK/NACK feedbacks. Additionally, the UE may determine and keep track of ACK/NACK feedbacks associated with multi-user PDSCH communications and unicast PDSCH communications to transmit the ACK/NACK feedbacks based on a determined HARQ codebook.

In FIG. 11A, a BS 105 may transmit to the UE 1102, a DCI 1110 indicating a DL grant that references a unicast PDSCH communication 1112 (as shown by an arrow 1114) and indicating a HARQ ACK/NACK reporting occasion 1116 for the unicast PDSCH communication 1112 (as shown by an arrow 1115). The UE 1104 may detect and decode the DCI 1110. The UE 1104 may determine, based on the reference to the unicast PDSCH communication 1112, a location of the unicast PDSCH communication 1112.

The BS 105 may transmit the unicast PDSCH communication 1112 including a TB (e.g., aggregated TB corresponding the aggregated TB 306 in FIG. 3) for the UE 1102 to the UE 1102, which may decode the unicast PDSCH communication 1112 based on the DCI 1110. The DCI 1110 may indicate a set of DAI fields including a unicast DAI counter 1120 and a unicast DAI total 1122, where the unicast DAI counter 1120 and the unicast DAI total 1122 are specific to the UE 1102 and are accordingly updated in accordance with the unicast PDSCH communications transmitted to the UE 1102. The BS 105 may set the unicast DAI counter 1120 to zero based on transmitting the unicast PDSCH communication 1112 to the UE 1102 and may set the unicast DAI total 1122 to one based on expecting one unicast ACK/NACK feedback from the UE 1102.

Each of the UEs 1102, 1104, and 1106 may maintain its own unicast DAI counter that keeps track of the number of unicast PDSCH communications that has been received by the respective UE from the BS 105 for reporting in the HARQ ACK/NACK reporting occasion 1116. As will be further discussed herein, if a UE determines that it has missed a DCI, the UE may determine to transmit a NACK corresponding to the missing DCI event.

Figure 12A:
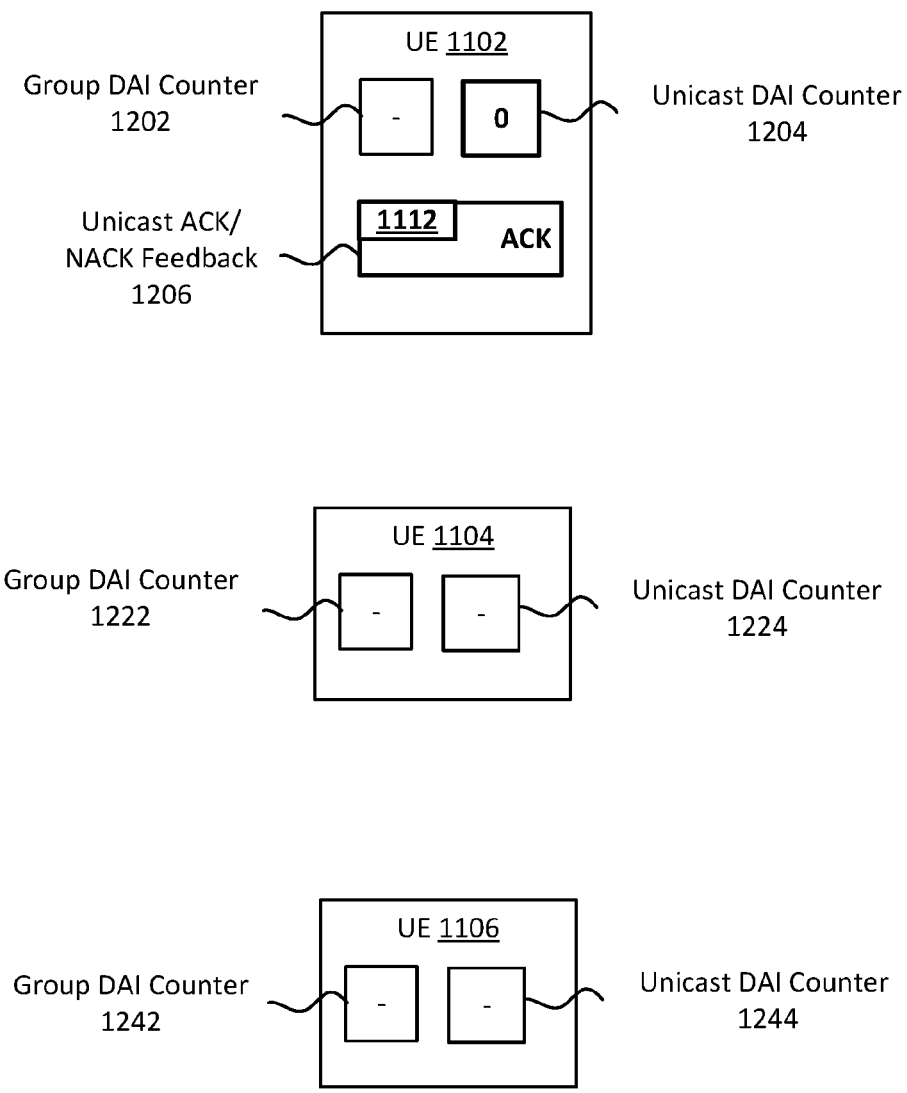
FIGS. 12A-12E illustrate a group DAI counter, a unicast DAI counter, and/or ACK/NACK feedback that are each separately maintained by a UE according one or more aspects of the present disclosure.

In FIG. 12A, the UE 1102, 1104, 1106 may maintain a unicast DAI counter 1204, 1224, 1244, respectively, to track the number of unicast PDSCH communications received by the UE 1102, 1104, 1106, respectively, for reporting in the HARQ ACK/NACK reporting occasion 1116. In response to the UE 1102 receiving the unicast PDSCH communication 1112 (in FIG. 11A), the UE 1102 may set the unicast DAI counter 1204 to zero, which indicates that the UE 1102 has received one unicast PDSCH communication from the BS 105 for reporting an ACK/NACK feedback in the HARQ ACK/NACK reporting occasion 1116. As shown in FIG. 12A, the UE 1102 may determine that a unicast ACK/NACK feedback 1206 for the unicast PDSCH communication 1112 is an ACK. For the UE 1102, the number of unicast ACK/NACK feedbacks for unicast PDSCH communications (e.g., one ACK/NACK feedback for the unicast PDSCH communication 1112) matches the unicast DAI total 1122 indicated by the DCI 1110 in FIG. 11A (e.g., one).

Neither the UE 1104 nor the UE 1106 has received a unicast PDSCH communication yet and accordingly does not set the unicast DAI counter 1224 or the unicast DAI counter 1244, respectively, to zero. The unicast DAI counter 1224, 1244 may be null or set to a predetermined value indicating that the UE has not yet received a unicast PDSCH communication from the BS 105 for reporting an ACK/NACK feedback in the HARQ ACK/NACK reporting occasion 1116.

As shown in FIG. 12A, the UE 1102 may also maintain a group DAI counter 1202, the UE 1104 may maintain a group DAI counter 1222, the UE 1106 may maintain a group DAI counter 1242. The group DAI counter 1202, 1222, and 1242 will be discussed in further detail below in relation to, for example, at least aspects of FIGS. 12C-12E.

Referring back to FIG. 11A, after transmitting the DCI 1110, the BS 105 may transmit to a first group of UEs, a DCI 1140 indicating a DL grant that references a multi-user PDSCH communication 1142 (as shown by an arrow 1144), the HARQ ACK/NACK reporting occasion 1116 for the multi-user PDSCH communication 142 (as shown by an arrow 1146), and a group-RNTI 1118. The first group of UEs may include the UE 1102, the UE 1104, and the UE 1106, which may monitor for the DCI 1140 indicating the group-RNTI 118. The UEs 1102, 1104, and 1106 may detect and decode the DCI 1140 and determine whether the multi-user PDSCH communication 1142 is addressed to the respective UE. If the UE 1102, 1104, and 1106 determines that the multi-user PDSCH communication 1142 is addressed to the respective UE, then the UE 1102, 1104, and 1106 may determine, based on the reference to the multi-user PDSCH communication 1142, a location of the multi-user PDSCH communication 1142.

The BS 105 may transmit the multi-user PDSCH communication 1142 including a TB (e.g., aggregated TB corresponding the aggregated TB 306 in FIG. 3) for the UE 1102, the UE 1104, and the UE 1106 to the first group of UEs, which may decode the multi-user PDSCH communication 1142 based on the DCI 1140. The DCI 1140 may indicate a set of DAI fields including a composite DAI counter 1124 and a composite DAI total 1124. The set of DAI fields including the composite DAI counter 1124 and the composite DAI total 1124 is maintained and updated for multi-user PDSCH communications and all UEs being served in the group-RNTI 1118. The BS 105 may set the composite DAI counter 1124 to zero based on transmitting the multi-user PDSCH communication 1142 to the first group of UEs and may set the composite DAI total 1126 to one based on expecting one multi-user ACK/NACK feedback in the HARQ ACK/NACK reporting occasion 1116.

In FIG. 11B, in response to receiving the multi-user PDSCH communication 1142 (in FIG. 11A), the UE 1102 may set the group DAI counter 1202 to zero, the UE 1104 may set the group DAI counter 1222 to zero, and the UE 1106 may set the group DAI counter 1242 to zero. As shown in FIG. 11B, the UE 1102 may determine that a MUP ACK/NACK feedback 1208 for the multi-user PDSCH communication 1142 is an ACK, the UE 1104 may determine that a MUP ACK/NACK feedback 1226 for the multi-user PDSCH communication 1142 is an ACK, and the UE 1106 may determine that a MUP ACK/NACK feedback 1246 for the multi-user PDSCH communication 1142 is an ACK. Additionally, each of the UE 1102, 1104, and 1106 may determine that the number of MUP ACK/NACK feedbacks for multi-user PDSCH communications (e.g., one) matches the composite DAI total 1126 indicated by the DCI 1140 in FIG. 11A (e.g., one).

Now referring to FIG. 11B, the BS 105 may transmit to the UE 1102, a DCI 1150 indicating a DL grant that references a unicast PDSCH communication 1178 (as shown by an arrow 1179) and indicating the HARQ ACK/NACK reporting occasion 1116 for the unicast PDSCH communication 1178 (as shown by an arrow 1181). The UE 1102 may detect and decode the DCI 1150 and determine, based on the reference to the unicast PDSCH communication 1178, a location of the unicast PDSCH communication 1178. The DCI 1150 indicates that the updated unicast DAI counter 1120 is one and the updated unicast DAI total 1122. As discussed, the unicast DAI counter 1120 and the unicast DAI total 1122 are specific to the UE 1102 and are accordingly updated in accordance with the unicast PDSCH communications transmitted to the UE 1102.

Figure 12B:
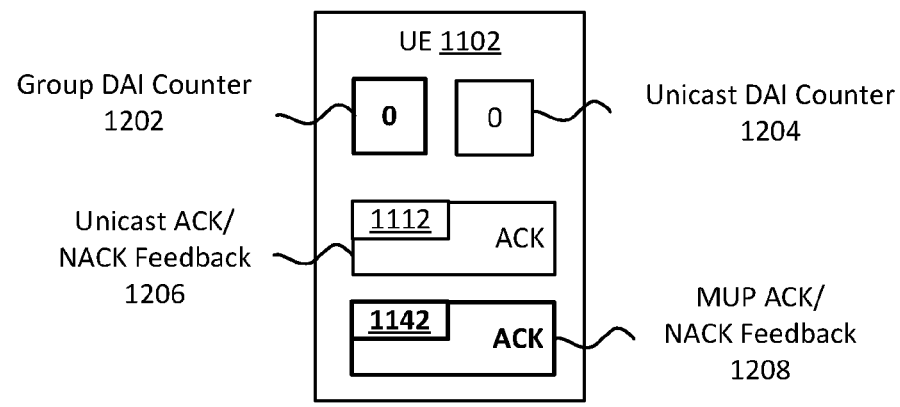
Figure 12B:
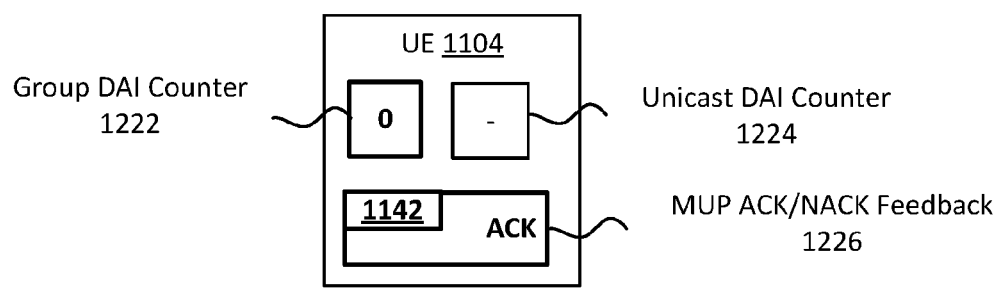
Figure 12B:
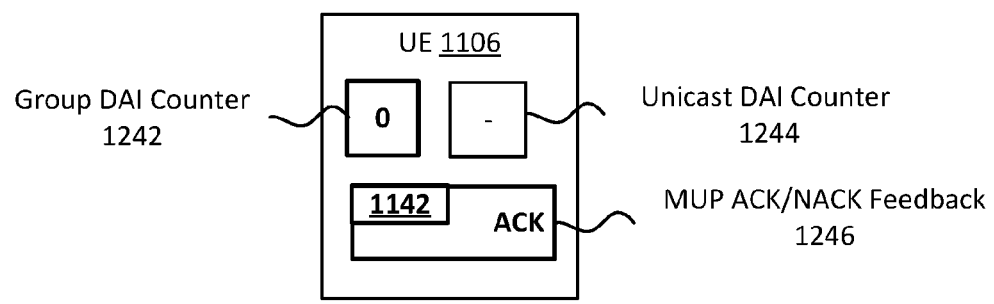
Figure 12C:
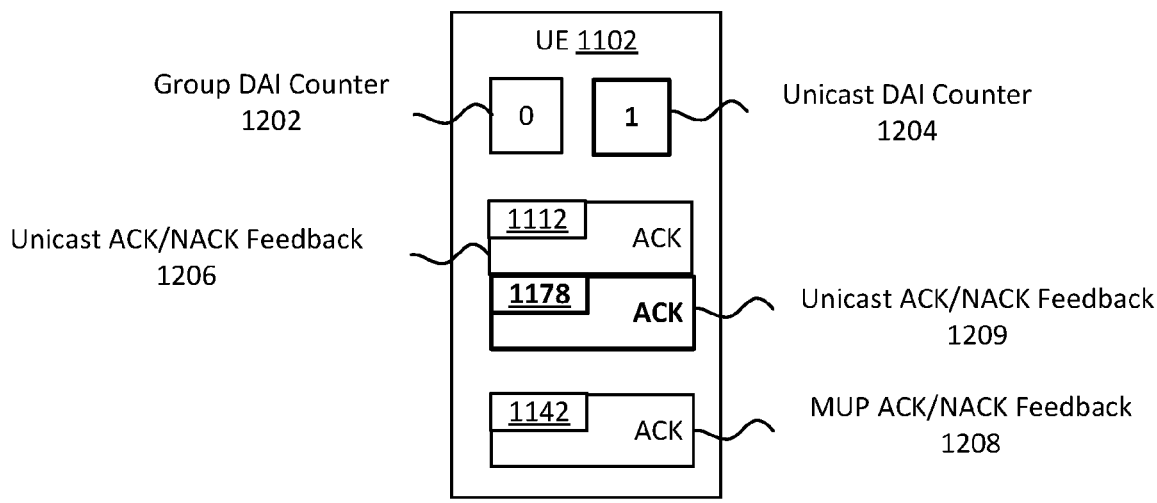

In FIG. 12C, in response to the UE 1102 receiving the unicast PDSCH communication 1178 (in FIG. 11B), the UE 1102 may set the unicast DAI counter 1204 to one. As shown in FIG. 12C, the UE 1102 may determine that a unicast ACK/NACK feedback 1209 for the unicast PDSCH communication 1178 is an ACK. For the UE 1102, the number of unicast ACK/NACK feedbacks for unicast PDSCH communications (e.g., two, with one unicast ACK/NACK feedback for the unicast PDSCH communication 1112 and one unicast ACK/NACK feedback for the unicast PDSCH communication 1178) matches the unicast DAI total 1122 indicated by the DCI 1150 in FIG. 11B (e.g., two).

Referring back to FIG. 11B, after the BS 105 transmits the DCI 1150, the BS 105 may transmit to a second group of UEs, a DCI 1152 indicating a DL grant that references a multi-user PDSCH communication 1143 (as shown by an arrow 1183), the HARQ ACK/NACK reporting occasion 1116 for the multi-user PDSCH communication 1143 (as shown by an arrow 1185), and the group-RNTI 1118. The second group of UEs may include the UE 1102 and the UE 1104. The UE 1102 and the UE 1104 may detect and decode the DCI 1152 and determine, based on the reference to the multi-user PDSCH communication 1143, a location of the multi-user PDSCH communication 1143. The DCI 1152 indicates that the updated group DAI counter 1124 is one and the updated group DAI total 1126 is two. As discussed, the group DAI counter 1124 and the group DAI total 1126 is maintained across all the multi-user PDSCH communications with the group-RNTI 1118.

Figure 12D:
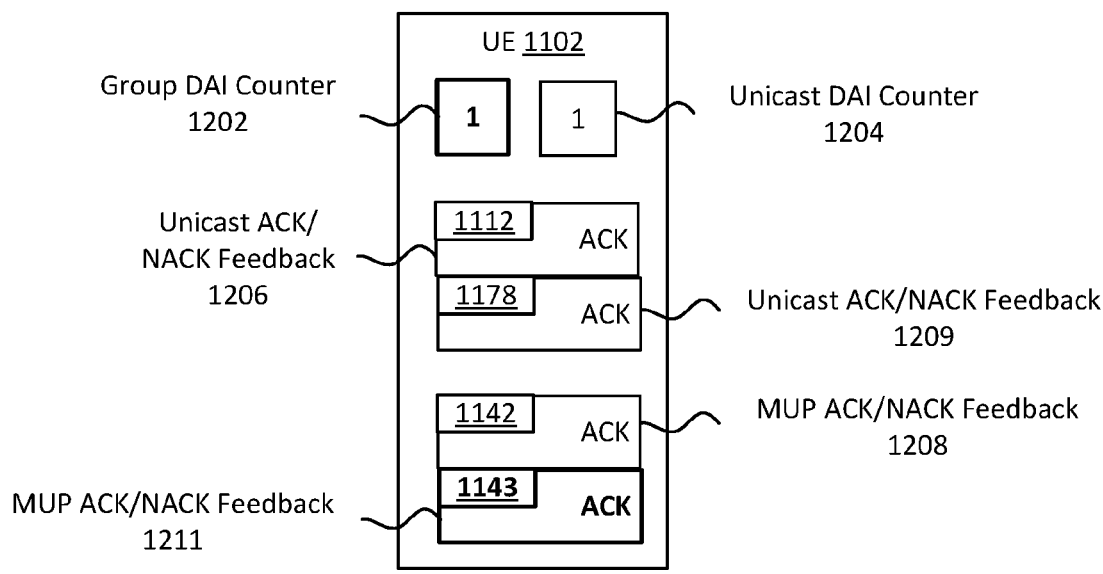
Figure 12D:
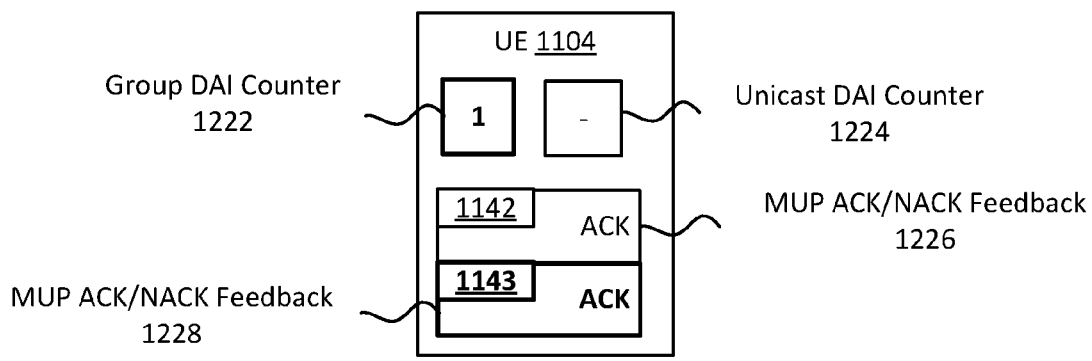

In FIG. 12D, in response to the UE 1102 receiving the multi-user PDSCH communication 1142 (in FIG. 11B), the UE 1102 may set the group DAI counter 1202 to one. As shown in FIG. 12D, the UE 1102 may determine that a MUP ACK/NACK feedback 1211 for the multi-user PDSCH communication 1143 is an ACK. For the UE 1102, the number of MUP ACK/NACK feedbacks for multi-user PDSCH communications (e.g., two, with one MUP ACK/NACK feedback 1208 for the multi-user PDSCH communication 1142 and one MUP ACK/NACK feedback 1211 for the multi-user PDSCH communication 1143) matches the group DAI total 1126 indicated by the DCI 1152 in FIG. 11B (e.g., two).

In FIG. 12D, the UE 1104 may perform similar actions as the UE 1102. For example, in response to the UE 1104 receiving the multi-user PDSCH communication 1142 (in FIG. 11B), the UE 1104 may set the group DAI counter 1222 to one. As shown in FIG. 12D, the UE 1104 may determine that a MUP ACK/NACK feedback 1228 for the multi-user PDSCH communication 1143 is an ACK. For the UE 1104, the number of MUP ACK/NACK feedbacks for multi-user PDSCH communications (e.g., two, with one MUP ACK/NACK feedback 1226 for the multi-user PDSCH communication 1142 and one MUP ACK/NACK feedback 1228 for the multi-user PDSCH communication 1143) matches the group DAI total 1126 indicated by the DCI 1152 in FIG. 11B (e.g., two).

Referring back to FIG. 11B, after the BS 105 transmits the DCI 1152, the BS 105 may transmit to the UE 1104, a DCI 1154 indicating a DL grant that references a unicast PDSCH communication 1184 (as shown by an arrow 1191) and indicating the HARQ ACK/NACK reporting occasion 1116 for the unicast PDSCH communication 1184 (as shown by an arrow 1193). The UE 1104 may detect and decode the DCI 1154 and determine, based on the reference to the unicast PDSCH communication 118, a location of the unicast PDSCH communication 118. The DCI 1154 indicates a group DAI counter 1128 is zero and a group DAI total 1130 is one. The group DAI counter 1128 and the group DAI total 1130 are specific to the UE 1104 and are accordingly updated in accordance with the unicast PDSCH communications transmitted to the UE 1104.

Figure 12E:
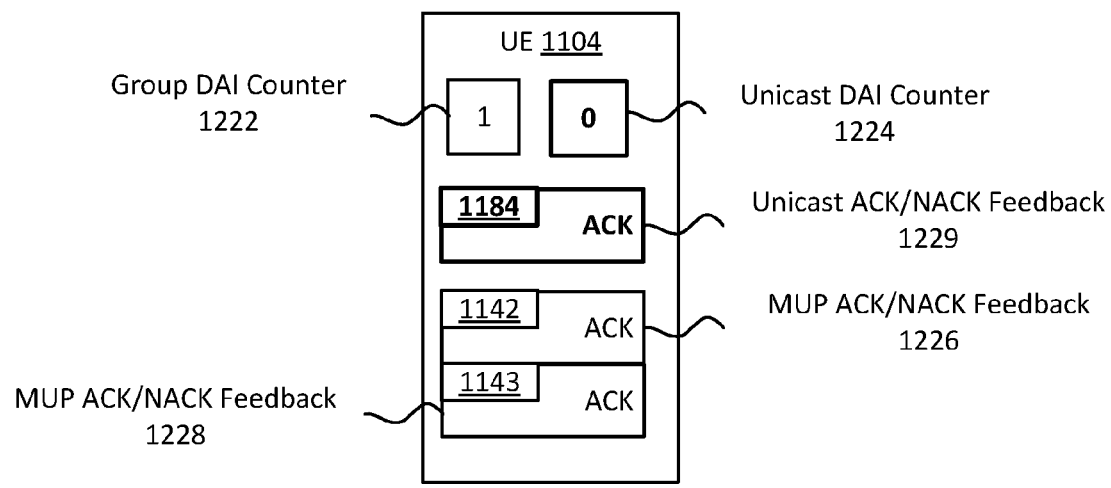

In FIG. 12E, in response to the UE 1104 receiving the unicast PDSCH communication 1184 (in FIG. 11B), the UE 1104 may set the unicast DAI counter 1224 to zero. As shown in FIG. 12E, the UE 1104 may determine that a MUP ACK/NACK feedback 1229 for the unicast PDSCH communication 1184 is an ACK. For the UE 1104, the number of MUP ACK/NACK feedbacks for unicast PDSCH communications (e.g., one unicast ACK/NACK feedback 1229 for the unicast PDSCH communication 1184) matches the unicast DAI total 1130 indicated by the DCI 1154 in FIG. 11B (e.g., one).

Now referring to FIG. 11C, each of the UEs 1102, 1104, and 1106 may determine a HARQ codebook associated with the PDSCH communications (e.g., multi-user PDSCH communications and unicast PDSCH communications). Each of the UEs may form a MUP HARQ codebook and a unicast HARQ codebook. Additionally, each of the UEs may concatenate the MUP and unicast HARQ codebooks to form a single HARQ codebook and report the single HARQ codebook in the HARQ ACK/NACK reporting occasion 1116. In some instances, the MUP HARQ codebook may be after the unicast HARQ codebook in the single HARQ codebook. In some instances, the unicast HARQ codebook may be after the MUP HARQ codebook in the single HARQ codebook.

For example, the UE 1102 may determine a unicast HARQ codebook for a first TB associated with the unicast PDSCH communication 1112 and for a second TB associated with the unicast PDSCH communication 1178. The UE 1102 may determine an MUP HARQ codebook for a third TB associated with the multi-user PDSCH communication 1142 and for a fourth TB associated with the multi-user PDSCH communication 1143. Using the HARQ ACK/NACK reporting occasion 1116 for the PDSCH communications (e.g., the unicast and multi-user PDSCH communications), the UE 1102 may transmit the unicast ACK/NACK feedback 1206 (e.g., ACK as shown in FIG. 12D) for the first TB, transmit the unicast ACK/NACK feedback 1278 (e.g., ACK as shown in FIG. 12D) for the second TB, transmit the MUP ACK/NACK feedback 1208 (e.g., ACK as shown in FIG. 12D) for the third TB, and transmit the MUP ACK/NACK feedback 1211 (e.g., ACK as shown in FIG. 12D) for the fourth TB, based on the HARQ codebook 1190. Accordingly, a HARQ codebook 1190 that is reported by the UE 1102 in the HARQ ACK/NACK reporting occasion 1116 indicates the unicast ACK/NACK feedbacks {A, A} and the MUP ACK/NACK feedbacks {A, A} to form the single HARQ codebook indicating {A, A, A, A}.

Similarly, the UE 1104 may determine a unicast HARQ codebook for a fifth TB associated with the unicast PDSCH communication 1184 and may determine an MUP HARQ codebook for the third TB associated with the multi-user PDSCH communication 1142 and for the fourth TB associated with the multi-user PDSCH communication 1143. Using the HARQ ACK/NACK reporting occasion 1116 for the PDSCH communications (e.g., the unicast and multi-user PDSCH communications), the UE 1104 may transmit the unicast ACK/NACK feedback 1229 (e.g., ACK as shown in FIG. 12E) for the fifth TB, transmit the MUP ACK/NACK feedback 1226 (e.g., ACK as shown in FIG. 12E) for the third TB, and transmit the MUP ACK/NACK feedback 1228 (e.g., ACK as shown in FIG. 12E) for the fourth TB, based on the HARQ codebook 1192. Accordingly, a HARQ codebook 1192 that is reported by the UE 1104 in the HARQ ACK/NACK reporting occasion 1116 indicates the unicast ACK/NACK feedback {A} and the MUP ACK/NACK feedbacks {A, A} to form the single HARQ codebook indicating {A, A, A}.

Similarly, the UE 1106 may determine a unicast HARQ codebook and may determine an MUP HARQ codebook for the third TB associated with the multi-user PDSCH communication 1142 and for the fourth TB associated with the multi-user PDSCH communication 1143. Using the HARQ ACK/NACK reporting occasion 1116 for the PDSCH communications (e.g., the unicast and multi-user PDSCH communications), the UE 1106 may transmit the MUP ACK/NACK feedback 1246 (e.g., ACK as shown in FIG. 12B) for the third TB, based on the HARQ codebook 1192. Accordingly, a HARQ codebook 1194 that is reported by the UE 1106 in the HARQ ACK/NACK reporting occasion 1116 indicates the unicast ACK/NACK feedback { } and the MUP ACK/NACK feedback {A} to form the single HARQ codebook indicating {A}.

In some aspects, the BS 105 may transmit a DCI indicating a DAI total of the number of ACK/NACK feedbacks based on a current MUP HARQ codebook (e.g., MUP HARQ codebook or unicast HARQ codebook). In some instances, a first DCI may indicate a first DAI total for the number of MUP ACK/NACK feedbacks for multi-user PDSCH communications, where the first DCI indicates a DL grant referencing a multi-user PDSCH communication. In some instances, a second DCI may indicate a second DAI total for the number of unicast ACK/NACK feedbacks for unicast PDSCH communications, where the second DCI indicates a DL grant referencing a unicast PDSCH communication. In some aspects, the BS 105 may transmit a DCI indicating a DAI total of both a first number of ACK/NACK feedbacks based on a MUP HARQ codebook and a second number of ACK/NACK feedbacks based on a unicast HARQ codebook. In some instances, a DCI may indicate a composite DAI total for a sum of the first number of MUP ACK/NACK feedbacks for multi-user PDSCH communications and the second number of unicast ACK/NACK feedbacks for unicast PDSCH communications, where the DCI may indicate a DL grant referencing a multi-user or a unicast PDSCH communication. In some aspects, the BS 105 may transmit a DCI indicating a first set of DAI fields and a second set of DAI fields, where the DCI indicates a DL grant referencing a unicast PDSCH communication. The first set of DAI fields may include a group DAI total and the second set of DAI fields may include a unicast DAI total for a particular UE 115.

In some aspects, a UE 115 may transmit a DAI total in PUSCH. In some instances, the UE 115 may transmit a single DAI total in PUSCH, where the single DAI is a sum of the group DAI total and the unicast DAI total. In some instances, the UE 115 may transmit a group DAI total for the MUP HARQ codebook in PUSCH and a unicast DAI total for the unicast HARQ codebook in PUSCH. In some instances, the UE 115 may transmit a single unicast DAI total for the unicast HARQ codebook in PUSCH.

In some aspects, the BS 105 may transmit at most one multi-user PDSCH communication per UE for a PUCCH reporting occasion. In some instances, a group of UEs may ignore the set of DAI fields (e.g., DAI counter and DAI total fields indicated by the DCI), and each UE of the group of UEs may reserve a MUP ACK/NACK feedback in a dynamic codebook and may concatenate the MUP ACK/NACK feedback to the dynamic codebook (e.g., the unicast HARQ codebook). A UE 115 may determine a unicast HARQ codebook as discussed at least at, for example, aspects of 1-6, 7A-7C, 8A-8E, 9A-9C, 10A-10E, 11A-11C, and 12A-12E. If the UE 115 receives a multi-user PDSCH communication, the UE 115 may determine that the reserved MUP ACK/NACK feedback is an ACK. If the UE 115 does not receive a multi-user PDSCH communication or detects that the UE 115 has missed a DCI, the UE 115 may determine that the reserved MUP ACK/NACK feedback is a NACK.

In some aspects, a UE 115 may decode a DCI indicating a group-RNTI, where the DCI may indicate a DL grant that references a multi-user PDSCH communication. If the UE 115 is unable to decode a sub-header referenced by the DCI, the UE 115 may be unable to determine whether the multi-user PDSCH communication includes a TB that is addressed to the UE 115. If the multi-user PDSCH communication includes a TB that is addressed to the UE 115, a possibility exists that the HARQ codebook size may be incorrect. If the UE 115 is unable to decode the sub-header, the UE 115 may determine that decoding the multi-user PDSCH communication results in an error. In some instances, if the UE 115 determines that decoding the multi-user PDSCH communication results in an error, then the UE 115 may determine that an ACK/NACK feedback for the multi-user PDSCH communication is a NACK. The UE 115 may report the NACK accordingly.

In some instances, if the UE 115 detects a DCI indicating the group-RNTI and the DCI references a validated HARQ ACK/NACK reporting occasion, then the UE 115 may determine that the multi-user PDSCH communication includes a TB that is addressed to the UE 115 (even if the UE 115 is unable to decode the sub-header or if the UE 115 decodes the sub-header and the multi-user PDSCH communication does not include a TB that is addressed to the UE 115). A HARQ ACK/NACK reporting occasion may be a validated HARQ ACK/NACK reporting occasion if a DCI indicating a DL grant that references a unicast PDSCH communication indicates the HARQ ACK/NACK reporting occasion. Additionally or alternatively, a HARQ ACK/NACK reporting occasion may be a validated HARQ ACK/NACK reporting occasion if a DCI indicating the group-RNTI and the UE 115 decodes the sub-header associated with the multi-user PDSCH communication and verifies that a sub-header included in the multi-user PDSCH communication includes a user identifier that matches a user identifier of the UE 115. If the UE 115 is not scheduled for transmission, the UE 115 will not have a validated HARQ ACK/NACK reporting occasion. Accordingly, the UE 115 does not transmit PUCCH because the UE 115 was not granted a PUCCH resource to transmit.

Figure 13:
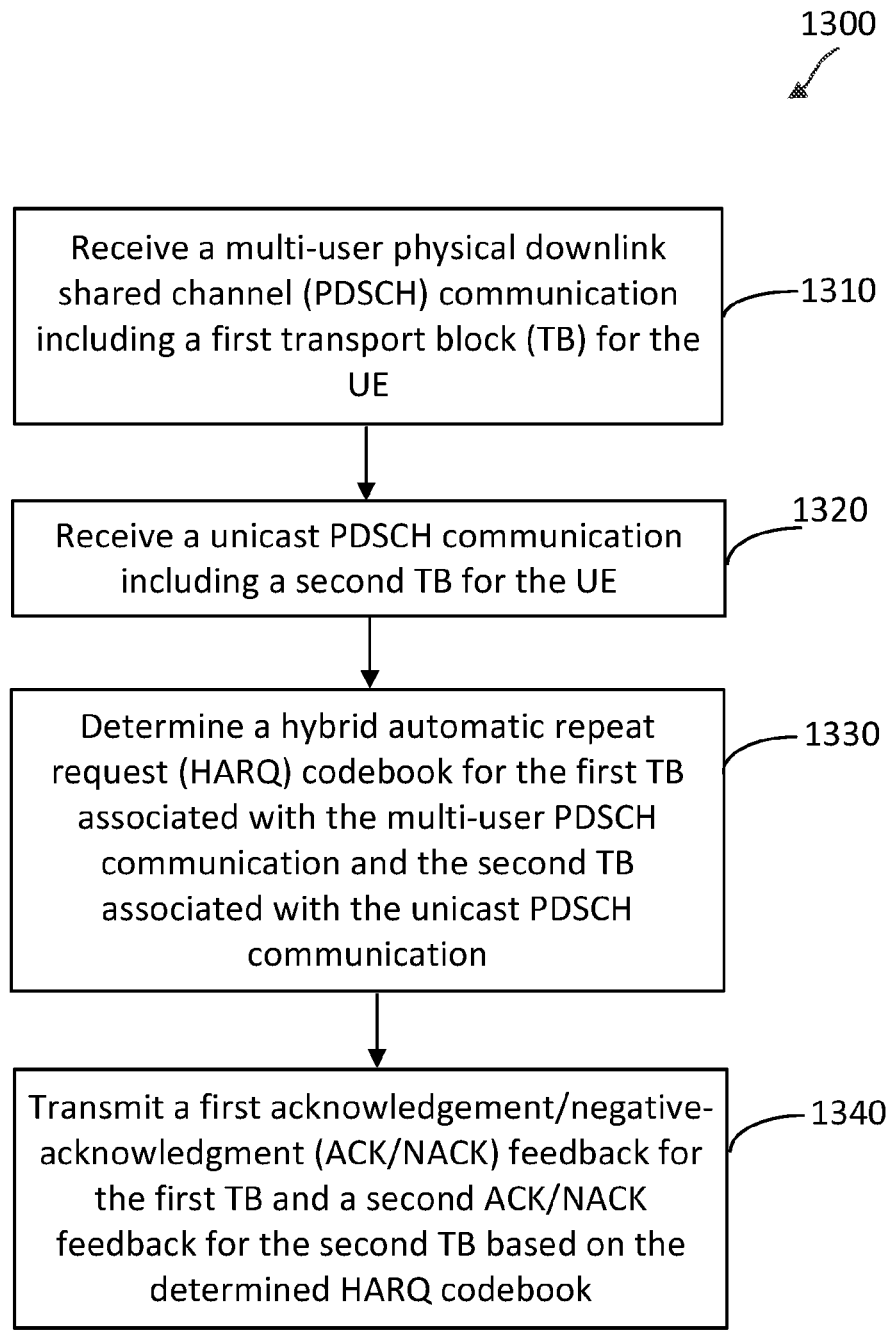
FIG. 13 illustrates a flow diagram of a communication method for communicating ACK/NACK feedbacks for multi-user and unicast PDSCH communications in accordance with one or more aspects of the present disclosure.

FIG. 13 illustrates a flow diagram of a communication method 1300 for communicating ACK/NACK feedbacks for multi-user and unicast PDSCH communications in accordance with one or more aspects of the present disclosure. Blocks of the method 1300 can be executed by a computing device (e.g., a processor, processing circuit, and/or other suitable component) of a wireless communication device. In some aspects, the wireless communication device is a UE (e.g., UE 115 and/or UE 500) that may utilize one or more components, such as the processor 502, the memory 504, the PDSCH module 508, the HARQ codebook module 509, the transceiver 510, and/or the antennas 516 to execute the blocks of the method 1300. The method 1300 may employ similar aspects as in the flexible scheduling timeline 200 in FIG. 2, the communication scheme 300 in FIG. 3, the communication scheme 400 in FIG. 4, the communication scheme 700 in FIGS. 7A-7C, FIGS. 8A-8E, the communication scheme 900 in FIGS. 9A-9C, FIGS. 10A-10E, the communication scheme 1100 in FIGS. 11A-11C, and/or FIGS. 12A-12E. As illustrated, the method 1300 includes a number of enumerated blocks, but aspects of the method 1300 may include additional blocks before, after, and/or in between the enumerated blocks. In some aspects, one or more of the enumerated blocks may be omitted or performed in a different order.

At block 1310, the method 1300 includes receiving a multi-user physical downlink shared channel (PDSCH) communication comprising a first transport block (TB) for the UE.

At block 1320, the method 1300 includes receiving a unicast PDSCH communication comprising a second TB for the UE.

At block 1330, the method 1300 includes determining a hybrid automatic repeat request (HARQ) codebook for the first TB associated with the multi-user PDSCH communication and the second TB associated with the unicast PDSCH communication.

At block 1340, the method 1300 includes transmitting a first acknowledgement/negative-acknowledgment (ACK/NACK) feedback for the first TB and a second ACK/NACK feedback for the second TB based on the determined HARQ codebook.

In some aspects, the UE may receive a first DCI indicating a first DL grant that references the multi-user PDSCH communication and indicating a first HARQ ACK/NACK reporting occasion for the multi-user PDSCH communication. The UE may also receive a second DCI indicating a second DL grant that references the unicast PDSCH communication and indicating a second HARQ ACK/NACK reporting occasion for the unicast PDSCH communication, where the second HARQ ACK/NACK reporting occasion is different from the first HARQ reporting occasion. The UE may receive the first DCI by receiving the first DCI indicating a first group DAI counter and receive the second DCI by receiving the second DCI indicating a second group DAI counter independent of the first DAI counter. Additionally or alternatively, the UE may determine the HARQ codebook by determining a first HARQ codebook based on the first ACK/NACK feedback and a second HARQ codebook based on the second ACK/NACK feedback. The UE may transmit the first ACK/NACK feedback by transmitting the first ACK/NACK feedback based on the first HARQ codebook and transmit the second ACK/NACK feedback by transmitting the second ACK/NACK feedback based on the second HARQ codebook.

In some aspects, the UE may determine whether a first group DAI counter matches a second group DAI counter. The first DCI may indicate the first group DAI counter, and the second group DAI counter may be maintained by the UE for PDSCH communications. The UE may determine that the first ACK/NACK feedback is an ACK if the first group DAI counter matches the second group DAI counter and decoding the multi-user PDSCH communication is successful. The UE may determine that the first ACK/NACK feedback is a NACK if the first group DAI counter does not match the second group DAI counter or decoding the multi-user PDSCH communication is unsuccessful.

In some aspects, the UE may determine whether a first unicast DAI counter matches a second unicast DAI counter. The second DCI may indicate the first unicast DAI counter, which may be independent from the first group DAI counter and may be specific to the UE. The second unicast DAI counter may be maintained by the UE for PDSCH unicast communications. The UE may determine that the second ACK/NACK feedback is an ACK if the first unicast DAI counter matches the second unicast DAI counter and decoding the unicast PDSCH communication is successful. The UE may determine that the second ACK/NACK feedback is a NACK if the first unicast DAI counter does not match the second unicast DAI counter or decoding the unicast PDSCH communication is unsuccessful.

The UE may transmit the first ACK/NACK feedback by transmitting a first number of ACK/NACK feedbacks based on the first HARQ codebook. The first DCI may indicate a first group DAI total, the multi-user PDSCH communication may be the last multi-user PDSCH communication corresponding to the first HARQ codebook, and the first number of ACK/NACK feedbacks may match the first group DAI total. Additionally or alternatively, the UE may transmit the second ACK/NACK feedback by transmitting a second number of ACK/NACK feedbacks based on the second HARQ codebook. The second DCI may indicate a first unicast DAI total, the unicast PDSCH communication may be the last unicast communication corresponding to the second HARQ codebook, the second number of ACK/NACK feedbacks may match the first unicast DAI total, and the first group DAI total may be independent from the first unicast DAI total.

In some aspects, the UE may receive a third DCI, where the third DCI indicates a third DL grant that references a second multi-user PDSCH communication comprising a third TB, further indicates the first HARQ ACK/NACK reporting occasion for the second multi-user PDSCH communication, and further indicates an updated first group DAI counter that is based on the first group DAI counter. The UE may update the second group DAI counter and determine whether the updated first group DAI counter matches the updated second group DAI counter. The UE may determine that a third ACK/NACK feedback for the third TB is an ACK if the updated first group DAI counter matches the updated second group DAI counter and decoding the second multi-user PDSCH communication is successful. The UE may determine that the third ACK/NACK feedback is a NACK if the updated first group DAI counter does not match the updated second group DAI counter or decoding the second multi-user PDSCH communication is unsuccessful. The UE may determine the HARQ codebook by determining the first HARQ codebook based on the third ACK/NACK feedback. The UE may transmit the third ACK/NACK feedback for the third TB based on the first HARQ codebook.

In some aspects, the UE may receive a fourth DCI. The fourth DCI may indicate a fourth DL grant that references a second unicast PDSCH communication comprising a fourth TB, further indicate the second HARQ ACK/NACK reporting occasion for the second unicast PDSCH communication, and further indicate an updated first unicast DAI counter that is based on the first unicast DAI counter. The UE may update the second unicast DAI counter and determine whether the updated first unicast DAI counter matches the updated second unicast DAI counter. The UE may determine that a fourth ACK/NACK feedback for the fourth TB is an ACK if the updated first unicast DAI counter matches the updated second unicast DAI counter and decoding the second unicast PDSCH communication is successful. The UE may determine that the fourth ACK/NACK feedback is a NACK if the updated first unicast DAI counter does not match the updated second unicast DAI counter or decoding the second unicast PDSCH communication is unsuccessful. The UE may determine the HARQ codebook by determining the second HARQ codebook based on the fourth ACK/NACK feedback. The UE may also transmit the fourth ACK/NACK feedback for the fourth TB based on the second HARQ codebook.

In some aspects, the UE may determine that decoding the multi-user PDSCH communication results in an error. The UE may determine that the first ACK/NACK feedback is a NACK for the first TB. In some aspects, the UE may receive a first DCI indicating a first DL grant that references the multi-user PDSCH communication and indicating a HARQ ACK/NACK reporting occasion for the multi-user PDSCH communication. The UE may also receive a second DCI indicating a second DL grant that references the unicast PDSCH communication and indicating the HARQ ACK/NACK reporting occasion for the unicast PDSCH communication. The first ACK/NACK feedback may precede the second ACK/NACK feedback in the HARQ codebook if the UE receives the first DCI before receiving the second DCI. The second ACK/NACK feedback may precede the first ACK/NACK feedback in the HARQ codebook if the UE receives the second DCI before receiving the first DCI.

In some aspects, the UE may determine whether a first composite DAI counter matches a second composite DAI counter. The first DCI may indicate a first composite DAI counter, and the second composite DAI counter may be maintained by the UE for multi-user and unicast PDSCH communications. The UE may determine that the first ACK/NACK feedback is an ACK if the first composite DAI counter matches the second composite DAI counter and decoding the multi-user PDSCH communication is successful. The UE may determine that the first ACK/NACK feedback is a NACK if the first composite DAI counter does not match the second composite DAI counter or decoding the multi-user PDSCH communication is unsuccessful. The second DCI may indicate a third composite DAI counter that is based on an update to the first composite DAI counter. The UE may update the second composite DAI counter to a fourth composite DAI counter and determine whether the third composite DAI counter matches the fourth composite DAI counter. The UE may determine that the second ACK/NACK feedback is an ACK if the third composite DAI counter matches the fourth composite DAI counter and decoding the unicast PDSCH communication is successful. The UE may determine that the second ACK/NACK feedback is a NACK if the third composite DAI counter does not match the fourth composite DAI counter or decoding the unicast PDSCH communication is unsuccessful. The UE may transmit the first ACK/NACK feedback by transmitting a first number of ACK/NACK feedbacks based on the HARQ codebook, the first DCI indicating a first composite DAI total, the multi-user PDSCH communication being the last PDSCH communication corresponding to the HARQ codebook, and the first number of ACK/NACK feedbacks including the first and second ACK/NACK feedbacks and matching the first composite DAI total. The UE may transmit the second ACK/NACK feedback by transmitting a second number of ACK/NACK feedbacks based on the HARQ codebook, the second DCI indicating a first composite DAI total, the unicast PDSCH communication being the last PDSCH communication corresponding to the HARQ codebook, and the second number of ACK/NACK feedbacks including the first and second ACK/NACK feedbacks and matching the first composite DAI total.

In some aspects, the UE may receive a third DCI, the third DCI indicating a third DL grant that references a PDSCH communication comprising a third TB, further indicating the HARQ ACK/NACK reporting occasion for the PDSCH communication, and further indicating a fifth composite DAI counter that is based on an update to the third composite DAI counter. The UE may update the fourth composite DAI counter to a sixth composite DAI counter and determine whether the fifth composite DAI counter matches the sixth composite DAI counter. The UE may determine that a third ACK/NACK feedback for the third TB is an ACK if the fifth composite DAI counter matches the sixth composite DAI counter and decoding the PDSCH communication is successful. The UE may determine that the third ACK/NACK feedback is a NACK if the fifth composite DAI counter does not match the sixth composite DAI counter or decoding the PDSCH communication is unsuccessful. The UE may transmit the first ACK/NACK feedback by transmitting a first number of ACK/NACK feedbacks based on the HARQ codebook, the third DCI indicating a first composite DAI total, the PDSCH communication being the last PDSCH communication corresponding to the HARQ codebook, and the first number of ACK/NACK feedbacks including the first, second, and third ACK/NACK feedbacks and matching the first composite DAI total. The first ACK/NACK feedback and the second ACK/NACK feedback may be multiplexed in the HARQ codebook.

In some aspects, the UE may receive a first DCI indicating a first DL grant that references the multi-user PDSCH communication and indicating a HARQ ACK/NACK reporting occasion for the multi-user PDSCH communication. The UE may receive a second DCI indicating a second DL grant that references the unicast PDSCH communication and indicating the HARQ ACK/NACK reporting occasion for the unicast PDSCH communication. The UE may determine the HARQ codebook by determining a first HARQ codebook based on the first ACK/NACK feedback and a second HARQ codebook based on the second ACK/NACK feedback. The UE may concatenate the first and second HARQ codebooks and transmit the concatenated first and second HARQ codebooks in the PUCCH reporting occasion.

In some aspects, the UE may determine whether a first group DAI counter matches a second group DAI counter, the first DCI indicating the first group DAI counter, and the second group DAI counter being maintained by the UE for multi-user PDSCH communications. The UE may determine that the first ACK/NACK feedback is an ACK if the first group DAI counter matches the second group DAI counter and decoding the multi-user PDSCH communication is successful. The UE may determine that the first ACK/NACK feedback is a NACK if the first group DAI counter does not match the second group DAI counter or decoding the multi-user PDSCH communication is unsuccessful. In some aspects, the UE may determine whether a first unicast DAI counter matches a second unicast DAI counter, the second DCI indicating the first unicast DAI counter, the first unicast DAI counter being independent from the first group DAI counter and being specific to the UE, and the second unicast DAI counter being maintained by the UE for PDSCH unicast communications. The UE may determine that the second ACK/NACK feedback is an ACK if the first unicast DAI counter matches the second unicast DAI counter and decoding the unicast PDSCH communication is successful. The UE may determine that the second ACK/NACK feedback is a NACK if the first unicast DAI counter does not match the second unicast DAI counter or decoding the unicast PDSCH communication is unsuccessful.

In some aspects, the UE may receive a second DCI indicating a second DL grant that references the unicast PDSCH communication and indicating a HARQ ACK/NACK reporting occasion. The UE may concatenate the first ACK/NACK feedback to the HARQ codebook and transmit the HARQ codebook concatenated with the first ACK/NACK feedback in the HARQ ACK/NACK reporting occasion.

In some aspects, the UE may receive a group-RNTI from a BS and may monitor for a first DCI indicating the group-RNTI. The UE may receive, based on the monitoring, the first DCI indicating the group-RNTI and may decode the first DCI indicating a first DL grant that references the multi-user PDSCH communication. The UE may decode the multi-user PDSCH communication based on the first DCI and determine the first ACK/NACK feedback based on decoding the multi-user PDSCH communication. Additionally, the UE may monitor for a second DCI from the BS and receive, based on the monitoring, the second DCI indicating a second DL grant that references the unicast PDSCH communication. The UE may decode the unicast PDSCH communication based on the second DCI and determine the second ACK/NACK feedback based on decoding the unicast PDSCH communication.

Figure 14:
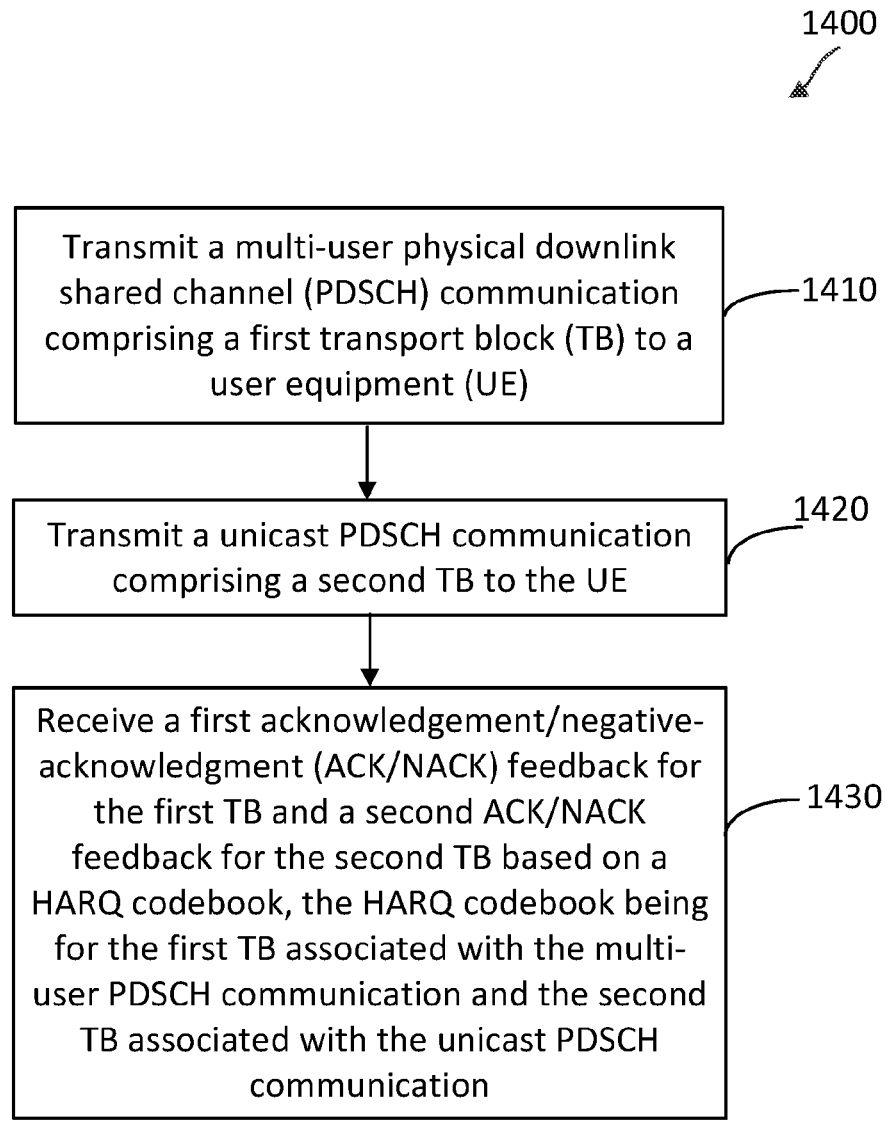
FIG. 14 illustrates a flow diagram of a communication method for communicating ACK/NACK feedbacks for multi-user and unicast PDSCH communications in accordance with one or more aspects of the present disclosure.

FIG. 14 illustrates a flow diagram of a communication method 1400 for communicating ACK/NACK feedbacks for multi-user and unicast PDSCH communications in accordance with one or more aspects of the present disclosure. Blocks of the method 1400 can be executed by a computing device (e.g., a processor, processing circuit, and/or other suitable component) of a wireless communication device. In some aspects, the wireless communication device is a BS (e.g., BS 105 and/or BS 600) that may utilize one or more components, such as the processor 602, the memory 604, the PDSCH module 608, the HARQ codebook module 609, the transceiver 610, and/or the antennas 616 to execute the blocks of the method 1400. The method 1400 may employ similar aspects as in the flexible scheduling timeline 200 in FIG. 2, the communication scheme 300 in FIG. 3, the communication scheme 400 in FIG. 4, the communication scheme 700 in FIGS. 7A-7C, FIGS. 8A-8E, the communication scheme 900 in FIGS. 9A-9C, FIGS. 10A-10E, the communication scheme 1100 in FIGS. 11A-11C, and/or FIGS. 12A-12E. As illustrated, the method 1400 includes a number of enumerated blocks, but aspects of the method 1400 may include additional blocks before, after, and/or in between the enumerated blocks. In some aspects, one or more of the enumerated blocks may be omitted or performed in a different order.

At block 1410, the method 1400 includes transmitting a multi-user physical downlink shared channel (PDSCH) communication comprising a first transport block (TB) to a user equipment (UE).

At block 1420, the method 1400 includes transmitting a unicast PDSCH communication comprising a second TB to the UE.

At block 1430, the method 1400 includes receiving a first acknowledgement/negative-acknowledgment (ACK/NACK) feedback for the first TB and a second ACK/NACK feedback for the second TB based on a HARQ codebook, the HARQ codebook being for the first TB associated with the multi-user PDSCH communication and the second TB associated with the unicast PDSCH communication.

In some aspects, the BS may transmit a first DCI indicating a first downlink (DL) grant that references the multi-user PDSCH communication and indicating a first HARQ ACK/NACK reporting occasion for the multi-user PDSCH communication. The BS may transmit a second DCI indicating a second DL grant that references the unicast PDSCH communication and indicating a second HARQ ACK/NACK reporting occasion for the unicast PDSCH communication. The second HARQ ACK/NACK reporting occasion may be different from the first HARQ reporting occasion. A first HARQ codebook may be based on the first ACK/NACK feedback and a second HARQ codebook may be based on the second ACK/NACK feedback. The BS may receive the first ACK/NACK feedback by receiving the first ACK/NACK feedback based on the first HARQ codebook. The BS may receive the second ACK/NACK feedback by receiving the second ACK/NACK feedback based on the second HARQ codebook. The BS may transmit the first DCI by transmitting the first DCI indicating a first group DAI counter and may transmit the second DCI by transmitting the second DCI indicating a second group DAI counter independent of the first DAI counter.

In some aspects, the BS may transmit a first DCI indicating a first DL grant that references the multi-user PDSCH communication and indicating a HARQ ACK/NACK reporting occasion for the multi-user PDSCH communication. The BS may transmit a second DCI indicating a second DL grant that references the unicast PDSCH communication and indicating the HARQ ACK/NACK reporting occasion for the unicast PDSCH communication. The first ACK/NACK feedback may precede the second ACK/NACK feedback in the HARQ codebook if the BS transmits the first DCI before transmitting the second DCI. The second ACK/NACK feedback may precede the first ACK/NACK feedback in the HARQ codebook if the BS transmits the second DCI before transmitting the first DCI.

In some aspects, the BS may transmit a first DCI indicating a first DL grant that references the multi-user PDSCH communication and indicating a HARQ ACK/NACK reporting occasion for the multi-user PDSCH communication. The BS may transmit a second DCI indicating a second DL grant that references the unicast PDSCH communication and indicating the HARQ ACK/NACK reporting occasion for the unicast PDSCH communication. A first HARQ codebook may be based on the first ACK/NACK feedback and a second HARQ codebook may be based on the second ACK/NACK feedback. The BS may receive the first and second HARQ codebooks in the PUCCH reporting occasion, where the first HARQ codebook is concatenated to the second HARQ codebook. In some aspects, the BS may transmit a second DCI indicating a second DL grant that references the unicast PDSCH communication and indicating a HARQ ACK/NACK reporting occasion. The BS may receive the HARQ codebook concatenated with the first ACK/NACK feedback in the HARQ ACK/NACK reporting occasion.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), comprising:
   receiving a multi-user physical downlink shared channel (PDSCH) communication comprising: a first transport block (TB) for the UE;
   receiving a unicast PDSCH communication comprising a second TB for the UE;
   determining a hybrid automatic repeat request (HARQ) codebook for the first TB associated with the multi-user PDSCH communication and the second TB associated with the unicast PDSCH communication; and
   transmitting a first acknowledgement/negative-acknowledgment (ACK/NACK) feedback for the first TB and a second ACK/NACK feedback for the second TB based on the determined HARQ codebook.

2. The method of claim 1 performed by the UE, further comprising:
   receiving a first downlink control information (DCI) indicating a first downlink (DL) grant that references the multi-user PDSCH communication and indicating a first HARQ ACK/NACK reporting occasion for the multi-user PDSCH communication; and
   receiving a second DCI indicating a second DL grant that references the unicast PDSCH communication and indicating a second HARQ ACK/NACK reporting occasion for the unicast PDSCH communication, the second HARQ ACK/NACK reporting occasion being different from the first HARQ reporting occasion,
   wherein determining the HARQ codebook includes determining a first HARQ codebook based on the first ACK/NACK feedback and a second HARQ codebook based on the second ACK/NACK feedback.

3. The method of claim 2 performed by the UE,
   wherein transmitting the first ACK/NACK feedback includes transmitting the first ACK/NACK feedback based on the first HARQ codebook, and
   wherein transmitting the second ACK/NACK feedback includes transmitting the second ACK/NACK feedback based on the second HARQ codebook.

4. The method of claim 2 performed by the UE,
   wherein receiving the first DCI includes receiving the first DCI indicating a first group DL assignment index (DAI) counter, and
   wherein receiving the second DCI includes receiving the second DCI indicating a second group DAI counter independent of the first DAI counter.

5. The method of claim 2 performed by the UE, further comprising:
   determining whether a first group DAI counter matches a second group DAI counter, the first DCI indicating the first group DAI counter, and the second group DAI counter being maintained by the UE for PDSCH communications;
   determining that the first ACK/NACK feedback is an ACK if the first group DAI counter matches the second group DAI counter and decoding the multi-user PDSCH communication is successful; and
   determining that the first ACK/NACK feedback is a NACK if the first group DAI counter does not match the second group DAI counter or decoding the multi-user PDSCH communication is unsuccessful.

6. The method of claim 5 performed by the UE, further comprising:
   determining whether a first unicast DAI counter matches a second unicast DAI counter, the second DCI indicating the first unicast DAI counter, the first unicast DAI counter being independent from the first group DAI counter and being specific to the UE, and the second unicast DAI counter being maintained by the UE for PDSCH unicast communications;
   determining that the second ACK/NACK feedback is an ACK if the first unicast DAI counter matches the second unicast DAI counter and decoding the unicast PDSCH communication is successful; and
   determining that the second ACK/NACK feedback is a NACK if the first unicast DAI counter does not match the second unicast DAI counter or decoding the unicast PDSCH communication is unsuccessful.

7. The method of claim 6, wherein transmitting the first ACK/NACK feedback includes transmitting a first number of ACK/NACK feedbacks based on the first HARQ codebook, the first DCI indicating a first group DAI total, the multi-user PDSCH communication being the last multi-user PDSCH communication corresponding to the first HARQ codebook, and the first number of ACK/NACK feedbacks matching the first group DAI total.

8. The method of claim 7, wherein transmitting the second ACK/NACK feedback includes transmitting a second number of ACK/NACK feedbacks based on the second HARQ codebook, the second DCI indicating a first unicast DAI total, the unicast PDSCH communication being the last unicast communication corresponding to the second HARQ codebook, the second number of ACK/NACK feedbacks matching the first unicast DAI total, and the first group DAI total being independent from the first unicast DAI total.

9. The method of 6 performed by the UE, further comprising:
receiving a third DCI, the third DCI indicating a third DL grant that references a second multi-user PDSCH communication comprising a third TB, the first HARQ ACK/NACK reporting occasion for the second multi-user PDSCH communication, and an updated first group DAI counter that is based on the first group DAI counter;
updating the second group DAI counter;
determining whether the updated first group DAI counter matches the updated second group DAI counter;
determining that a third ACK/NACK feedback for the third TB is an ACK if the updated first group DAI counter matches the updated second group DAI counter and decoding the second multi-user PDSCH communication is successful; and
determining that the third ACK/NACK feedback is a NACK if the updated first group DAI counter does not match the updated second group DAI counter or decoding the second multi-user PDSCH communication is unsuccessful.

10. The method of 9 performed by the UE, wherein determining the HARQ codebook includes determining the first HARQ codebook based on the third ACK/NACK feedback, further comprising:
transmitting the third ACK/NACK feedback for the third TB based on the first HARQ codebook.

11. The method of 6 performed by the UE, further comprising:
receiving a fourth DCI, the fourth DCI indicating a fourth DL grant that references a second unicast PDSCH communication comprising a fourth TB, the second HARQ ACK/NACK reporting occasion for the second unicast PDSCH communication, and an updated first unicast DAI counter that is based on the first unicast DAI counter;
updating the second unicast DAI counter;
determining whether the updated first unicast DAI counter matches the updated second unicast DAI counter;
determining that a fourth ACK/NACK feedback for the fourth TB is an ACK if the updated first unicast DAI counter matches the updated second unicast DAI counter and decoding the second unicast PDSCH communication is successful; and
determining that the fourth ACK/NACK feedback is a NACK if the updated first unicast DAI counter does not match the updated second unicast DAI counter or decoding the second unicast PDSCH communication is unsuccessful.

12. The method of 11 performed by the UE, wherein determining the HARQ codebook includes determining the second HARQ codebook based on the fourth ACK/NACK feedback, further comprising:
transmitting the fourth ACK/NACK feedback for the fourth TB based on the second HARQ codebook.

13. The method of claim 1 performed by the UE, further comprising:
determining that decoding the multi-user PDSCH communication results in an error; and
determining that the first ACK/NACK feedback is a NACK for the first TB.

14. The method of claim 1 performed by the UE, further comprising:
receiving a first DCI indicating a first DL grant that references the multi-user PDSCH communication and indicating a HARQ ACK/NACK reporting occasion for the multi-user PDSCH communication; and
receiving a second DCI indicating a second DL grant that references the unicast PDSCH communication and indicating the HARQ ACK/NACK reporting occasion for the unicast PDSCH communication.

15. The method of claim 14, wherein the first ACK/NACK feedback precedes the second ACK/NACK feedback in the HARQ codebook if receiving the first DCI occurs before receiving the second DCI, and wherein the second ACK/NACK feedback precedes the first ACK/NACK feedback in the HARQ codebook if receiving the second DCI occurs before receiving the first DCI.

16. The method of claim 14 performed by the UE, further comprising:
determining whether a first composite DAI counter matches a second composite DAI counter, the first DCI indicating a first composite DAI counter, and the second composite DAI counter being maintained by the UE for multi-user and unicast PDSCH communications;
determining that the first ACK/NACK feedback is an ACK if the first composite DAI counter matches the second composite DAI counter and decoding the multi-user PDSCH communication is successful; and
determining that the first ACK/NACK feedback is a NACK if the first composite DAI counter does not match the second composite DAI counter or decoding the multi-user PDSCH communication is unsuccessful.

17. The method of claim 16 performed by the UE, wherein the second DCI indicates a third composite DAI counter that is based on an update to the first composite DAI counter, the method further comprising:
updating the second composite DAI counter to a fourth composite DAI counter;
determining whether the third composite DAI counter matches the fourth composite DAI counter;
determining that the second ACK/NACK feedback is an ACK if the third composite DAI counter matches the fourth composite DAI counter and decoding the unicast PDSCH communication is successful; and
determining that the second ACK/NACK feedback is a NACK if the third composite DAI counter does not match the fourth composite DAI counter or decoding the unicast PDSCH communication is unsuccessful.

18. The method of claim 17, wherein transmitting the first ACK/NACK feedback includes transmitting a first number of ACK/NACK feedbacks based on the HARQ codebook, the first DCI indicating a first composite DAI total, the multi-user PDSCH communication being the last PDSCH communication corresponding to the HARQ codebook, and the first number of ACK/NACK feedbacks including the first and second ACK/NACK feedbacks and matching the first composite DAI total.

19. The method of claim 17, wherein transmitting the second ACK/NACK feedback includes transmitting a second number of ACK/NACK feedbacks based on the HARQ codebook, the second DCI indicating a first composite DAI total, the unicast PDSCH communication being the last PDSCH communication corresponding to the HARQ codebook, and the second number of ACK/NACK feedbacks including the first and second ACK/NACK feedbacks and matching the first composite DAI total.

20. The method of claim 17 performed by the UE, further comprising:
receiving a third DCI, the third DCI indicating a third DL grant that references a PDSCH communication comprising a third TB, the HARQ ACK/NACK reporting occasion for the PDSCH communication, and a fifth composite DAI counter that is based on an update to the third composite DAI counter;
updating the fourth composite DAI counter to a sixth composite DAI counter;
determining whether the fifth composite DAI counter matches the sixth composite DAI counter;
determining that a third ACK/NACK feedback for the third TB is an ACK if the fifth composite DAI counter matches the sixth composite DAI counter and decoding the PDSCH communication is successful; and
determining that the third ACK/NACK feedback is a NACK if the fifth composite DAI counter does not match the sixth composite DAI counter or decoding the PDSCH communication is unsuccessful.

21. The method of 20, wherein transmitting the first ACK/NACK feedback includes transmitting a first number of ACK/NACK feedbacks based on the HARQ codebook, the third DCI indicating a first composite DAI total, the PDSCH communication being the last PDSCH communication corresponding to the HARQ codebook, and the first number of ACK/NACK feedbacks including the first, second, and third ACK/NACK feedbacks and matching the first composite DAI total.

22. The method of 14 performed by the UE, wherein the first ACK/NACK feedback and the second ACK/NACK feedback are multiplexed in the HARQ codebook.

23. The method of claim 1 performed by the UE, further comprising:
receiving a first DCI indicating a first DL grant that references the multi-user PDSCH communication and indicating a HARQ ACK/NACK reporting occasion for the multi-user PDSCH communication; and
receiving a second DCI indicating a second DL grant that references the unicast PDSCH communication and indicating the HARQ ACK/NACK reporting occasion for the unicast PDSCH communication,
wherein determining the HARQ codebook includes determining a first HARQ codebook based on the first ACK/NACK feedback and a second HARQ codebook based on the second ACK/NACK feedback.

24. The method of claim 23 performed by the UE, further comprising:
concatenating the first and second HARQ codebooks; and
transmitting the concatenated first and second HARQ codebooks in the PUCCH reporting occasion.

25. The method of claim 23 performed by the UE, further comprising:
determining whether a first group DAI counter matches a second group DAI counter, the first DCI indicating the first group DAI counter, and the second group DAI counter being maintained by the UE for multi-user PDSCH communications;
determining that the first ACK/NACK feedback is an ACK if the first group DAI counter matches the second group DAI counter and decoding the multi-user PDSCH communication is successful; and
determining that the first ACK/NACK feedback is a NACK if the first group DAI counter does not match the second group DAI counter or decoding the multi-user PDSCH communication is unsuccessful.

26. The method of claim 25 performed by the UE, further comprising:
determining whether a first unicast DAI counter matches a second unicast DAI counter, the second DCI indicating the first unicast DAI counter, the first unicast DAI counter being independent from the first group DAI counter and being specific to the UE, and the second unicast DAI counter being maintained by the UE for PDSCH unicast communications;
determining that the second ACK/NACK feedback is an ACK if the first unicast DAI counter matches the second unicast DAI counter and decoding the unicast PDSCH communication is successful; and
determining that the second ACK/NACK feedback is a NACK if the first unicast DAI counter does not match the second unicast DAI counter or decoding the unicast PDSCH communication is unsuccessful.

27. The method of claim 1 performed by the UE, further comprising:
receiving a second DCI indicating a second DL grant that references the unicast PDSCH communication and indicating a HARQ ACK/NACK reporting occasion;
concatenating the first ACK/NACK feedback to the HARQ codebook; and
transmitting the HARQ codebook concatenated with the first ACK/NACK feedback in the HARQ ACK/NACK reporting occasion.

28. The method of claim 1 performed by the UE, further comprising:
receiving a group-radio network temporary identifier (group-RNTI) from a base station (BS);
monitoring for a first downlink control information (DCI) indicating the group-RNTI;
receiving, based on the monitoring, the first DCI indicating the group-RNTI;
decoding the first DCI indicating a first downlink (DL) grant that references the multi-user PDSCH communication;
decoding the multi-user PDSCH communication based on the first DCI; and
determining the first ACK/NACK feedback based on decoding the multi-user PDSCH communication.

29. The method of claim 28 performed by the UE, further comprising:
monitoring for a second DCI from the BS;
receiving, based on the monitoring, the second DCI indicating a second DL grant that references the unicast PDSCH communication;
decoding the unicast PDSCH communication based on the second DCI; and
determining the second ACK/NACK feedback based on decoding the unicast PDSCH communication.

30. A user equipment (UE), comprising:
a transceiver configured to:
receive a multi-user physical downlink shared channel (PDSCH) communication comprising a first transport block (TB) for the UE;
receive a unicast PDSCH communication comprising a second TB for the UE; and
transmit a first acknowledgement/negative-acknowledgment (ACK/NACK) feedback for the first TB and a second ACK/NACK feedback for the second TB based on a determined HARQ codebook; and
a processor configured to:
determine the hybrid automatic repeat request (HARQ) codebook for the first TB associated with the multi-user PDSCH communication and the second TB associated with the unicast PDSCH communication.

31. The UE of claim 30,
wherein the transceiver is configured to:
receive a first downlink control information (DCI) indicating a first downlink (DL) grant that references the multi-user PDSCH communication and indicating a first HARQ ACK/NACK reporting occasion for the multi-user PDSCH communication; and
receive a second DCI indicating a second DL grant that references the unicast PDSCH communication and indicating a second HARQ ACK/NACK reporting occasion for the unicast PDSCH communication, wherein the second HARQ ACK/NACK reporting occasion is different from the first HARQ reporting occasion; and
wherein the processor is configured to:
determine a first HARQ codebook based on the first ACK/NACK feedback; and
determine a second HARQ codebook based on the second ACK/NACK feedback.

32. The UE of claim 31, wherein the processor is configured to:
determine whether a first group DAI counter matches a second group DAI counter, wherein the first DCI indicates the first group DAI counter, and the second group DAI counter is maintained by the UE for PDSCH communications;
determine that the first ACK/NACK feedback is an ACK if the first group DAI counter matches the second group DAI counter and decoding the multi-user PDSCH communication is successful; and
determine that the first ACK/NACK feedback is a NACK if the first group DAI counter does not match the second group DAI counter or decoding the multi-user PDSCH communication is unsuccessful.

33. The UE of claim 32, wherein the processor is configured to:
determine whether a first unicast DAI counter matches a second unicast DAI counter, wherein the second DCI indicates the first unicast DAI counter, the first unicast DAI counter is independent from the first group DAI counter and is specific to the UE, and the second unicast DAI counter is maintained by the UE for PDSCH unicast communications;
determine that the second ACK/NACK feedback is an ACK if the first unicast DAI counter matches the second unicast DAI counter and decoding the unicast PDSCH communication is successful; and
determine that the second ACK/NACK feedback is a NACK if the first unicast DAI counter does not match the second unicast DAI counter or decoding the unicast PDSCH communication is unsuccessful.

34. The UE of claim 33, wherein the transceiver is configured to:
transmitting a first number of ACK/NACK feedbacks based on the first HARQ codebook, wherein the first DCI indicates a first group DAI total, the multi-user PDSCH communication is the last multi-user PDSCH communication corresponding to the first HARQ codebook, and the first number of ACK/NACK feedbacks matches the first group DAI total and includes the first ACK/NACK feedback.

35. The UE of claim 34, wherein the transceiver is configured to:
transmitting a second number of ACK/NACK feedbacks based on the second HARQ codebook, wherein the second DCI indicates a first unicast DAI total, the unicast PDSCH communication is the last unicast communication corresponding to the second HARQ codebook, the second number of ACK/NACK feedbacks matches the first unicast DAI total and includes the second ACK/NACK feedback, and the first group DAI total is independent from the first unicast DAI total.

36. The UE of claim 31, wherein the transceiver is configured to:
transmit the first ACK/NACK feedback based on the first HARQ codebook; and
transmit the second ACK/NACK feedback based on the second HARQ codebook.

37. The UE of claim 33,
wherein the transceiver is configured to receive a third DCI, wherein the third DCI indicates a third DL grant that references a second multi-user PDSCH communication comprising a third TB, indicates the first HARQ ACK/NACK reporting occasion for the second multi-user PDSCH communication, and indicates an updated first group DAI counter that is based on the first group DAI counter; and
wherein the processor is configured to:
update the second group DAI counter;
determine whether the updated first group DAI counter matches the updated second group DAI counter;
determine that a third ACK/NACK feedback for the third TB is an ACK if the updated first group DAI counter matches the updated second group DAI counter and decoding the second multi-user PDSCH communication is successful; and
determine that the third ACK/NACK feedback is a NACK if the updated first group DAI counter does not match the updated second group DAI counter or decoding the second multi-user PDSCH communication is unsuccessful.

38. The UE of claim 37,
wherein the processor is configured to determine the first HARQ codebook based on the third ACK/NACK feedback; and
wherein the transceiver is configured to transmit the third ACK/NACK feedback for the third TB based on the first HARQ codebook.

39. The UE of claim 33,
wherein the transceiver is configured to receive a fourth DCI, wherein the fourth DCI indicates a fourth DL grant that references a second unicast PDSCH communication comprising a fourth TB, indicates the second HARQ ACK/NACK reporting occasion for the second unicast PDSCH communication, and indicates an updated first unicast DAI counter that is based on the first unicast DAI counter; and
wherein the processor is configured to:
update the second unicast DAI counter;
determine whether the updated first unicast DAI counter matches the updated second unicast DAI counter;
determine that a fourth ACK/NACK feedback for the fourth TB is an ACK if the updated first unicast DAI counter matches the updated second unicast DAI counter and decoding the second unicast PDSCH communication is successful; and
determine that the fourth ACK/NACK feedback is a NACK if the updated first unicast DAI counter does not match the updated second unicast DAI counter or decoding the second unicast PDSCH communication is unsuccessful.

40. The UE of claim 39,
wherein the processor is configured to determine the second HARQ codebook based on the fourth ACK/NACK feedback; and
wherein the transceiver is configured to transmit the fourth ACK/NACK feedback for the fourth TB based on the second HARQ codebook.

41. The UE of claim 30, wherein the processor is configured to:
determine that decoding the multi-user PDSCH communication results in an error; and
determine that the first ACK/NACK feedback is a NACK for the first TB.

42. The UE of claim 30, wherein the transceiver is configured to:
receive a first DCI indicating a first DL grant that references the multi-user PDSCH communication and indicating a HARQ ACK/NACK reporting occasion for the multi-user PDSCH communication; and
receive a second DCI indicating a second DL grant that references the unicast PDSCH communication and indicating the HARQ ACK/NACK reporting occasion for the unicast PDSCH communication.

43. The UE of claim 42, wherein the first ACK/NACK feedback precedes the second ACK/NACK feedback in the HARQ codebook if the transceiver receives the first DCI before receiving the second DCI, and wherein the second ACK/NACK feedback precedes the first ACK/NACK feedback in the HARQ codebook if the transceiver receives the second DCI before receiving the first DCI.

44. The UE of claim 42, wherein the processor is configured to:
determine whether a first composite DAI counter matches a second composite DAI counter, wherein the first DCI indicates a first composite DAI counter, and the second composite DAI counter is maintained by the UE for multi-user and unicast PDSCH communications;
determine that the first ACK/NACK feedback is an ACK if the first composite DAI counter matches the second composite DAI counter and decoding the multi-user PDSCH communication is successful; and
determine that the first ACK/NACK feedback is a NACK if the first composite DAI counter does not match the second composite DAI counter or decoding the multi-user PDSCH communication is unsuccessful.

45. The UE of claim 42, wherein the second DCI indicates a third composite DAI counter that is based on an update to the first composite DAI counter, and wherein the processor is configured to:
update the second composite DAI counter to a fourth composite DAI counter;
determine whether the third composite DAI counter matches the fourth composite DAI counter;
determine that the second ACK/NACK feedback is an ACK if the third composite DAI counter matches the fourth composite DAI counter and decoding the unicast PDSCH communication is successful; and
determine that the second ACK/NACK feedback is a NACK if the third composite DAI counter does not match the fourth composite DAI counter or decoding the unicast PDSCH communication is unsuccessful.

46. The UE of claim 45, wherein the transceiver is configured to transmit a first number of ACK/NACK feedbacks based on the HARQ codebook, wherein the first DCI indicates a first composite DAI total, the multi-user PDSCH communication is the last PDSCH communication corresponding to the HARQ codebook, and the first number of ACK/NACK feedbacks includes the first and second ACK/NACK feedbacks and matches the first composite DAI total.

47. The UE of claim 45, wherein the transceiver is configured to transmit a second number of ACK/NACK feedbacks based on the HARQ codebook, wherein the second DCI indicates a first composite DAI total, the unicast PDSCH communication is the last PDSCH communication corresponding to the HARQ codebook, and the second number of ACK/NACK feedbacks includes the first and second ACK/NACK feedbacks and matches the first composite DAI total.

48. The UE of claim 45,
wherein the transceiver is configured to receives a third DCI, wherein the third DCI indicates a third DL grant that references a PDSCH communication comprising a third TB, indicates the HARQ ACK/NACK reporting occasion for the PDSCH communication, and indicates a fifth composite DAI counter that is based on an update to the third composite DAI counter; and
wherein the processor is configured to:
update the fourth composite DAI counter to a sixth composite DAI counter;
determine whether the fifth composite DAI counter matches the sixth composite DAI counter;
determine that a third ACK/NACK feedback for the third TB is an ACK if the fifth composite DAI counter matches the sixth composite DAI counter and decoding the PDSCH communication is successful; and
determine that the third ACK/NACK feedback is a NACK if the fifth composite DAI counter does not match the sixth composite DAI counter or decoding the PDSCH communication is unsuccessful.

49. The UE of claim 42, wherein the first ACK/NACK feedback and the second ACK/NACK feedback are multiplexed in the HARQ codebook.

50. The UE of claim 30,
wherein the transceiver is configured to:
receive a first DCI indicating a first DL grant that references the multi-user PDSCH communication and indicating a HARQ ACK/NACK reporting occasion for the multi-user PDSCH communication; and
receive a second DCI indicating a second DL grant that references the unicast PDSCH communication and indicating the HARQ ACK/NACK reporting occasion for the unicast PDSCH communication; and
wherein the processor is configured to determine a first HARQ codebook based on the first ACK/NACK feedback and determine a second HARQ codebook based on the second ACK/NACK feedback.

51. The UE of claim 50,
wherein the processor is configured to concatenate the first and second HARQ codebooks; and
wherein the transceiver is configured to transmit the concatenated first and second HARQ codebooks in the PUCCH reporting occasion.

52. The UE of claim 50, wherein the processor is configured to:
determine whether a first group DAI counter matches a second group DAI counter, wherein the first DCI indicates the first group DAI counter, and the second group DAI counter is maintained by the UE for multi-user PDSCH communications;
determine that the first ACK/NACK feedback is an ACK if the first group DAI counter matches the second group DAI counter and decoding the multi-user PDSCH communication is successful; and determine that the first ACK/NACK feedback is a NACK if the first group DAI counter does not match the second group DAI counter or decoding the multi-user PDSCH communication is unsuccessful.

53. The UE of claim 50, wherein the processor is configured to:
determine whether a first unicast DAI counter matches a second unicast DAI counter, wherein the second DCI indicates the first unicast DAI counter, the first unicast DAI counter is independent from the first group DAI counter and is specific to the UE, and the second unicast DAI counter is maintained by the UE for PDSCH unicast communications;
determine that the second ACK/NACK feedback is an ACK if the first unicast DAI counter matches the second unicast DAI counter and decoding the unicast PDSCH communication is successful; and
determine that the second ACK/NACK feedback is a NACK if the first unicast DAI counter does not match the second unicast DAI counter or decoding the unicast PDSCH communication is unsuccessful.

54. A non-transitory computer-readable medium having program code recorded thereon, the program code being executable by one or more processors of a user equipment (UE), the program code comprising:
code for causing the UE to receive a multi-user physical downlink shared channel (PDSCH) communication comprising a first transport block (TB) for the UE;
code for causing the UE to receive a unicast PDSCH communication comprising a second TB for the UE;
code for causing the UE to determine a hybrid automatic repeat request (HARQ) codebook for the first TB associated with the multi-user PDSCH communication and the second TB associated with the unicast PDSCH communication; and
code for causing the UE to transmit a first acknowledgement/negative-acknowledgment (ACK/NACK) feedback for the first TB and a second ACK/NACK feedback for the second TB based on the determined HARQ codebook.

55. The non-transitory computer-readable medium of claim 54, the program code comprising:
code for causing the UE to receive a first downlink control information (DCI) indicating a first DL grant that references the multi-user PDSCH communication and indicating a first HARQ ACK/NACK reporting occasion for the multi-user PDSCH communication; and
code for causing the UE to receive a second DCI indicating a second DL grant that references the unicast PDSCH communication and indicating a second HARQ ACK/NACK reporting occasion for the unicast PDSCH communication, wherein the second HARQ ACK/NACK reporting occasion is different from the first HARQ reporting occasion,
wherein the code for causing the UE to determine the HARQ codebook includes code for causing the UE to determine a first HARQ codebook based on the first ACK/NACK feedback and a second HARQ codebook based on the second ACK/NACK feedback.

56. The non-transitory computer-readable medium of claim 55,
wherein the code for causing the UE to transmit the first ACK/NACK feedback includes code for causing the UE to transmit the first ACK/NACK feedback based on the first HARQ codebook, and
wherein the code for causing the UE to transmit the second ACK/NACK feedback includes code for causing the UE to transmit the second ACK/NACK feedback based on the second HARQ codebook.

57. The non-transitory computer-readable medium of claim 55, the program code comprising:
code for causing the UE to determine whether a first group DAI counter matches a second group DAI counter, wherein the first DCI indicates the first group DAI counter, and the second group DAI counter is maintained by the UE for PDSCH communications;
code for causing the UE to determine that the first ACK/NACK feedback is an ACK if the first group DAI counter matches the second group DAI counter and decoding the multi-user PDSCH communication is successful; and
code for causing the UE to determine that the first ACK/NACK feedback is a NACK if the first group DAI counter does not match the second group DAI counter or decoding the multi-user PDSCH communication is unsuccessful.

58. The non-transitory computer-readable medium of claim 57, the program code comprising:
code for causing the UE to determine whether a first unicast DAI counter matches a second unicast DAI counter, wherein the second DCI indicates the first unicast DAI counter, the first unicast DAI counter is independent from the first group DAI counter and is specific to the UE, and the second unicast DAI counter is maintained by the UE for PDSCH unicast communications;
code for causing the UE to determine that the second ACK/NACK feedback is an ACK if the first unicast DAI counter matches the second unicast DAI counter and decoding the unicast PDSCH communication is successful; and
code for causing the UE to determine that the second ACK/NACK feedback is a NACK if the first unicast DAI counter does not match the second unicast DAI counter or decoding the unicast PDSCH communication is unsuccessful.

59. The non-transitory computer-readable medium of claim 54, the program code comprising:
code for causing the UE to receive a first DCI indicating a first DL grant that references the multi-user PDSCH communication and indicating a HARQ ACK/NACK reporting occasion for the multi-user PDSCH communication; and
code for causing the UE to receive a second DCI indicating a second DL grant that references the unicast PDSCH communication and indicating the HARQ ACK/NACK reporting occasion for the unicast PDSCH communication.

60. The non-transitory computer-readable medium of claim 54, the program code comprising:
code for causing the UE to determine whether a first composite DAI counter matches a second composite DAI counter, wherein the first DCI indicates a first composite DAI counter, and the second composite DAI counter is maintained by the UE for multi-user and unicast PDSCH communications;
code for causing the UE to determine that the first ACK/NACK feedback is an ACK if the first composite DAI counter matches the second composite DAI counter and decoding the multi-user PDSCH communication is successful; and
code for causing the UE to determine that the first ACK/NACK feedback is a NACK if the first composite DAI counter does not match the second composite DAI counter or decoding the multi-user PDSCH communication is unsuccessful.

61. The non-transitory computer-readable medium of claim 60, wherein the second DCI indicates a third composite DAI counter that is based on an update to the first composite DAI counter, the program code comprising:
code for causing the UE to update the second composite DAI counter to a fourth composite DAI counter;
code for causing the UE to determine whether the third composite DAI counter matches the fourth composite DAI counter;
code for causing the UE to determine that the second ACK/NACK feedback is an ACK if the third composite DAI counter matches the fourth composite DAI counter and decoding the unicast PDSCH communication is successful; and
code for causing the UE to determine that the second ACK/NACK feedback is a NACK if the third composite DAI counter does not match the fourth composite DAI counter or decoding the unicast PDSCH communication is unsuccessful.

62. The non-transitory computer-readable medium of claim 54, the program code comprising:
code for causing the UE to receive a first DCI indicating a first DL grant that references the multi-user PDSCH communication and indicating a HARQ ACK/NACK reporting occasion for the multi-user PDSCH communication; and
code for causing the UE to receive a second DCI indicating a second DL grant that references the unicast PDSCH communication and indicating the HARQ ACK/NACK reporting occasion for the unicast PDSCH communication,
wherein the code for causing the UE to determine the HARQ codebook includes code for causing the UE to determine a first HARQ codebook based on the first ACK/NACK feedback and a second HARQ codebook based on the second ACK/NACK feedback.

63. The non-transitory computer-readable medium of claim 62, the program code comprising:
code for causing the UE to concatenate the first and second HARQ codebooks; and
code for causing the UE to transmit the concatenated first and second HARQ codebooks in the PUCCH reporting occasion.

64. The non-transitory computer-readable medium of claim 54, the program code comprising:
code for causing the UE to receive a second DCI indicating a second DL grant that references the unicast PDSCH communication and indicating a HARQ ACK/NACK reporting occasion;
code for causing the UE to concatenate the first ACK/NACK feedback to the HARQ codebook; and
code for causing the UE to transmit the HARQ codebook concatenated with the first ACK/NACK feedback in the HARQ ACK/NACK reporting occasion.

65. A user equipment (UE) comprising:
means for receiving a multi-user physical downlink shared channel (PDSCH) communication comprising a first transport block (TB) for the UE;
means for receiving a unicast PDSCH communication comprising a second TB for the UE;
means for determining a hybrid automatic repeat request (HARQ) codebook for the first TB associated with the multi-user PDSCH communication and the second TB associated with the unicast PDSCH communication; and
means for transmitting a first acknowledgement/negative-acknowledgment (ACK/NACK) feedback for the first TB and a second ACK/NACK feedback for the second TB based on the determined HARQ codebook.

66. The UE of claim 65, comprising:
means for receiving a first downlink control information (DCI) indicating a first downlink (DL) grant that references the multi-user PDSCH communication and indicating a first HARQ ACK/NACK reporting occasion for the multi-user PDSCH communication; and
means for receiving a second DCI indicating a second DL grant that references the unicast PDSCH communication and indicating a second HARQ ACK/NACK reporting occasion for the unicast PDSCH communication, the second HARQ ACK/NACK reporting occasion being different from the first HARQ reporting occasion,
wherein the means for determining the HARQ codebook includes means for determining a first HARQ codebook based on the first ACK/NACK feedback and means for determining a second HARQ codebook based on the second ACK/NACK feedback.

67. The UE of claim 66,
wherein the means for transmitting the first ACK/NACK feedback includes means for transmitting the first ACK/NACK feedback based on the first HARQ codebook, and
wherein the means for transmitting the second ACK/NACK feedback includes means for transmitting the second ACK/NACK feedback based on the second HARQ codebook.

68. The UE of claim 66,
wherein the means for receiving the first DCI includes means for receiving the first DCI indicating a first group DL assignment index (DAI) counter, and
wherein the means for receiving the second DCI includes means for receiving the second DCI indicating a second group DAI counter independent of the first DAI counter.

69. The UE of claim 65, further comprising:
means for determining that decoding the multi-user PDSCH communication results in an error; and
means for determining that the first ACK/NACK feedback is a NACK for the first TB.

70. The UE of claim 65, further comprising:
means for receiving a first DCI indicating a first DL grant that references the multi-user PDSCH communication and indicating a HARQ ACK/NACK reporting occasion for the multi-user PDSCH communication; and
means for receiving a second DCI indicating a second DL grant that references the unicast PDSCH communication and indicating the HARQ ACK/NACK reporting occasion for the unicast PDSCH communication.

71. The UE of claim 65, further comprising:
means for receiving a first DCI indicating a first DL grant that references the multi-user PDSCH communication and indicating a HARQ ACK/NACK reporting occasion for the multi-user PDSCH communication; and
means for receiving a second DCI indicating a second DL grant that references the unicast PDSCH communication and indicating the HARQ ACK/NACK reporting occasion for the unicast PDSCH communication,
wherein the means for determining the HARQ codebook includes means for determining a first HARQ codebook based on the first ACK/NACK feedback and means for determining a second HARQ codebook based on the second ACK/NACK feedback.

72. The UE of claim 65, further comprising:
means for receiving a second DCI indicating a second DL grant that references the unicast PDSCH communication and indicating a HARQ ACK/NACK reporting occasion;
means for concatenating the first ACK/NACK feedback to the HARQ codebook; and
means for transmitting the HARQ codebook concatenated with the first ACK/NACK feedback in the HARQ ACK/NACK reporting occasion.

73. A method of wireless communication performed by a base station (BS), comprising:
transmitting a multi-user physical downlink shared channel (PDSCH) communication comprising a first transport block (TB) to a user equipment (UE);
transmitting a unicast PDSCH communication comprising a second TB to the UE; and
receiving a first acknowledgement/negative-acknowledgment (ACK/NACK) feedback for the first TB and a second ACK/NACK feedback for the second TB based on a HARQ codebook, the HARQ codebook being for the first TB associated with the multi-user PDSCH communication and for the second TB associated with the unicast PDSCH communication.

74. The method of claim 73 performed by the BS, further comprising:
transmitting a first downlink control information (DCI) indicating a first downlink (DL) grant that references the multi-user PDSCH communication and indicating a first HARQ ACK/NACK reporting occasion for the multi-user PDSCH communication; and
transmitting a second DCI indicating a second DL grant that references the unicast PDSCH communication and indicating a second HARQ ACK/NACK reporting occasion for the unicast PDSCH communication, the second HARQ ACK/NACK reporting occasion being different from the first HARQ reporting occasion,
wherein a first HARQ codebook is based on the first ACK/NACK feedback and a second HARQ codebook is based on the second ACK/NACK feedback.

75. The method of claim 73 performed by the BS,
wherein receiving the first ACK/NACK feedback includes receiving the first ACK/NACK feedback based on the first HARQ codebook, and
wherein receiving the second ACK/NACK feedback includes receiving the second ACK/NACK feedback based on the second HARQ codebook.

76. The method of claim 74 performed by the BS,
wherein transmitting the first DCI includes transmitting the first DCI indicating a first group DL assignment index (DAI) counter, and
wherein transmitting the second DCI includes transmitting the second DCI indicating a second group DAI counter independent of the first DAI counter.

77. The method of claim 73 performed by the BS, further comprising:
transmitting a first DCI indicating a first DL grant that references the multi-user PDSCH communication and indicating a HARQ ACK/NACK reporting occasion for the multi-user PDSCH communication; and
transmitting a second DCI indicating a second DL grant that references the unicast PDSCH communication and indicating the HARQ ACK/NACK reporting occasion for the unicast PDSCH communication.

78. The method of claim 77, wherein the first ACK/NACK feedback precedes the second ACK/NACK feedback in the HARQ codebook if the BS transmits the first DCI before transmitting the second DCI, and wherein the second ACK/NACK feedback precedes the first ACK/NACK feedback in the HARQ codebook if the BS transmits the second DCI before transmitting the first DCI.

79. The method of claim 73 performed by the BS, further comprising:
transmitting a first DCI indicating a first DL grant that references the multi-user PDSCH communication and indicating a HARQ ACK/NACK reporting occasion for the multi-user PDSCH communication; and
transmitting a second DCI indicating a second DL grant that references the unicast PDSCH communication and indicating the HARQ ACK/NACK reporting occasion for the unicast PDSCH communication,
wherein a first HARQ codebook is based on the first ACK/NACK feedback and a second HARQ codebook is based on the second ACK/NACK feedback.

80. The method of claim 79 performed by the BS, further comprising:
receiving the first and second HARQ codebooks in the PUCCH reporting occasion, wherein the first HARQ codebook is concatenated to the second HARQ codebook.

81. The method of claim 73 performed by the BS, further comprising:
transmitting a second DCI indicating a second DL grant that references the unicast PDSCH communication and indicating a HARQ ACK/NACK reporting occasion; and
receiving the HARQ codebook concatenated with the first ACK/NACK feedback in the HARQ ACK/NACK reporting occasion.

82. A base station (BS), comprising:
a transceiver configured to:
transmit a multi-user physical downlink shared channel (PDSCH) communication comprising a first transport block (TB) to a user equipment (UE);
transmit a unicast PDSCH communication comprising a second TB to the UE; and
receive a first acknowledgement/negative-acknowledgment (ACK/NACK) feedback for the first TB and a second ACK/NACK feedback for the second TB based on a HARQ codebook, wherein the HARQ codebook is for the first TB associated with the multi-user PDSCH communication and for the second TB associated with the unicast PDSCH communication.

83. The BS of claim 82, wherein the transceiver is configured to:
transmit a first downlink control information (DCI) indicating a first downlink (DL) grant that references the multi-user PDSCH communication and indicating a first HARQ ACK/NACK reporting occasion for the multi-user PDSCH communication; and
transmit a second DCI indicating a second DL grant that references the unicast PDSCH communication and indicating a second HARQ ACK/NACK reporting occasion for the unicast PDSCH communication,
wherein the second HARQ ACK/NACK reporting occasion is different from the first HARQ reporting occasion, and wherein a first HARQ codebook is based on the first ACK/NACK feedback and a second HARQ codebook is based on the second ACK/NACK feedback.

84. The BS of claim 82, wherein the transceiver is configured to:
receive the first ACK/NACK feedback based on the first HARQ codebook; and
receive the second ACK/NACK feedback based on the second HARQ codebook.

85. The BS of claim 84, wherein the transceiver is configured to:
transmit the first DCI indicating a first group DL assignment index (DAI) counter; and
transmit the second DCI indicating a second group DAI counter independent of the first DAI counter.

86. The BS of claim 82, wherein the transceiver is configured to:
transmit a first DCI indicating a first DL grant that references the multi-user PDSCH communication and indicating a HARQ ACK/NACK reporting occasion for the multi-user PDSCH communication; and
transmit a second DCI indicating a second DL grant that references the unicast PDSCH communication and indicating the HARQ ACK/NACK reporting occasion for the unicast PDSCH communication.

87. The BS of claim 82, wherein the first ACK/NACK feedback precedes the second ACK/NACK feedback in the HARQ codebook if the BS transmits the first DCI before transmitting the second DCI, and wherein the second ACK/NACK feedback precedes the first ACK/NACK feedback in the HARQ codebook if the BS transmits the second DCI before transmitting the first DCI.

88. The BS of claim 82, wherein the transceiver is configured to:
transmit a first DCI indicating a first DL grant that references the multi-user PDSCH communication and indicating a HARQ ACK/NACK reporting occasion for the multi-user PDSCH communication; and
transmit a second DCI indicating a second DL grant that references the unicast PDSCH communication and indicating the HARQ ACK/NACK reporting occasion for the unicast PDSCH communication,
wherein a first HARQ codebook is based on the first ACK/NACK feedback and a second HARQ codebook is based on the second ACK/NACK feedback.

89. The BS of claim 88, wherein the transceiver is configured to:
receive the first and second HARQ codebooks in the PUCCH reporting occasion, wherein the first HARQ codebook is concatenated to the second HARQ codebook.

90. The BS of claim 82, wherein the transceiver is configured to:
transmit a second DCI indicating a second DL grant that references the unicast PDSCH communication and indicating a HARQ ACK/NACK reporting occasion; and
receive the HARQ codebook concatenated with the first ACK/NACK feedback in the HARQ ACK/NACK reporting occasion.

91. A non-transitory computer-readable medium having program code recorded thereon, the program code being executable by one or more processors of a base station (BS), the program code comprising:
code for causing the BS to transmit a multi-user physical downlink shared channel (PDSCH) communication comprising a first transport block (TB) to a user equipment (UE);
code for causing the BS to transmit a unicast PDSCH communication comprising a second TB to the UE; and
code for causing the BS to receive a first acknowledgement/negative-acknowledgment (ACK/NACK) feedback for the first TB and a second ACK/NACK feedback for the second TB based on a HARQ codebook, wherein the HARQ codebook is for the first TB associated with the multi-user PDSCH communication and for the second TB associated with the unicast PDSCH communication.

92. The non-transitory computer-readable medium of claim 91, the program code comprising:
code for causing the BS to transmit a first downlink control information (DCI) indicating a first downlink (DL) grant that references the multi-user PDSCH communication and indicating a first HARQ ACK/NACK reporting occasion for the multi-user PDSCH communication; and
code for causing the BS to transmit a second DCI indicating a second DL grant that references the unicast PDSCH communication and indicating a second HARQ ACK/NACK reporting occasion for the unicast PDSCH communication, wherein the second HARQ ACK/NACK reporting occasion is different from the first HARQ reporting occasion,
wherein a first HARQ codebook is based on the first ACK/NACK feedback and a second HARQ codebook is based on the second ACK/NACK feedback.

93. The non-transitory computer-readable medium of claim 91,
wherein the code for causing the BS to receive the first ACK/NACK feedback includes code for causing the BS to receive the first ACK/NACK feedback based on the first HARQ codebook, and
wherein the code for causing the BS to receive the second ACK/NACK feedback includes code for causing the BS to receive the second ACK/NACK feedback based on the second HARQ codebook.

94. The non-transitory computer-readable medium of claim 92,
wherein the code for causing the BS to transmit the first DCI includes code for causing the BS to transmit the first DCI indicating a first group DL assignment index (DAI) counter, and
wherein the code for causing the BS to transmit the second DCI includes code for causing the BS to transmit the second DCI indicating a second group DAI counter independent of the first DAI counter.

95. The non-transitory computer-readable medium of claim 91, the program code comprising:
code for causing the BS to transmit a first DCI indicating a first DL grant that references the multi-user PDSCH communication and indicating a HARQ ACK/NACK reporting occasion for the multi-user PDSCH communication; and
code for causing the BS to transmit a second DCI indicating a second DL grant that references the unicast PDSCH communication and indicating the HARQ ACK/NACK reporting occasion for the unicast PDSCH communication.

96. The non-transitory computer-readable medium of claim 95, wherein the first ACK/NACK feedback precedes the second ACK/NACK feedback in the HARQ codebook if the BS transmits the first DCI before transmitting the second DCI, and wherein the second ACK/NACK feedback precedes the first ACK/NACK feedback in the HARQ codebook if the BS transmits the second DCI before transmitting the first DCI.

97. The non-transitory computer-readable medium of claim 91, the program code comprising:
code for causing the BS to transmit a first DCI indicating a first DL grant that references the multi-user PDSCH communication and indicating a HARQ ACK/NACK reporting occasion for the multi-user PDSCH communication; and
code for causing the BS to transmit a second DCI indicating a second DL grant that references the unicast PDSCH communication and indicating the HARQ ACK/NACK reporting occasion for the unicast PDSCH communication,
wherein a first HARQ codebook is based on the first ACK/NACK feedback and a second HARQ codebook is based on the second ACK/NACK feedback.

98. The non-transitory computer-readable medium of claim 97, the program code comprising:
code for causing the BS to receive the first and second HARQ codebooks in the PUCCH reporting occasion, wherein the first HARQ codebook is concatenated to the second HARQ codebook.

99. The non-transitory computer-readable medium of claim 91, the program code comprising:
code for causing the BS to transmit a second DCI indicating a second DL grant that references the unicast PDSCH communication and indicating a HARQ ACK/NACK reporting occasion; and
code for causing the BS to receive the HARQ codebook concatenated with the first ACK/NACK feedback in the HARQ ACK/NACK reporting occasion.

100. A user equipment (UE) comprising:
means for transmitting a multi-user physical downlink shared channel (PDSCH) communication comprising a first transport block (TB) to a user equipment (UE);
means for transmitting a unicast PDSCH communication comprising a second TB to the UE; and
means for receiving a first acknowledgement/negative-acknowledgment (ACK/NACK) feedback for the first TB and a second ACK/NACK feedback for the second TB based on a HARQ codebook, the HARQ codebook being for the first TB associated with the multi-user PDSCH communication and for the second TB associated with the unicast PDSCH communication.

101. The UE of claim 100, further comprising:
means for transmitting a first downlink control information (DCI) indicating a first downlink (DL) grant that references the multi-user PDSCH communication and indicating a first HARQ ACK/NACK reporting occasion for the multi-user PDSCH communication; and
means for transmitting a second DCI indicating a second DL grant that references the unicast PDSCH communication and indicating a second HARQ ACK/NACK reporting occasion for the unicast PDSCH communication, the second HARQ ACK/NACK reporting occasion being different from the first HARQ reporting occasion,
wherein a first HARQ codebook is based on the first ACK/NACK feedback and a second HARQ codebook is based on the second ACK/NACK feedback.

102. The UE of claim 100,
wherein the means for receiving the first ACK/NACK feedback includes means for receiving the first ACK/NACK feedback based on the first HARQ codebook, and
wherein the means for receiving the second ACK/NACK feedback includes means for receiving the second ACK/NACK feedback based on the second HARQ codebook.

103. The UE of claim 101,
wherein the means for transmitting the first DCI includes means for transmitting the first DCI indicating a first group DL assignment index (DAI) counter, and
wherein the means for transmitting the second DCI includes means for transmitting the second DCI indicating a second group DAI counter independent of the first DAI counter.

104. The UE of claim 100, further comprising:
means for transmitting a first DCI indicating a first DL grant that references the multi-user PDSCH communication and indicating a HARQ ACK/NACK reporting occasion for the multi-user PDSCH communication; and
means for transmitting a second DCI indicating a second DL grant that references the unicast PDSCH communication and indicating the HARQ ACK/NACK reporting occasion for the unicast PDSCH communication.

105. The UE of claim 104, wherein the first ACK/NACK feedback precedes the second ACK/NACK feedback in the HARQ codebook if the BS transmits the first DCI before transmitting the second DCI, and wherein the second ACK/NACK feedback precedes the first ACK/NACK feedback in the HARQ codebook if the BS transmits the second DCI before transmitting the first DCI.

106. The UE of claim 100, further comprising:
means for transmitting a first DCI indicating a first DL grant that references the multi-user PDSCH communication and indicating a HARQ ACK/NACK reporting occasion for the multi-user PDSCH communication; and
means for transmitting a second DCI indicating a second DL grant that references the unicast PDSCH communication and indicating the HARQ ACK/NACK reporting occasion for the unicast PDSCH communication,
wherein a first HARQ codebook is based on the first ACK/NACK feedback and a second HARQ codebook is based on the second ACK/NACK feedback.

107. The UE of claim 106, further comprising:
means for receiving the first and second HARQ codebooks in the PUCCH reporting occasion, wherein the first HARQ codebook is concatenated to the second HARQ codebook.

108. The UE of claim 100, further comprising:
means for transmitting a second DCI indicating a second DL grant that references the unicast PDSCH communication and indicating a HARQ ACK/NACK reporting occasion; and
means for receiving the HARQ codebook concatenated with the first ACK/NACK feedback in the HARQ ACK/NACK reporting occasion.

* * * * *